(12) United States Patent
Miller et al.

(10) Patent No.: US 7,600,771 B2
(45) Date of Patent: *Oct. 13, 2009

(54) CONTINUOUSLY VARIABLE DRIVETRAIN

(75) Inventors: Donald C Miller, Fallbrook, CA (US); Michael C Ross, San Diego, CA (US)

(73) Assignee: Catadon Systems LLC, Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/951,974

(22) Filed: Dec. 6, 2007

(65) Prior Publication Data

US 2008/0073136 A1 Mar. 27, 2008

Related U.S. Application Data

(63) Continuation of application No. 11/747,068, filed on May 10, 2007.

(60) Provisional application No. 60/799,601, filed on May 11, 2006.

(51) Int. Cl.
*B62M 1/04* (2006.01)
*F16H 9/00* (2006.01)

(52) U.S. Cl. .......................... 280/252; 474/69; 474/73; 482/57

(58) Field of Classification Search ......... 280/251–253; 474/101, 37, 69, 73; 482/57
See application file for complete search history.

(56) References Cited

U.S. PATENT DOCUMENTS

| 719,595 | A | 2/1903 | Huss |
|---|---|---|---|
| 1,121,210 | A | 12/1914 | Techel |
| 1,175,677 | A | 3/1916 | Barnes |
| 1,380,006 | A | 5/1921 | Nielson |
| 1,629,902 | A | 5/1927 | Arter et al. |

(Continued)

FOREIGN PATENT DOCUMENTS

CH 118064 12/1926

(Continued)

OTHER PUBLICATIONS

International Search Report for International application No. PCT/US07/11400 dated Mar. 11, 2008.

*Primary Examiner*—Tony H. Winner
(74) *Attorney, Agent, or Firm*—Knobbe, Martens, Olson & Bear LLP

(57) ABSTRACT

Drivetrains and frames for vehicles, equipment, machines, etc. Some embodiments of the drivetrains and frames are particularly suited for human powered machines, such as bicycles and exercise equipment. In some embodiments, a drivetrain includes a reciprocating crank coupled to a crank pivot. A lever couples to the crank via a lever pivot positioned on the crank. A lever stop cooperates with a lever guide surface to guide a motion of the lever as the lever pivots about the lever pivot. The lever and/or the crank are operably coupled to a drive pulley, idler pulley, and/or compound pulley. In some embodiments, a drive cable operably couples the lever and/or the crank to the drive pulley, idler pulley, and/or the compound pulley. In one embodiment, one or more pulleys couple to the lever's distal ends. In some embodiments, the drivetrain includes a wheel hub adapted to receive torque from the crank via a drive pulley.

19 Claims, 33 Drawing Sheets

U.S. PATENT DOCUMENTS

| | | | |
|---|---|---|---|
| 1,858,696 A | 5/1932 | Weiss |
| 1,903,228 A | 3/1933 | Thomson |
| 2,060,884 A | 11/1936 | Madle |
| 2,086,491 A | 7/1937 | Dodge |
| 2,112,763 A | 3/1938 | Cloudsley |
| 2,152,796 A | 4/1939 | Erban |
| 2,209,254 A | 7/1940 | Ahnger |
| 2,469,653 A | 5/1949 | Kopp |
| 2,596,538 A | 5/1952 | Dicke |
| 2,675,713 A | 4/1954 | Acker |
| 2,730,904 A | 1/1956 | Rennerfelt |
| 2,868,038 A | 1/1959 | Billeter |
| 2,913,932 A | 11/1959 | Oehru |
| 2,931,234 A | 4/1960 | Hayward |
| 2,931,235 A | 4/1960 | Hayward |
| 2,959,063 A | 11/1960 | Perry |
| 2,959,972 A | 11/1960 | Madson |
| 3,184,983 A | 5/1965 | Kraus |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,374,009 A | 3/1968 | Jeunet |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,891,235 A | 6/1975 | Shelly |
| 3,954,282 A | 5/1976 | Hege |
| 3,984,129 A | 10/1976 | Hege |
| 3,996,807 A | 12/1976 | Adams |
| 4,053,173 A * | 10/1977 | Chase, Sr. .................. 280/253 |
| 4,169,609 A | 10/1979 | Zampedro |
| 4,177,683 A | 12/1979 | Moses |
| 4,227,712 A | 10/1980 | Dick |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,493,677 A | 1/1985 | Ikenoya |
| 4,496,051 A | 1/1985 | Ortner |
| 4,549,874 A * | 10/1985 | Wen ........................... 474/69 |
| 4,574,649 A * | 3/1986 | Seol ........................... 74/138 |
| 4,585,429 A | 4/1986 | Marier |
| 4,628,766 A | 12/1986 | De Brie Perry |
| 4,630,839 A | 12/1986 | Seol |
| 4,647,060 A | 3/1987 | Tomkinson |
| 4,700,581 A | 10/1987 | Tibbals, Jr. |
| 4,725,258 A | 2/1988 | Joanis, Jr. |
| 4,735,430 A | 4/1988 | Tomkinson |
| 4,744,261 A | 5/1988 | Jacobson |
| 4,756,211 A | 7/1988 | Fellows |
| 4,806,066 A | 2/1989 | Rhodes et al. |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Schievelbusch |
| 5,318,486 A | 6/1994 | Lutz |
| 5,323,570 A | 6/1994 | Kuhlman et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,451,070 A | 9/1995 | Lindsay et al. |
| 5,508,574 A | 4/1996 | Vlock |
| 5,601,301 A | 2/1997 | Liu |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,846,155 A | 12/1998 | Taniguchi et al. |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,045,481 A | 4/2000 | Kumagai |
| 6,053,833 A | 4/2000 | Masaki |
| 6,053,841 A | 4/2000 | Koide et al. |
| 6,066,067 A | 5/2000 | Greenwood |
| 6,071,210 A | 6/2000 | Kato |
| 6,076,846 A | 6/2000 | Clardy |
| 6,095,940 A | 8/2000 | Ai et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 | 6/2001 | Miller |
| 6,243,638 B1 | 6/2001 | Abo et al. |
| 6,293,575 B1 | 9/2001 | Burrows et al. |
| 6,322,475 B2 | 11/2001 | Miller |
| 6,325,386 B1 | 12/2001 | Shoge |
| 6,340,067 B1 | 1/2002 | Fujiwara |
| 6,390,946 B1 | 5/2002 | Hibi et al. |
| 6,406,399 B1 | 6/2002 | Ai |
| 6,419,608 B1 | 7/2002 | Miller |
| 6,461,268 B1 | 10/2002 | Milner |
| 6,499,373 B2 | 12/2002 | Van Cor |
| 6,523,223 B2 | 2/2003 | Wang |
| 6,551,210 B2 | 4/2003 | Miller |
| 6,575,047 B2 | 6/2003 | Reik et al. |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,945,903 B2 | 9/2005 | Miller |
| 6,949,049 B2 | 9/2005 | Miller |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,111,860 B1 * | 9/2006 | Grimaldos .................. 280/253 |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |

| | | |
|---|---|---|
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,219 B2 | 5/2007 | Miller |
| 7,232,395 B2 | 6/2007 | Miller et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,288,043 B2 | 10/2007 | Miller et al. |
| 7,320,660 B2 | 1/2008 | Miller |
| 7,322,901 B2 | 1/2008 | Miller et al. |
| 2001/0008192 A1 | 7/2001 | Morisawa |
| 2002/0153695 A1 | 10/2002 | Wang |
| 2003/0022753 A1 | 1/2003 | Mizuno et al. |
| 2003/0176247 A1 | 9/2003 | Gottschalk |
| 2003/0221892 A1 | 12/2003 | Matsumoto et al. |
| 2005/0178893 A1 | 8/2005 | Miller et al. |
| 2005/0227809 A1 | 10/2005 | Bitzer et al. |
| 2006/0084549 A1 | 4/2006 | Smithson et al. |
| 2006/0108956 A1 | 5/2006 | Clark |
| 2006/0180363 A1 | 8/2006 | Uchisasai |
| 2007/0041823 A1 | 2/2007 | Miller |
| 2007/0049450 A1 | 3/2007 | Miller |
| 2007/0142161 A1 | 6/2007 | Miller |
| 2007/0155567 A1 | 7/2007 | Miller et al. |
| 2007/0155580 A1 | 7/2007 | Nichols et al. |
| 2007/0167275 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller et al. |
| 2007/0197337 A1 | 8/2007 | Miller et al. |
| 2007/0228687 A1 * | 10/2007 | Parker ................ 280/252 |
| 2007/0270265 A1 | 11/2007 | Miller et al. |
| 2007/0270266 A1 | 11/2007 | Miller et al. |
| 2007/0270267 A1 | 11/2007 | Miller et al. |
| 2007/0270268 A1 | 11/2007 | Miller et al. |
| 2007/0270269 A1 | 11/2007 | Miller et al. |
| 2007/0270270 A1 | 11/2007 | Miller et al. |
| 2007/0270271 A1 | 11/2007 | Miller et al. |
| 2007/0270272 A1 | 11/2007 | Miller et al. |
| 2007/0270278 A1 | 11/2007 | Miller et al. |
| 2007/0275809 A1 | 11/2007 | Miller et al. |
| 2007/0281819 A1 | 12/2007 | Miller et al. |
| 2007/0287577 A1 | 12/2007 | Miller |
| 2007/0287578 A1 | 12/2007 | Miller |
| 2007/0287579 A1 | 12/2007 | Miller et al. |
| 2007/0287580 A1 | 12/2007 | Miller |
| 2008/0032852 A1 | 2/2008 | Smithson et al. |
| 2008/0032853 A1 | 2/2008 | Smithson et al. |
| 2008/0032854 A1 | 2/2008 | Smithson et al. |
| 2008/0034585 A1 | 2/2008 | Smithson et al. |
| 2008/0034586 A1 | 2/2008 | Smithson et al. |
| 2008/0039269 A1 | 2/2008 | Smithson et al. |
| 2008/0039270 A1 | 2/2008 | Smithson et al. |
| 2008/0039271 A1 | 2/2008 | Smithson et al. |
| 2008/0039272 A1 | 2/2008 | Smithson et al. |
| 2008/0039273 A1 | 2/2008 | Smithson et al. |
| 2008/0039274 A1 | 2/2008 | Smithson et al. |
| 2008/0039275 A1 | 2/2008 | Smithson et al. |
| 2008/0039276 A1 | 2/2008 | Smithson et al. |
| 2008/0039277 A1 | 2/2008 | Smithson et al. |
| 2008/0040008 A1 | 2/2008 | Smithson et al. |
| 2008/0070729 A1 | 3/2008 | Miller et al. |
| 2008/0073136 A1 | 3/2008 | Miller et al. |
| 2008/0073137 A1 | 3/2008 | Miller et al. |
| 2008/0073467 A1 | 3/2008 | Miller et al. |
| 2008/0079236 A1 | 4/2008 | Miller et al. |
| 2008/0081715 A1 | 4/2008 | Miller et al. |
| 2008/0085795 A1 | 4/2008 | Miller et al. |
| 2008/0085796 A1 | 4/2008 | Miller et al. |
| 2008/0085797 A1 | 4/2008 | Miller et al. |
| 2008/0085798 A1 | 4/2008 | Miller et al. |

FOREIGN PATENT DOCUMENTS

| | | |
|---|---|---|
| CN | 1157379 A | 8/1997 |
| DE | 498 701 | 5/1930 |
| DE | 2 310880 | 9/1974 |
| DE | 2 136 243 | 1/1975 |
| DE | 39 40 919 A1 | 6/1991 |
| DE | 10155372 A1 | 5/2003 |
| EP | 0 432 742 | 12/1990 |
| EP | 635639 A1 | 1/1995 |
| EP | 1136724 | 9/2001 |
| EP | 1811202 A1 | 7/2007 |
| FR | 620375 | 4/1927 |
| FR | 2590638 | 5/1987 |
| GB | 592320 | 9/1947 |
| GB | 906 002 A | 9/1962 |
| GB | 1 376 057 | 12/1974 |
| GB | 2 035 482 | 6/1980 |
| GB | 2 080 452 | 8/1982 |
| JP | 42-2844 | 2/1967 |
| JP | 48-54371 | 7/1973 |
| JP | 51-150380 | 12/1976 |
| JP | 47-20535 | 8/1977 |
| JP | 53 048166 | 1/1978 |
| JP | 55-135259 | 4/1979 |
| JP | 59069565 | 4/1984 |
| JP | 63219953 | 9/1988 |
| JP | 02157483 | 6/1990 |
| JP | 02271142 | 6/1990 |
| JP | 52-35481 | 9/1993 |
| JP | 08170706 A | 7/1996 |
| JP | 09024743 A | 1/1997 |
| JP | 411063130 | 3/1999 |
| JP | 2004162652 A | 6/2004 |
| JP | 8-247245 | 9/2004 |
| JP | 2005/240928 A | 9/2005 |
| NE | 98467 | 7/1961 |
| WO | WO 2007/077502 | 7/2007 |

* cited by examiner

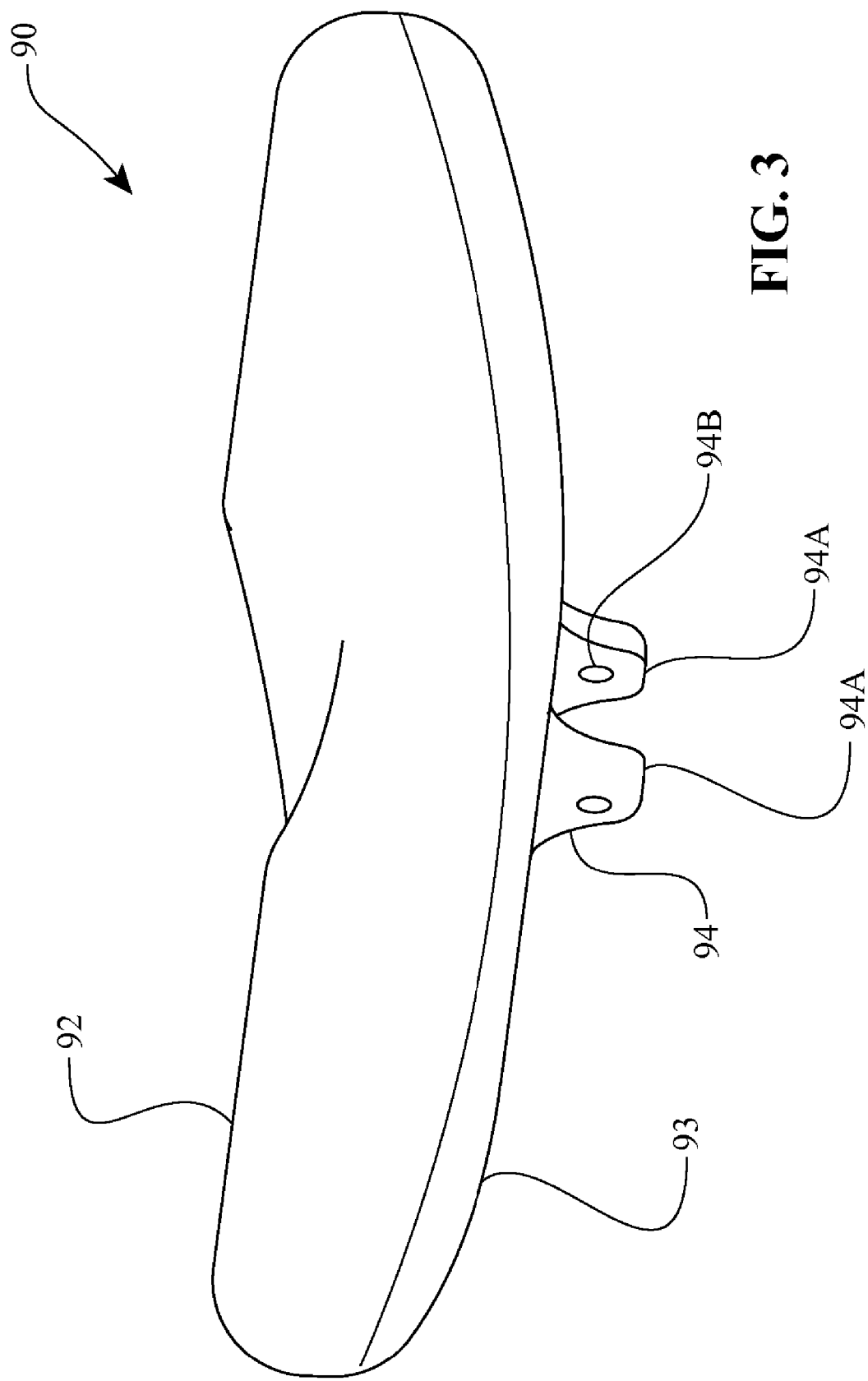

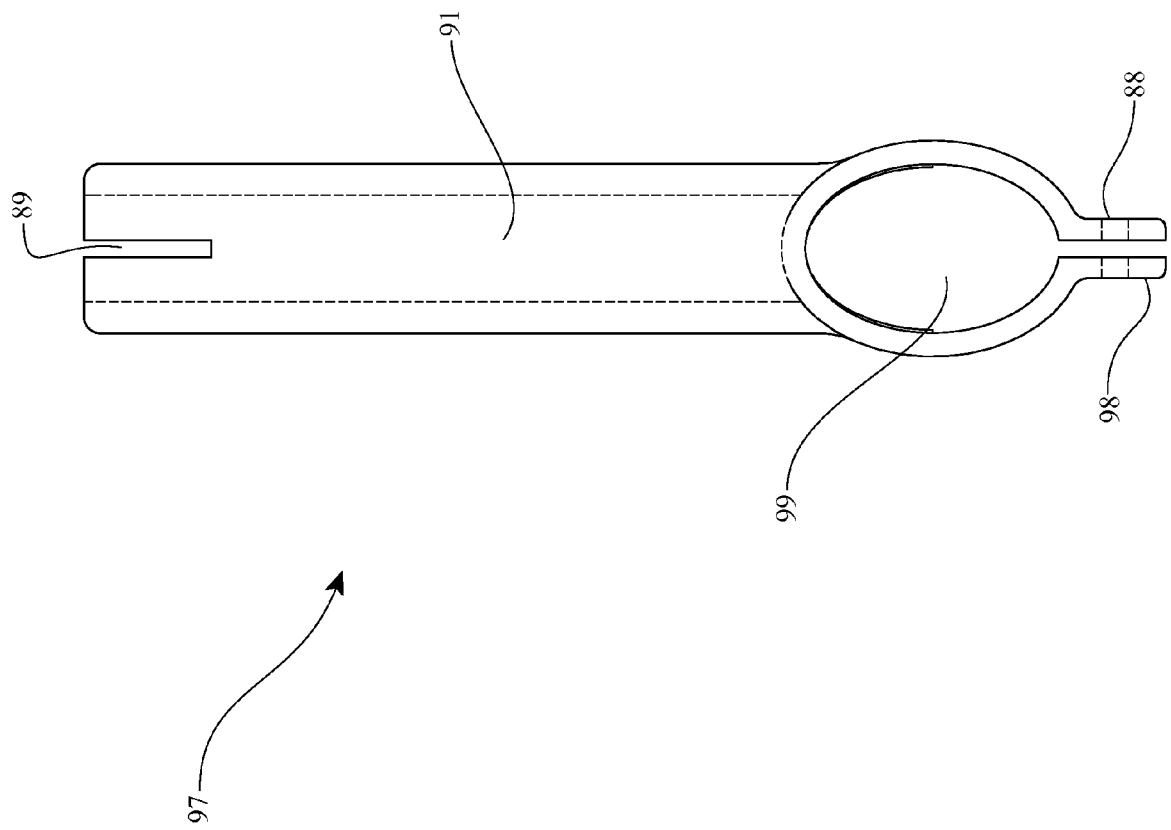

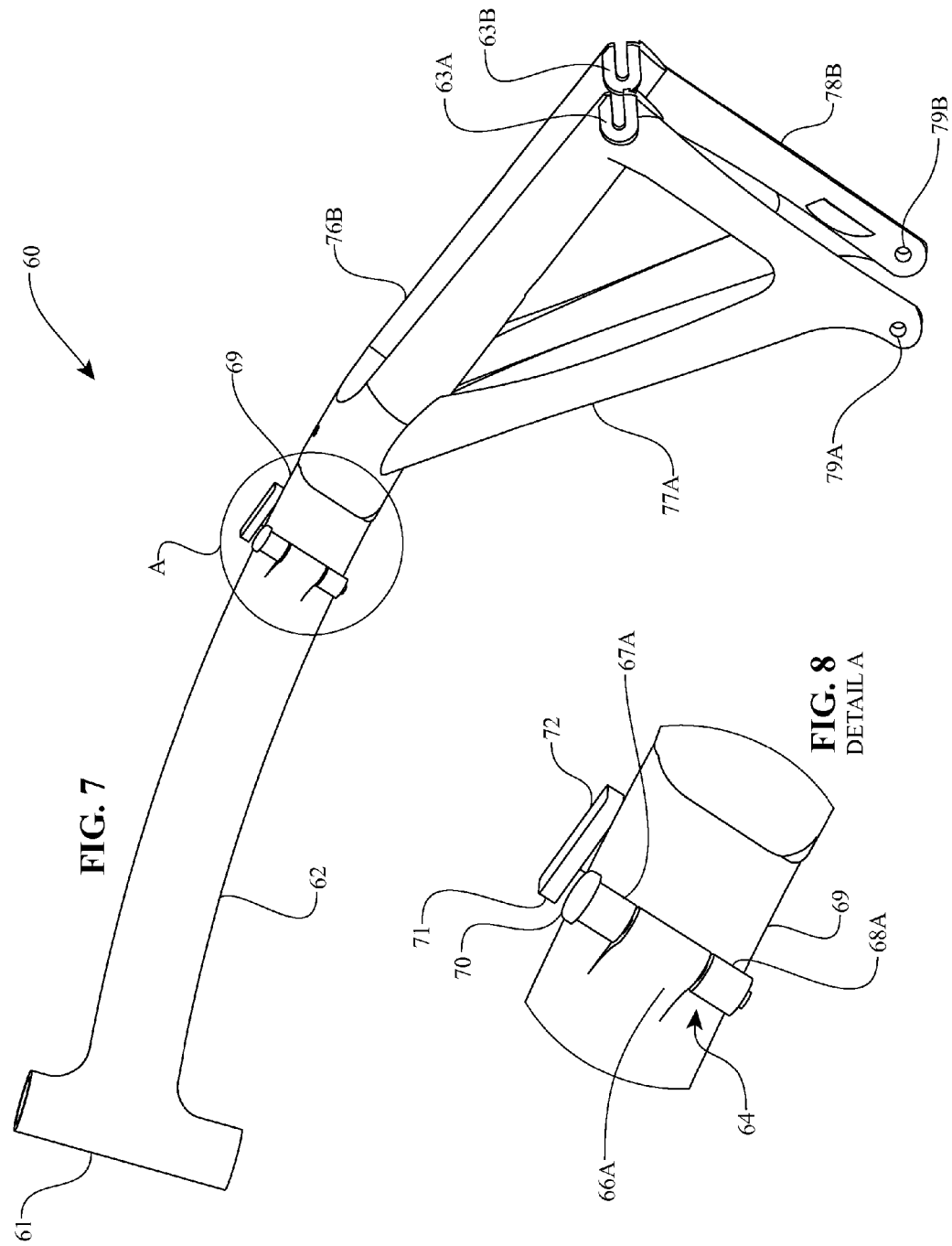

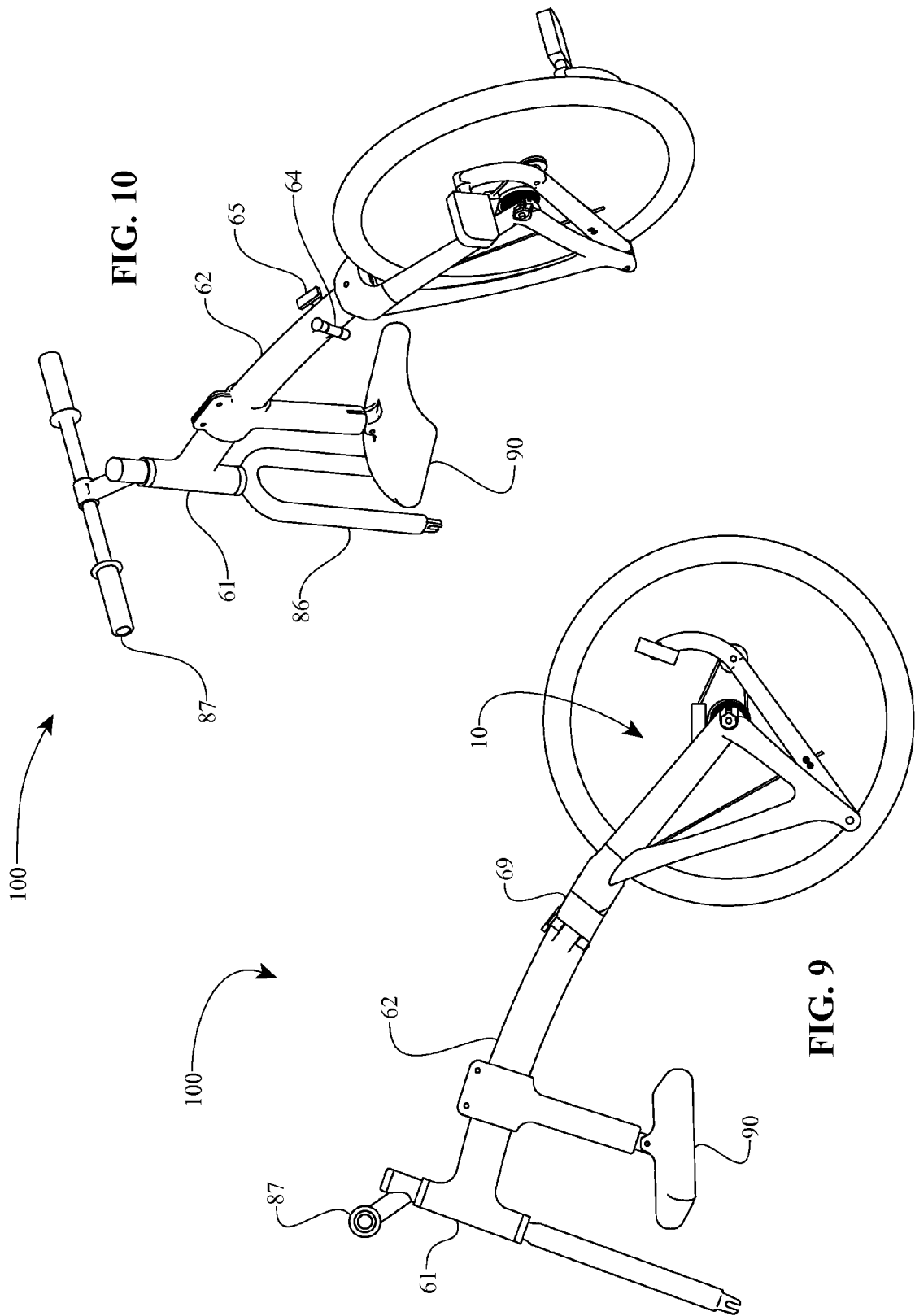

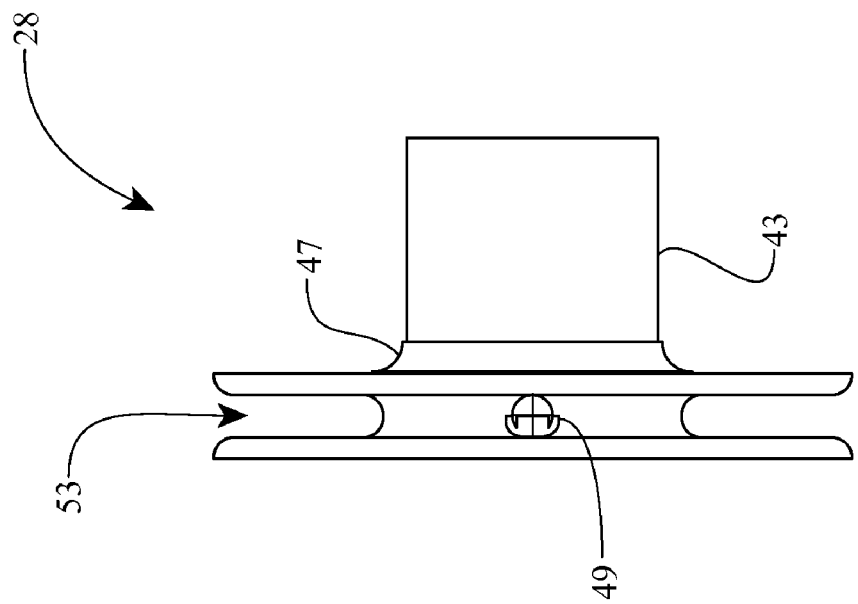
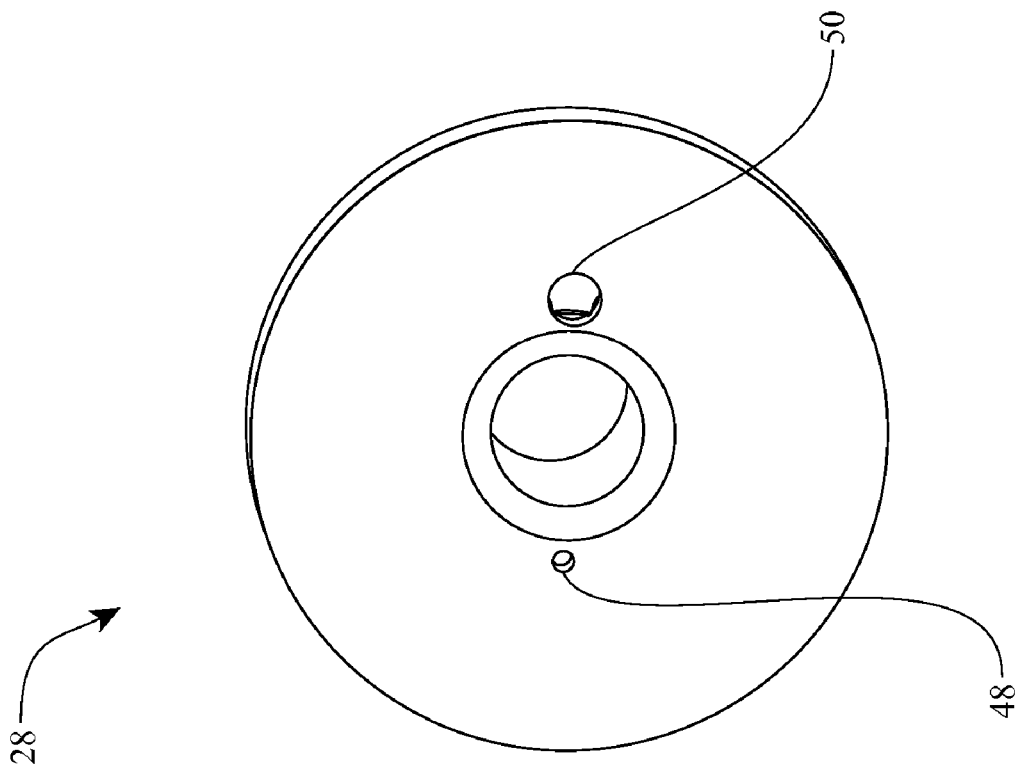

CONTINUOUSLY VARIABLE DRIVETRAIN

RELATED APPLICATIONS

This application is a continuation of U.S. patent application Ser. No. 11/747,068, filed on May 10, 2007, which claims priority to U.S. Provisional Patent Application 60/799,601, filed on May 11, 2006. The entire disclosure of each of the above applications is hereby incorporated by reference in its entirety.

This Application is related to U.S. patent application Ser. No. 11/951,921, U.S. patent application Ser. No. 11/952,000, U.S. patent application Ser. No. 11/951,950, U.S. patent application Ser. No. 11/951,857, U.S. patent application Ser. No. 11/951,989, U.S. patent application Ser. No. 11/951,878, U.S. patent application Ser. No. 11/951,985, and U.S. patent application Ser. No. 11/951,838, all filed on even date and which are hereby incorporated by reference in their entirety.

BACKGROUND OF THE INVENTION

1. Field of the Invention

The present invention relates generally to mechanical power transmission systems and more specifically to continuously variable drivetrains.

2. Related Art

Pulley and belt systems used to transmit mechanical energy are very common and have been used extensively in industry for decades. Their benefits of low cost, reliability, modularity, and high efficiency have created thousands of applications. Typically, two pulleys are used, although three, four, five, or more pulleys may be employed. Generally one belt or cable is used, although systems with multiple belts are not uncommon, such as those used in automobiles. With these systems, two or more pulleys have two or more annular grooves that are designed to accommodate two or more belts. Pulleys can be made from steel, aluminum, plastic, and other materials. The material choice is often determined by the amount of power to be transferred. Pulleys come in many different sizes, ranging from miniature pulleys with a diameter of less than 10 millimeters to very large pulleys over a meter in diameter. Belts are made from many different materials, but all of them are flexible. Often, a rubber belt is used with embedded steel strands to increase strength. Other common materials used in belt construction are urethane, neoprene, steel, and composites. The belt profile can be round, V shaped, flat, grooved, or other shapes. Timing belts use a series of tooth shaped ridges which engage corresponding indentations in a pulley to maximize power transfer and eliminate slip. Some belts employ grooves to allow them to wrap around smaller diameter pulleys.

Most pulley and belt drivetrains are endless, which means that they transfer power rotationally from one pulley to another. The pulleys are rigidly attached to rotating drive and driven shafts and a circular belt rotates endlessly in a closed loop. Idler pulleys are frequently used to create and maintain tension on the belt to prevent slippage and premature failure. Idler pulleys do not transfer power and typically employ a bearing in the bore of the pulley to minimize friction and increase life. The bearing and idler pulley assembly is often pressed over a non-rotating shaft.

Reciprocating pulley and belt, or cable, drivetrains are often found in human powered systems. Exercise equipment frequently uses a cable that is attached to weights at one end and to a bar or other device which a person can push or pull. The weight is lifted and then returned to its resting state. An idler pulley is generally suspended at a height above the weights. This lifting and lowering of the weight creates reciprocating motion of the cable and pulley. Similarly, exercise machines such as those simulating the motion of climbing stairs can use similar reciprocating pulley and cable drivetrains. All of these drivetrains suffer from a loss of kinetic energy at the end of each stroke. For example, in a bicep curl, the human grasps a bar with both hands and lifts the bar to a position near the chest, and then returns it to the resting state. Kinetic energy is created during movement of the bar and then lost when the movement is stopped at the end of the stroke. Some exercise machines, including Nautilus type equipment, employ a cam which causes the weights to move more rapidly at the end of the stroke. This effect creates more efficient exercise by minimizing the loss of kinetic energy. The exercise is also more efficient because it becomes more difficult as the muscle contracts. During contraction the mechanical advantage of a muscle increases and it becomes more powerful. As the muscle position changes and creates a larger mechanical advantage, with cam or Nautilus type equipment, the weight simultaneously becomes more difficult to lift.

Linear drive systems in human powered vehicles have been attempted many times. However, they are not as efficient as commonly used drivetrains, such as sprocket and chain systems used on bicycles, due to the loss of kinetic energy at the end of each stroke. Many of the human powered linear drive systems are also complex, and each gear, bearing, pulley, cable, chain, or sprocket used in the drivetrain reduces efficiency. The complex systems are also heavy, and weight is a significant factor in human powered vehicles because it increases inertia and power requirements. Complex systems are also more expensive and more prone to breaking.

The most common human powered vehicle is a bicycle. A bicycle uses a sprocket and chain drivetrain which very efficiently transfers human power to the rear wheel. However, power is only efficiently created through about 60 degrees of the stroke, and only becomes very efficient for about 30 degrees of the 360 degree rotary stroke. This stroke also creates two large torque spikes per revolution. In order to reduce stress on the body (especially the knees), and minimize fatigue, a high pedaling speed is required to achieve high efficiency. This high pedaling speed reduces the torque spikes and also creates momentum to carry the pedals through the power phase of the stroke. However, the majority of people are not comfortable pedaling at a high speed and consequently do not maintain a cadence which maximizes the efficiency inherent in a bicycle's rotary stroke.

Further, the most common complaint from individuals riding bicycles is discomfort created by the bike seat. This discomfort is significant enough to keep many people from riding bikes, and to reduce the frequency that others use their bicycles. Recent studies showing that bicycle riding contributes to impotence and other health problems aggravate the discomfort problem caused from bike seats. However, maximizing the efficiency inherent in the bicycle drivetrain requires that the user stay seated while pedaling. This position is more conducive to a higher cadence and expends less of the user's energy. Riding a bicycle seated creates a situation where most of the user's weight is on the seat, and thus prevents the majority of the user's weight from being applied to the pedals. This loss in force can only be regained by pedaling at high speed, where there is a corresponding drop in torque and less force needs to be applied to the pedals to maintain an efficient power output.

The second most common complaint among bicycle users is difficulty when shifting. While this is rarely a problem with avid cyclists, infrequent users routinely shift in the wrong direction, shifting to a higher gear when starting up a hill, or vice versa. This problem can lead to the chain coming off of a sprocket, binding of the chain, a broken chain, and in rare cases the user getting injured in a fall. The problem frustrates enough people that it reduces the percentage of the population that ride a bicycle.

There exists a need for a human powered drivetrain that eliminates the torque spike inherent in a bicycle drivetrain and that allows lower speed, efficient pedaling at a cadence comfortable for the majority of people. There also exists a need for a linear drivetrain that minimizes or eliminates the loss of kinetic energy at the end of each stroke. There exists a need for a simple, inexpensive, lightweight, and efficient linear drivetrain that can be altered to accommodate different user sizes and preferences. Additionally, there exists a need for human powered vehicles where discomfort from the seat is eliminated and that allows most or all of the user's weight to be applied to the pedals. Finally, there exists a need for a drivetrain which eliminates shifting of the derailleur system used to vary speed and torque on hills.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiments" one will understand how the features of the system and methods provide several advantages over traditional systems and methods.

In one aspect, a pulley and cable drivetrain is disclosed which continuously varies speed and torque throughout its stroke. In some systems the continuously variable drivetrain incorporates two pedals, which are contacted by a person's feet, and move in reciprocating motion to transmit power. Each pedal attaches to a crank which rotates along an arc defined by a pivot point at an end opposite the pedal. The cranks attach to a frame, which in some systems comprises the support structure for a human powered vehicle or exercise equipment. Also attached to each crank is a pulley, the pulley positioned at a distance from the crank pivot point to produce the correct rotational speed of a drive pulley. The drive pulley, of which there is one for each crank, has a drive cable wrapped around a deep annular groove. The drive cable terminates at the interior of the drive pulley.

In one aspect the drive cable then travels around a first idler pulley and at a second end is attached to the frame. A second, dependent cable is used to raise one pedal while the other is depressed. The dependent cable is attached at each end to each of the cranks. The dependent cable then travels around a second idler pulley which is attached to the frame. The idler pulley is positioned above the cranks so that the dependent cable is tensioned by each crank.

In some applications the continuously variable drivetrain is used in conjunction with human powered vehicles, specifically a bicycle. The drivetrain allows the seat to be removed from the bicycle. The user stands on the pedals near the rear of the bicycle and in some aspects leans forward on a chest support.

In some embodiments the dependent cable and the dependent pulley are eliminated to allow each crank to be operated independently of the other. This allows the user to pedal with one leg, both legs simultaneously, or to vary the starting and ending positions of the stroke. In some such systems, the pedals may utilize a cover which extends over the top of the foot or fasteners to attach the user's shoes to the pedals.

In some systems the idler pulley is eliminated and the drive cable terminates at and is attached to the crank. This has the effect of reducing the speed at which the drive pulley rotates. In other systems two or more idler pulleys are attached to each crank, which increases the speed at which the drive pulley rotates.

In some systems a compound pulley is used to accelerate the ratio change of the continuously variable drivetrain. The compound pulley, one for each drive pulley, incorporates two deep annular grooves to accommodate two cables. One cable is the drive cable and the second cable is the compound cable. Depending on whether the stroke is in its power or return phase, one cable is unwinding from the compound pulley while the other cable is winding onto the compound pulley.

In another aspect, a compound pulley is attached to each crank, and a lever is attached to each crank. The lever is connected to the crank with a lever pivot, and in one embodiment has lever pulleys attached at both ends of the lever. A lever cable runs from the compound pulley, around the lever pulleys, and terminates at a strong stationary structure, such as the frame. The lever contacts a roller, which causes the lever to swing and pull more cable at the end of the stroke than at the beginning of the stroke.

One aspect of the invention is directed to a drivetrain having a crank coupled to a lever pivot, and a lever operably coupled to the crank; the lever is configured to rotate less than 360 degrees about the lever pivot during a power phase of a stroke. Yet another aspect of the invention concerns a drivetrain having a crank, a pulley attached to the crank, a lever operably coupled to the crank, and a lever stop operably coupled to the lever.

A different aspect of the invention relates to a drivetrain that includes a lever configured to rotate about an axis during a stroke of the drivetrain, the stroke comprising a power phase and a return phase. The drivetrain additionally includes a hook attached to the lever, a lever stop configured to cooperate with the lever, and a drive pulley operationally coupled to the lever. In some embodiments, the invention concerns a drivetrain provided with first and second rotatable cranks and a crank pivot, wherein the cranks are configured to rotate less than 180 degrees about the crank pivot during a power phase of a stroke. The drivetrain can additionally exhibit first and second lever pivots attached respectively to the first and second rotatable cranks, and first and second levers attached respectively to the first and second lever pivots, wherein the levers are configured to rotate less than 300 degrees during the power phase. The drivetrain, in some cases, additionally includes at least one crank pulley attached to each crank, at least one lever stop operably coupled to each lever, and at least one drive pulley operably coupled to each crank.

In yet another aspect, the invention is directed to a drivetrain configured to convert human power to mechanical propulsive power. The drivetrain has a lever configured to rotate less than 360 degrees during a power phase of a stroke, a hook attached to the lever, and a first pulley attached to the lever. In other embodiments, the invention covers a drivetrain with two levers and two lever pivots, wherein each lever pivot attaches to a respective lever, and wherein each lever is configured to rotate less than 360 degrees about a respective lever pivot during a power phase of a stroke. The drivetrain can also have first and second lever pulleys attached to each lever, two compound pulleys, and two flexible tension members, each flexible member contacting a respective compound pulley, first lever pulley, and second lever pulley.

A different aspect of the invention relates to a drivetrain having a crank configured to rotate less than 360 degrees during the power phase of a stroke, a lever pivot coupled to the crank, and a drive pulley having a spiraling root. In some embodiments, the drivetrain includes a flexible tension member operably coupled to the crank and the drive pulley such that a first end of the flexible tension member terminates at the root of the drive pulley, the flexible tension member is spirally wound on the drive pulley at the beginning of the power phase, and the flexible tension member unwinds from the drive pulley during the power phase. Yet one more aspect of the invention concerns a drivetrain having a crank configured to rotate less than 360 degrees during the power phase of a stroke, a lever pivot coupled to the crank, and a lever operably coupled to the crank via the lever pivot; the lever can be configured to rotate less than 360 degrees about the lever pivot during the power phase.

Still another embodiment of the invention addresses a bicycle having first and second cranks, each crank configured to rotate less than 360 degrees during the power phase of a stroke. The bicycle can have first and second lever pivots coupled, respectively, to the first and second cranks. In one case, the bicycle additionally includes first and second levers operably coupled, respectively, to the first and second cranks, the first and second levers configured to rotate less than 360 degrees about the first and second lever pivots during the power phase. The bicycle can also have a frame, wherein the first and second cranks and/or the first and second levers are coupled to the frame. In some embodiments, a front wheel and a rear wheel operably couple to the frame.

One aspect of the invention is directed to a human powered vehicle having a frame, at least one wheel attached to the frame, and at least one crank which is configured to rotate less than 360 degrees during the power phase of a stroke; the crank is operably coupled to the wheel. The human powered vehicle components are configured such that during the power phase a rotation of the crank causes a rotation of the wheel, and wherein the power phase is continuously variable and causes the wheel to rotate more rapidly at the beginning than at the end of the power phase.

In some embodiments, the invention addresses a continuously variable drivetrain having first and second foot pedals and first and second cranks; wherein the first and second foot pedals couple, respectively, to the first and second cranks. The drivetrain can be configured such that the cranks are capable of reciprocating motion, and the cranks rotate along an arc defined by a crank pivot point located at an end distal from the pedals. The drivetrain can further include a frame adapted to support the cranks, and first and second drive pulleys coupled, respectively, to the first and second cranks. The drivetrain additionally has first and second crank pulleys coupled, respectively, to the first and second cranks; the crank pulleys can be positioned at a distance from the crank pivot point. In some cases, the drivetrain has a first drive cable wrapped around the first drive pulley and the first crank pulley, and a second drive cable wrapped around the second drive pulley and the second crank pulley.

These and other improvements will become apparent to those skilled in the art as they read the following detailed description and view the enclosed figures.

BRIEF DESCRIPTION OF THE DRAWINGS

FIG. 3 is a perspective view of the chest support of the bicycle of FIG. 1.

FIG. 4 is an end view of the support base of the bicycle of FIG. 1.

FIG. 7 is a side perspective view of the frame of the bicycle of FIG. 1.

FIG. 8 is a Detail A view of FIG. 7.

FIG. 9 is a side view of the bicycle of FIG. 1 with its front wheel removed and the chest support folded down.

FIG. 10 is a perspective view of the bicycle of FIG. 1 with its front wheel removed and the chest support folded down.

FIG. 15 is a perspective side view of the drive pulley of the CVD of FIG. 12.

FIG. 16 is an end view of a drive pulley of the CVD of FIG. 12.

DETAILED DESCRIPTION OF CERTAIN INVENTIVE EMBODIMENTS

Preferred embodiments of the present invention will now be described with reference to the accompanying Figures, wherein like numerals refer to like elements throughout. The terminology used in the description presented herein is intended to be interpreted in its broadest reasonable manner including its specific use herein as well as other uses in the technical field, even though it is being utilized in conjunction with a detailed description of certain specific preferred embodiments. This is further emphasized below with respect to some particular terms used herein. Any terminology intended to be interpreted by the reader in any restricted manner that is different than an accepted plain and ordinary meaning will be expressly and specifically defined as such in this specification and the descriptions of objects or advantages associated with certain embodiments is not intended to require structure fulfilling those objects in all embodiments.

The inventive embodiments disclosed here are related to technology described in U.S. Provisional Patent Application 60/799,601, filed on May 11, 2006, which is hereby incorporated herein by reference in its entirety. As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

Components which are used on both the left and right side of a vehicle or equipment are designated with the letters a and b. For example, where there are two lever cranks 615, the left lever crank might labeled lever crank 615a, while the right lever crank might labeled lever crank 615b. Generally, all of the components on a side are designated with the letter a, and all substantially similar components on another side are designated with the letter b; when a component is referred to generically without a side designation, the a or b suffix is removed.

Figure 1:
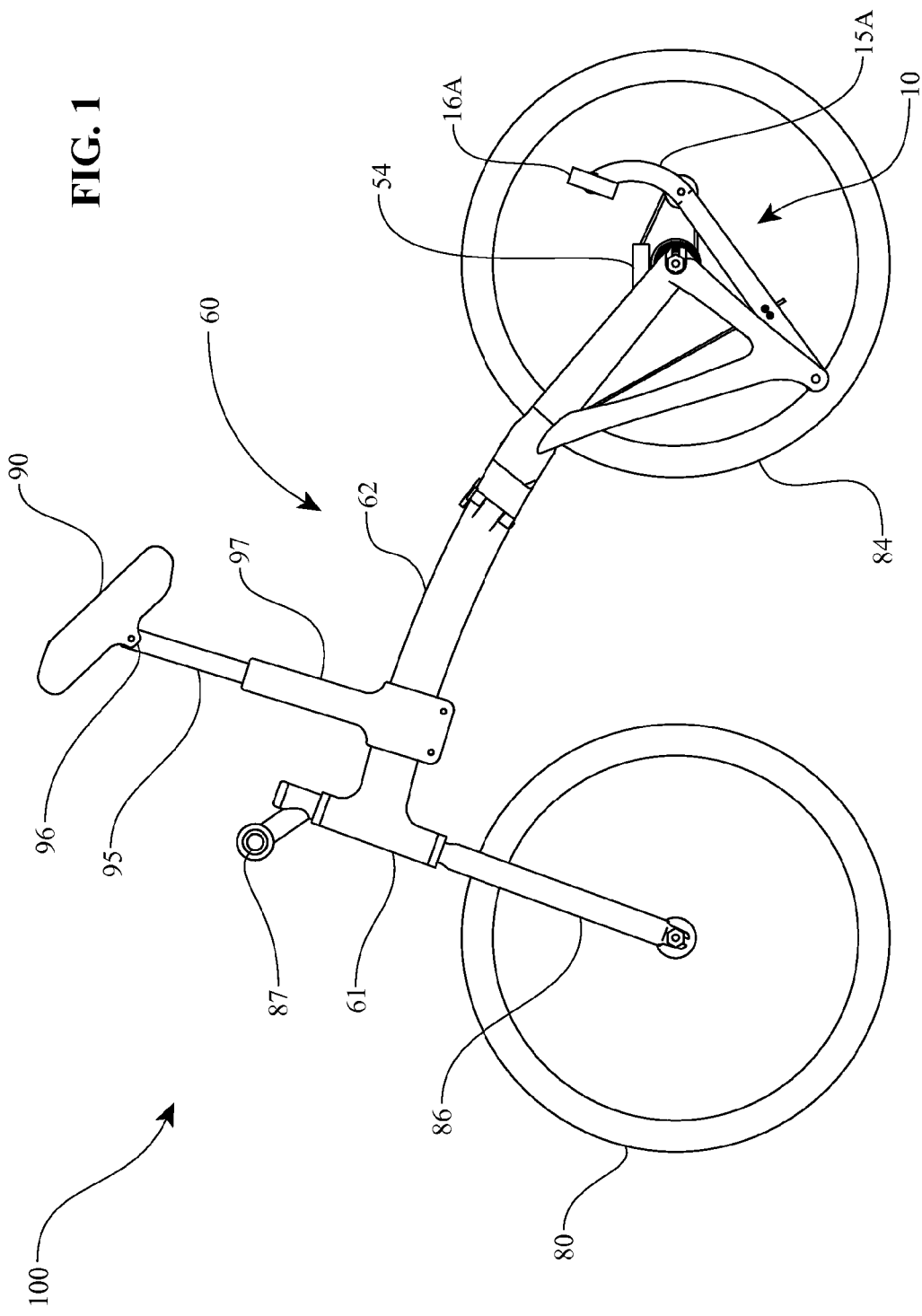
FIG. 1 is a side view of a bicycle utilizing a continuously variable drivetrain (CVD) and a chest support.
Figure 2:
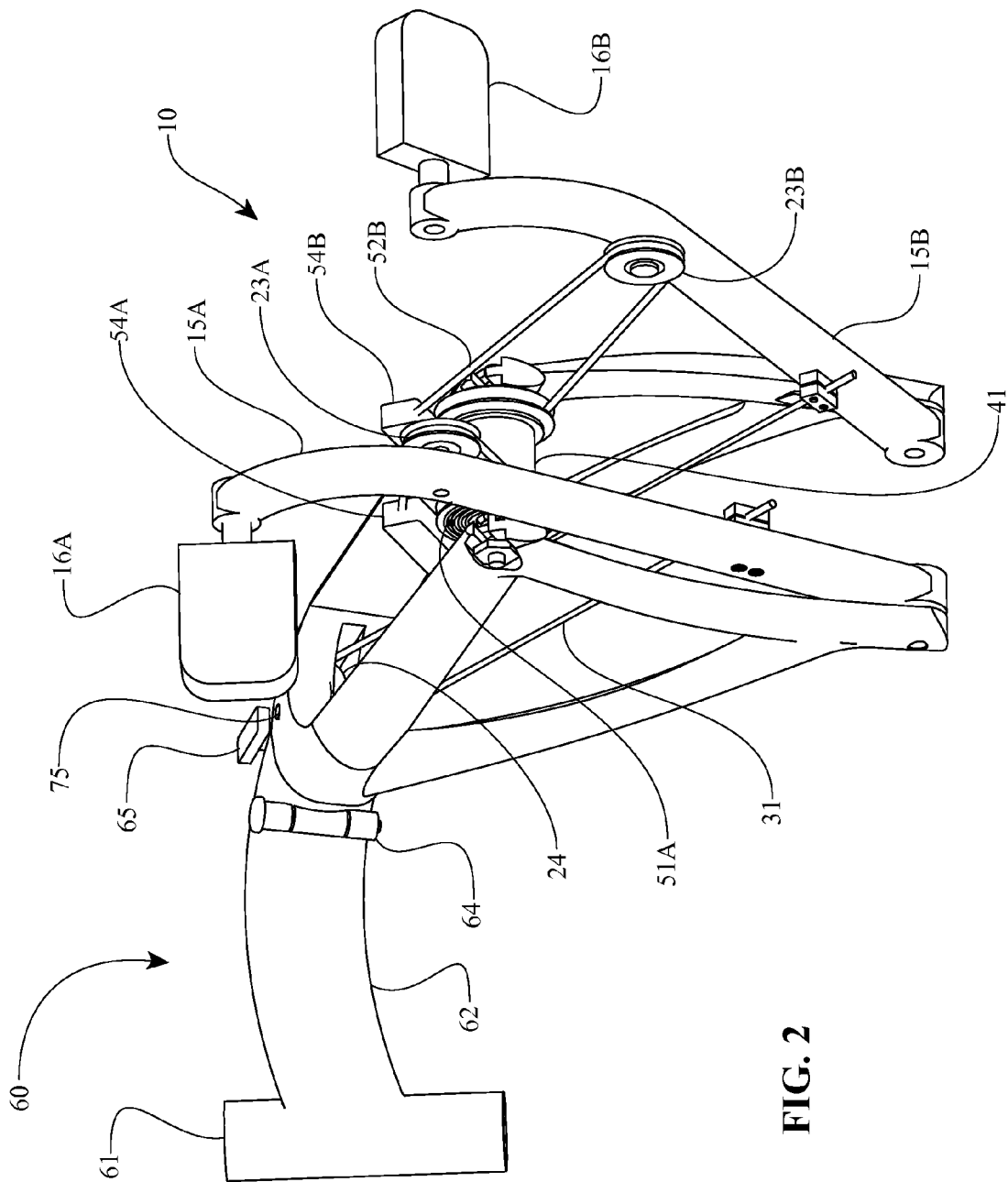
FIG. 2 is a perspective view of the frame and CVD of the bicycle of FIG. 1.
Figure 6:
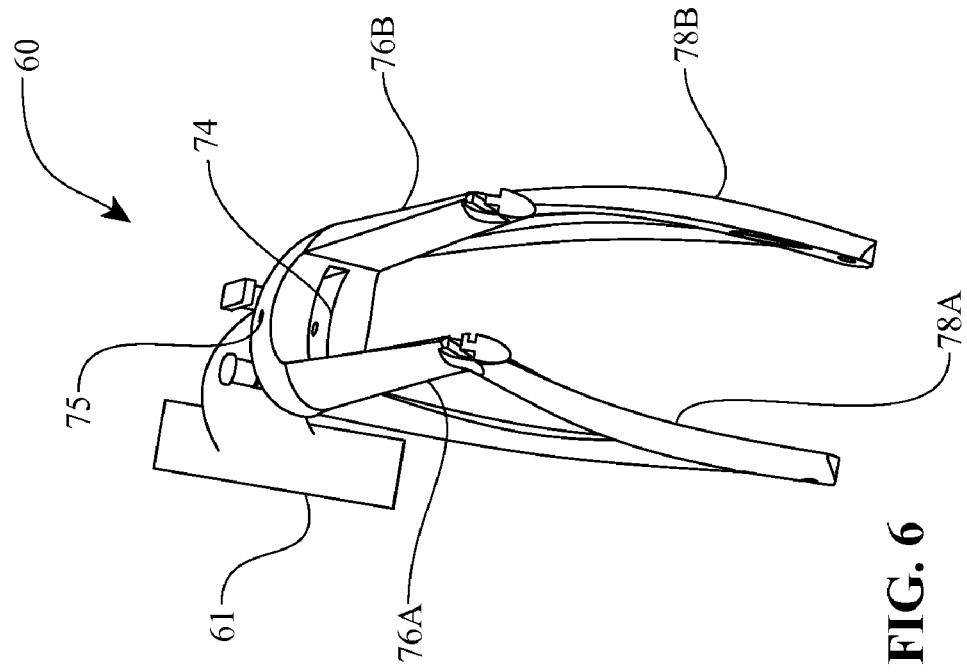
FIG. 6 is a back perspective view of the frame of the bicycle of FIG. 1.
Figure 5:
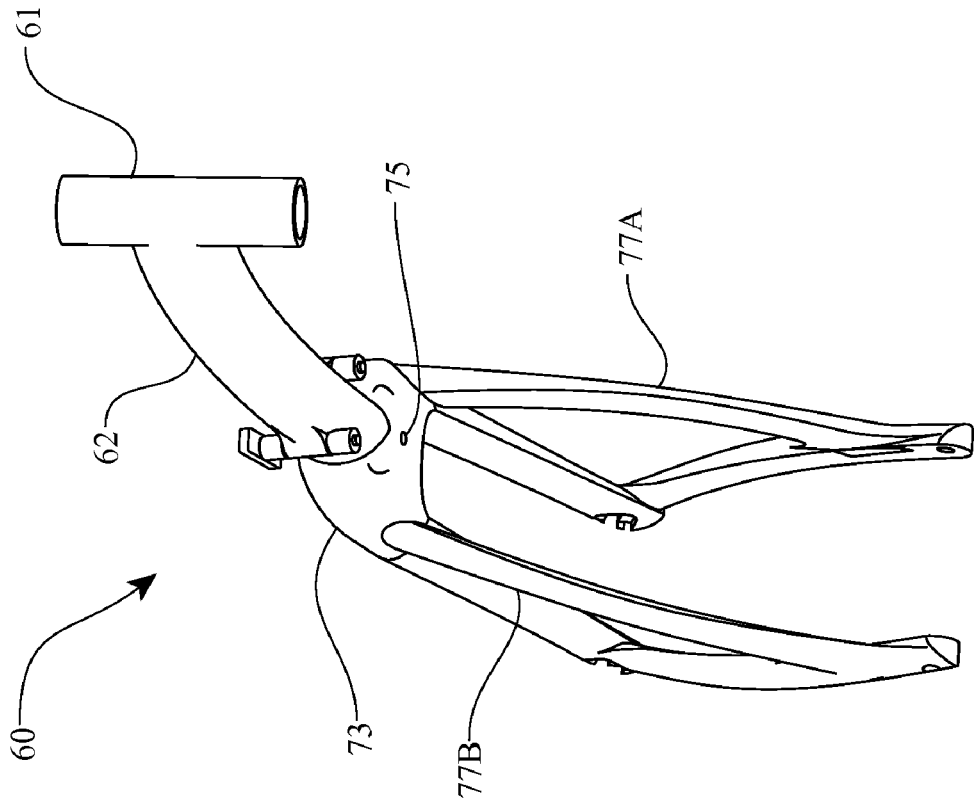
FIG. 5 is a front perspective view of the frame of the bicycle of FIG. 1.

FIGS. 1 and 2 depict a bicycle 100, where the bicycle seat has been removed and a chest support 90 added to accommodate a continuously variable drivetrain 10, hereinafter referred to as a CVD 10. The bicycle 100 also has a front wheel 80, a fork 86, handlebars 87, a frame 60, and a rear wheel 84, typical of conventional bicycles. The front and rear wheels 80, 84 may use bicycle wheels that are spoked, solid, molded, and any other wheels that can be used for a bicycle. In some embodiments, the fork 86 has two blades which attach to the front axle on each side of the front wheel 80; however, the fork 86 may also be of single blade structure. In other embodiments, the fork 86 may be replaced by a component that can provide steering of the front wheel 80. The handlebars 87 may be constructed of aluminum, steel, carbon fiber, wood, or any other suitable material, and the shape can be modified to suit an individual user's preference. Referring now to FIGS. 1-3, the chest support 90 is comprised of a support 92, which can be foam, an inflatable cushion, netting, or any other material which provides support for the user's chest. The size, thickness, and shape of the support can be modified to suit the user's preferences. To accommodate the female anatomy, depressions or cups may be formed into the support 92. In one embodiment, the support 92 is constructed of foam or other lightweight flexible material and a firm support structure 93 is attached to the foam on the underside of the support 92. In a preferred embodiment, a support clamp 94 is positioned underneath and attached to the firm support structure of the support 92. The support clamp 94 provides for attachment of the support 92 to the support tube 95. The support clamp 94 also allows the user to tilt the support 92 to optimize the user's position. The support clamp 94 may be constructed of several different designs, including traditional methods used to attach and tilt a bicycle seat. In one embodiment, the support clamp 94 is plastic and integrally formed with the support structure 93. The support clamp 94 consists of two protrusions 94A extending underneath the support 92, each protrusion 94A having a hole 94B to allow a bolt or quick release clamp to be inserted through the holes 94B in the support clamp 94. The support clamp 94 is positioned over the top of a support tube 95, which has a support hole 96 integral thereto. In other embodiments, the support clamp 94 may use the same design to attach bicycle seats to seat posts. The support tube 95 is positioned between the two protrusions 94A of the support clamp 94 and the support hole 96 is aligned so that it is concentric with the holes of the protrusions. The bolt or quick release clamp is inserted through one protrusion, through the support hole 96, and through the second protrusion. A nut or clamp can be used to secure and tighten the support 92, to hold it in a preferred position.

Now referring to FIGS. 1-4, the support tube 95 is a cylindrical tube made from aluminum, titanium, steel, plastic, a composite such as carbon fiber, or any other suitable rigid, strong material. The support tube 95 is capable of being raised or lowered so that the height of the support 92 can be adjusted to accommodate different users. The support tube 95 fits into a hole 91 in a support base 97, the hole 91 having a slightly larger diameter than the support tube 95. In a preferred embodiment the support base 97 at a first end is generally cylindrical to allow insertion of the support tube 95, and at a second end has an aperture 99 with an axis approximately 90 degrees to the axis of the support tube 95. At a first generally cylindrical end, the support base 97 has a slot 89 to allow a quick release clamp, commonly used in the art, to be positioned around the first end of the support base 97 and clamp the support base 97, and squeeze the support tube 95 firmly, thus holding it in position to prevent movement when the weight of the user's chest is on the support 92.

The aperture 99 is slightly larger than and fits over the frame 60. The aperture 99 is split on a side below the frame to allow frame fastener 98 to fasten securely and rigidly the support base 97 to the frame 60. In one embodiment, the frame fastener 98 has two fastener holes 88 which extend through both sides of the split in the support base 97, to allow common fasteners such as bolts or quick release clamps to be used to tighten the frame fastener 98 to the frame 60. The support base 97 can be moved along the axis of the frame 60 either closer to the front wheel 80, or closer to rear wheel 84, to accommodate preferences and sizes of different users.

Referring now to FIGS. 1, 2, 5-8, and 13, a frame 60 of the bicycle of FIG. 1 is disclosed. The frame 60 is a structural component, and can be constructed of steel, aluminum, titanium, beryllium, carbon fiber or other composite, a plastic, such as glass filled nylon, or any other suitable material. The frame 60 may be composed of two or more materials. For example, the body of the frame 60 can be made from carbon fiber while the dropouts may be steel. The frame 60 is not subjected to the loads and stresses of a conventional bicycle frame. Because the bicycle seat is eliminated, there is only a small amount of weight from the user distributed to the frame 60. Since the user is standing and leaning forward, most of the user's weight is on pedals 16. The pedals 16 ultimately transfer most of the user's weight to the rear axle 33. There is a small amount of weight on the chest support 90, which is transferred to a top tube 62, and ultimately to a head tube 61. Thus the frame 60 can be made significantly lighter than conventional bicycle frames. The head tube 61, a generally cylindrical part of the frame 60, and common in the art, provides for fastening of the fork 86 and steering of the bicycle 100. Attached to the head tube 61 is the top tube 62, a generally cylindrical tube, typically attached at a first end to the head tube 61 by welding if the frame 60 is metal or plastic. In one embodiment, the frame 60 is molded from plastic and the top tube 62 is integrally formed with the head tube 61. The head tube 61 and top tube 62 may also be joined by gluing, using an epoxy, or other high strength adhesive. The top tube 62 extends rearward toward the rear wheel 84, and terminates at first and second hinges 64, 65. The hinges 64, 65 are composed of strong, rigid tubing such as steel, titanium, or aluminum and provide for folding and storage of the bicycle 100.

Referring to FIGS. 7 and 8, each hinge is comprised of three separate tubes. The middle sections 66 are welded, or permanently attached to the top tube 62 with adhesive, or the middle sections 66 can be integrally molded into the top tube 62. The top and bottom sections 67, 68, respectively, are permanently affixed to a back tube 69 using the same attachment method as the middle section 66. A permanent pin 70 is permanently inserted into the hinge 64 through the top, middle, and bottom sections 66, 67, 68. The second hinge 65 (not fully shown) utilizes a removable pin 71. The removable pin 71 is inserted into the second hinge 65 in the same manner as the permanent pin 70 is inserted into the first hinge 64. By grasping a handle 72 on the removable pin 71, the user may pull and remove the removable pin 71, so that when the front half of the frame 60 is folded it will pivot on the axis of the permanent pin 70. In this manner, the frame 60 can be folded approximately in half.

Still referring to FIGS. 1, 2, 5-8, and 11, the back tube 69 is described. The back tube 69 is a short, generally cylindrical component with approximately the same shape, and made from the same material, as the top tube 62. The back tube 69 extends rearward in substantially the same direction as the top tube 62 and terminates at a pulley mount 73. The pulley mount 73, made from the same material as the top tube 62, attaches, protects, and conceals a dependent pulley 24 in a cavity 74 within the pulley mount 73, and forms an attachment point for the back tube 69, top stays 76, and down stays 77. A pulley shaft hole 75 is also formed in the pulley mount 73, and is a location where a pulley shaft (not shown) is inserted through the top of the pulley shaft hole 75, then through the dependent pulley 24, and finally through the bottom of the pulley shaft hole 75. The pulley shaft may be secured with common fasteners, such as a lock nut or retaining ring, or any other suitable method.

Top stays 76 can be integrally formed with the pulley mount 73, or made separately and welded, glued, or otherwise bonded to the pulley mount 73. In one embodiment the top stays 76, one on the left side and one on the right side of the frame 60, are made from the same material as the rest of the frame 60, although in other embodiments a different material can be used. Similarly, the down stays 77 are also attached to the pulley mount 73 at a first end, and can be integrally molded or welded, or glued to the pulley mount 73. The down stays 77, in a preferred embodiment, are made of the same material as the top stays 76. The down stays 77, one on the left side and one on the right side of the frame 60, extend down and slightly rearward from the pulley mount 73, and are positioned on each side of the rear wheel 84. The down stays 77 are generally elongated tubes and become wider, or farther apart from each other and the rear wheel 84, near their second end to allow for attachment of cranks 15. Crank connectors 79 are positioned near the second end, near the bottom of the down stays 77, and a crank shaft 14 is attached to each crank connector 79, providing for arcuate motion of the cranks 15. The cranks 15 are positioned between the rear wheel 84 and the crank connectors 79. Joining the down stays 77, slightly above and closer to the rear axle 33, are crank stays 78. The crank stays 78, are made from the same material as the down stays 77, and serve to support and anchor the cranks 15. The crank stays 78 are generally elongated tubes that move closer together and closer to the rear wheel 84 at a second end near the rear axle 33. The crank stays 78 join the top stays 76 at a second end near the rear axle 33. Dropouts 63 can be either attached to the crank stays 78 or molded integrally into the crank stays 78. In a preferred embodiment, the dropouts 63 are constructed of steel or aluminum and serve as an attachment point for the rear axle 33. The rear wheel 84 is positioned between the crank stays 78, the down stays 77, and the top stays 76. The rear axle 33 is attached to the dropouts 63 with standard fasteners such as nuts and washers.

Referring now to FIGS. 9 and 10, the bicycle 100 can easily be made portable because the top tube 62 is the only component of the frame 60 attaching the front end to the rear end. The down tube, seat tube, and bottom bracket, components of the frame of a conventional bicycle are eliminated. If the front wheel 80 is removed, and the chest support 90 is collapsed and rotated down 180 degrees so that it is positioned between the frame 60 and the ground or riding surface, the bicycle 100 can be quickly folded to a small size. In addition to folding at the axis of the permanent pin 70, the frame 60 can also be made in two separate pieces (not shown) separated at the axis of the pulley shaft hole 75. In this configuration, a first section comprised of the head tube 61, the top tube 62, and the pulley mount 73 (the back tube 69 and the hinges 64, 65 are eliminated) extends to and terminates at the pulley shaft hole 75. A second section begins at the axis of the pulley shaft hole 75 and extends rearward. The second section is designed to contact the first section at two areas, one on the left side and one on the right side of both the first and second sections. The second section has a second pulley shaft hole 75b formed at the top and bottom concentric with and outside of the pulley shaft hole 75 on the first section. The pulley shaft is inserted first through the top portion of the second pulley shaft hole 75b, then through the top portion of the pulley shaft hole 75, then through the dependent pulley 24, then through the bottom portion of the pulley shaft hole 75, and finally through the bottom portion of the second pulley shaft hole 75b. When the pulley shaft is removed, the first and second sections of the frame 60 separate, splitting the bicycle 100 approximately in half.

Referring to FIGS. 2, 11, 12, and 14, a CVD 10 is disclosed. The CVD 10 includes two cranks 15a, 15b, which move in reciprocating motion when a user powers the CVD 10. From an original, resting position at the beginning of a stroke, the movement of the cranks 15 can be defined as a power stroke, which occurs when a crank 15 is depressed by a user, and a return stroke, which occurs when the crank 15 returns to its original position at the beginning of the stroke. In some embodiments, the cranks 15 are elongated members which begin with a crank pivot 17 at a first end, and have a first section 22 which is generally straight. In some embodiments, the crank pivot 17 is a through hole providing for attachment of the crank shaft 14. At a second end the cranks 15 include a pedal mount 18 for attachment of the pedals 16. A second section 19 of the crank 15 is designed to position the pedals 16 above the first section 22. In some embodiments, the second section 19 is curved upward so that the cranks 15 can be made from one piece and strength is maximized. In other embodiments, the second section 19 may extend from 10 to 90 degrees, or another angle (for example, 30, 40, 50, 60, 70, 80), to the first section 22. The second section 19 may also be welded to the first section 22, or attached by any other suitable method. The second section 19 serves three functions:

It provides clearance between the user and the frame 60, allowing the user to pedal higher and at a more favorable angle, thus maximizing power, It moves the user forward on the bicycle 100 so that the user's weight is distributed appropriately, and It lowers a crank pulley 23 so that a more favorable speed ratio is obtained through positioning of the crank pulley 23 relative to a drive pulley 28.

The cranks 15 can be made from aluminum, steel, titanium, plastic, a composite such as carbon fiber, or another suitable material. The pedals 16 can be conventional bike pedals or can be platforms that are welded or otherwise rigidly attached to the cranks 15. In one embodiment, the pedals 16 are platforms that have limited rotational capability to accommodate the bending of the legs while a user powers the CVD 10. The pedals 16 can be made from aluminum, steel, titanium, plastic, a composite such as carbon fiber, or another suitable material. The user places a foot on each pedal 16, and by alternately depressing each pedal 16a, 16b, delivers power to the CVD 10, which power is then transferred to a bicycle, scooter, exercise equipment, boat, submarine, plane, or any other human powered device.

Also attached to each crank 15 is the crank pulley 23. In some embodiments the crank pulley 23 is an idler pulley that serves to increase the speed ratio of the CVD 10. The crank pulley 23 can have an idler bearing 26 inserted into its bore to minimize friction. An idler shaft 27 is inserted through the idler bearing 26 and is then threaded into a pulley connector 20 to fasten the crank pulley 23 to the crank 15. Alternatively, the idler shaft 27 can be pressed into the pulley connector 20 or welded, or fastened with other conventional fasteners. In some embodiments the pulley connector 20 is a round through hole, but it can be made with a square, hexagonal, or any other suitable shaped hole. The hole can also be blind, and in some embodiments the idler shaft 27 can be made integral with the crank 15, eliminating the need for the pulley connector 20.

Also comprising part of the crank 15 are clamp mounts 21, which in a preferred embodiment are through holes located on the first section 22 of the crank 15. The clamp mounts 21 can be countersunk so that if a screw or bolt is used for attachment the heads will be flush with the crank 15. The clamp mounts 21 allow insertion of fasteners such as screws, bolts, or pins to provide attachment of cable clamps 29. In some embodiments, the cable clamps 29 are a strong, rigid component made from steel although titanium, aluminum, and other materials may be used. Each cable clamp 29 has two through holes to allow insertion of two machine screws. In some embodiments, the machine screws are inserted first through the clamp mounts 21, then through a first cable clamp 29A1, and then threaded into a second cable clamp 29A2. In other embodiments, the machine screws can be first inserted through the second cable clamp 29A2. In still other embodiments, only one cable clamp 29A is used and a dependent cable 31 is clamped between the crank 15 and the cable clamp 29A.

The dependent cable 31 is a flexible tension member that in some embodiments has minimal creep and a break strength greater than the maximum force exerted by the user. The dependent cable 31 can be constructed of a composite material such as Vectran or Kevlar, but can also be made from other materials, including steel. A first end of the dependent cable 31 is operably attached to the crank 15a, and at a second end it is operably attached to the crank 15b, with the above described cable clamps 29. At an area near its midpoint the dependent cable 31 wraps around the dependent pulley 24 so that when the crank 15a is depressed the crank 15b rises, and vice versa. In one embodiment, the dependent pulley 24 is constructed of aluminum, although steel, plastic (such as glass filled nylon), a composite material, or any other suitable material can be used. The dependent pulley 24 is an idler pulley and has a dependent bearing 32 attached at its center to minimize friction. The dependent pulley 24 is positioned in the cavity 74 of the frame 60 and the pulley shaft (not shown) is inserted through the top of the pulley shaft hole 75, through the bore of the dependent bearing 32, and then through the lower portion of the pulley shaft hole 75.

Figure 13:
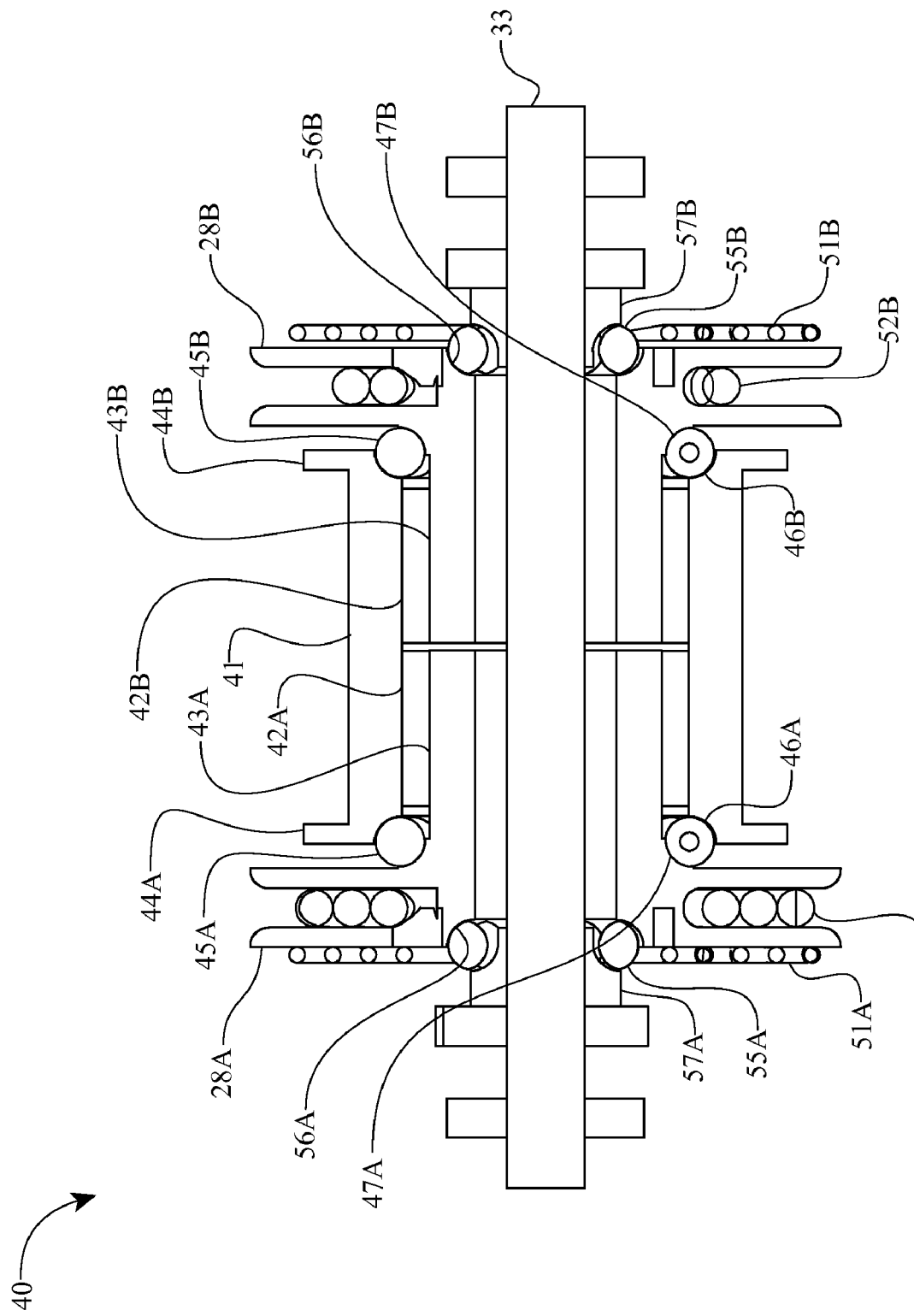
FIG. 13 is a cutaway section view of the hub of the CVD of FIG. 12.
Figure 14:
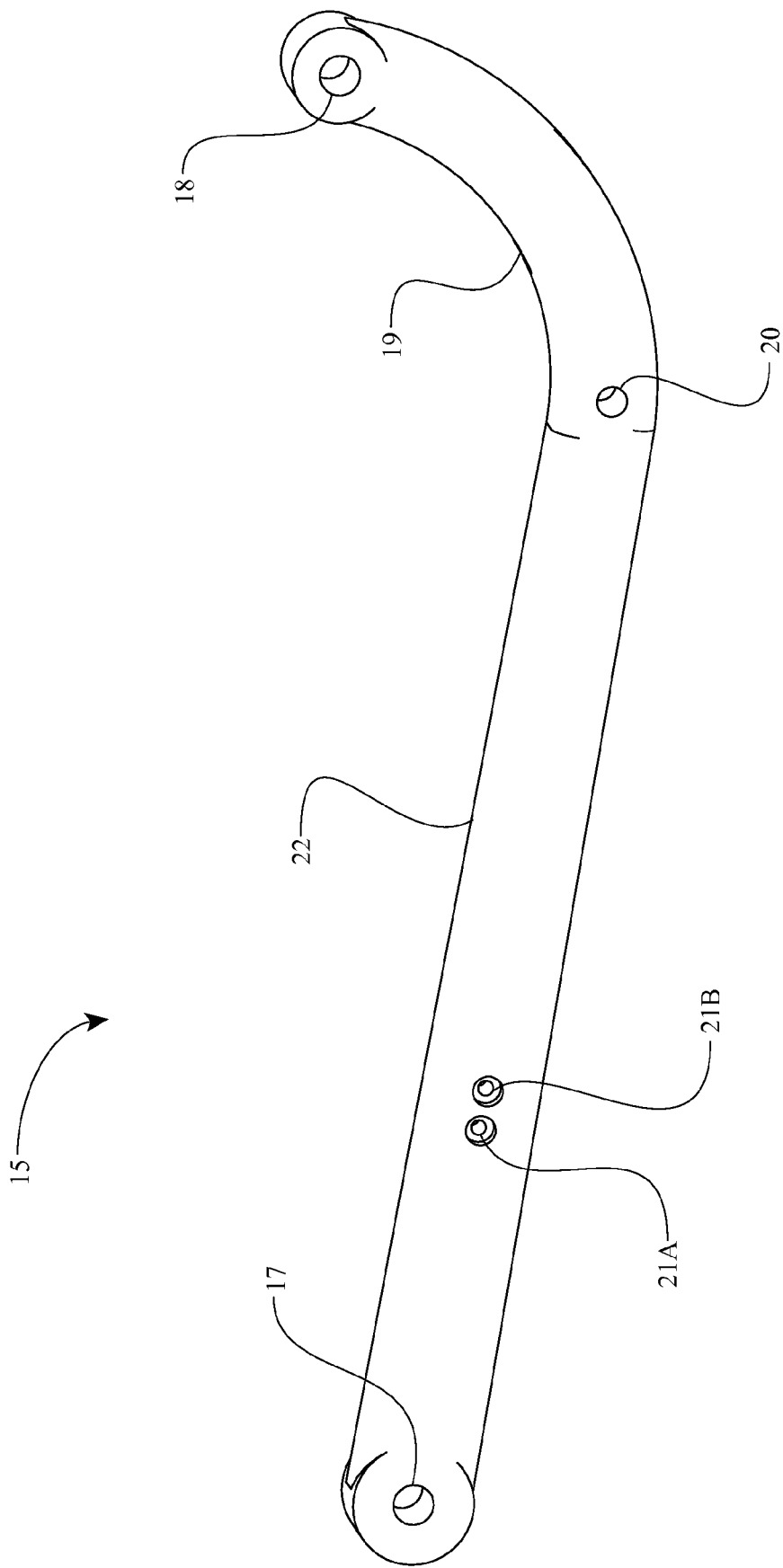
FIG. 14 is a perspective view of a crank of the CVD of FIG. 12.

Referring now to FIG. 13, the hub 40 of the CVD 10 is disclosed. The hub 40 is comprised of a hub shell 41, a generally cylindrical component that contains and protects the one way clutches 42, the torque drivers 43, and the rear axle 33. The hub shell 41 can be constructed of steel, aluminum, titanium, carbon fiber or another composite, or any other suitable material. In some embodiments, the hub shell 41 includes spoke flanges 44, so that the hub shell 41 can be attached to the rear wheel 84.

Attached to the hub shell 41 on its inside diameter are one way clutches 42. The one way clutches 42 each alternately provide torque to the hub shell 41, rotating the rear wheel 84. In some embodiments the one way clutches 42 are roller clutches of the type utilizing hardened steel pins circumferentially spaced around the inside diameter of the roller clutch housing. Hardened steel ramps are positioned around the pins, and springs are attached to the pins to provide for instant lockup of the roller clutch. In another embodiment, the one way clutch can be of the sprag clutch type, where one or more pawls contact ratchet teeth during lock up. The one way clutches 42 are rigidly attached to the hub shell 41 using an interference fit. They can also be attached with welding, adhesive, or standard fasteners. Contacting the roller clutch pins from the inside of the one way clutches 42 are torque drivers 43.

The torque drivers 43 in a preferred embodiment are hardened steel cylinders with a smooth outside diameter. The outside surface of the torque drivers 43 contact the one way clutches 42 using a tolerance so that when torque is transferred to the one way clutches 42 they lock up, thus rotating the hub shell 41. In some embodiments, when the clutch 42a is locked up and transferring torque, the clutch 42b is in clutch mode and freewheeling, and vice versa. The lock up mode of the clutch 42a occurs when the crank 15a is depressed, and the clutch 42b freewheels as the crank 15b is raised.

Still referring to FIG. 13, hub bearings 45 are positioned adjacent to and contact hub races 46 on each side of the hub shell 41. In a preferred embodiment, the hub bearings 45 are angular contact bearings although radial bearings or thrust bearings may be used. The hub bearings 45 are constructed from individual balls, although cylindrical rollers may be used. In one embodiment, the hub bearings 45 incorporate ball retainers, but individual balls or sealed cartridge bearings may also be used. The hub bearings 45 provide for relative movement between the hub shell 41 and the drive pulleys 28, and provide radial and axial support to the hub shell 41. The hub bearings 45 on a second side contact the pulley races 47, which contact and are attached to the drive pulleys 28. A second set of bearings, the axle bearings 55, are positioned adjacent to the drive pulleys 28, and provide radial and axial support to the drive pulleys 28. In some embodiments the axle bearings 55 are angular contact bearings but in other embodiments, they can be radial or thrust bearings. The axle bearings 55 on a first side contact the axle races 56 of the drive pulleys 28. On a second, side the axle bearings 55 contact races on cone nuts 57. In some embodiments, the cone nuts 57 are threaded nuts which can be screwed onto corresponding threads on the rear axle 33 and tightened up against the axle bearings 55. The rear axle 33 in one embodiment is a threaded rod that defines the longitudinal axis of the hub 40. The rear axle 33 is attached to the dropouts 63 (shown in FIG. 7) of the frame 60 using conventional fasteners such as threaded nuts and washers.

Referring to FIGS. 13, 15, and 16, the torque drivers 43 are rigidly attached to and rotate with the drive pulleys 28. The drive pulleys 28 are positioned on each side of the hub shell 41 and are concentric with the rear axle 33, which is also the longitudinal axis of the CVD 10. In some embodiments, the drive pulley 28, the torque driver 43, and the pulley race 47, are constructed from the same piece, preferably hardened steel. However, any one of these three components can be constructed separately, and of different materials. For example, the pulley race 47 and the torque driver 43 may be constructed of a separate piece of hardened steel and attached to the drive pulley 28, which can be constructed of aluminum, mild steel, titanium, plastic, a composite, or any other suitable material. The drive pulley 28 is a disc shaped component with an annular groove in its center to house a drive cable 52.

In some embodiments each drive pulley 28 contains a spring hole 48, a cable hole 49, and a clamp hole 50. The spring hole 48 provides a space for insertion of a first end of a return spring 51, which can be positioned concentrically with the rear axle 33. In some embodiments, the return spring 51 is made from spring steel wire and spirals radially away from the rear axle 33. The return spring 51 at a first end is attached to the drive pulley 28 via the spring hole 48. At a second end the return spring 51 is attached to the frame 60. Attachment to the frame 60 can be made with standard fasteners or a hole can be created in the frame 60 into which the second end of the return spring 51 can be inserted. In some embodiments the second end is the outside diameter (the larger diameter) of the return spring 51 and the first end is the inside diameter (the smaller diameter). The return spring 51 can be positioned so that the coils decrease in diameter as the return spring 51 is tensioned when a crank 15 is depressed during the power stroke. In some embodiments the return spring 51 only needs to provide enough tension to prevent the drive cable 52 from becoming slack on the return stroke. In other embodiments, the return spring 51 is strong enough to return the crank 15 to the beginning, or top of, the stroke. The tensioned return spring 51 rotates the drive pulley 28 in the opposite direction that it rotates during the power stroke, returning the drive pulley to its original position, and assists in lifting the crank 15 to a position at the beginning of the stroke. The spring hole 48 is slightly larger than the material comprising the return springs 51 and is a perforation in the side of the drive pulley 28 facing away from the center of the hub 40.

A radially located cable hole 49 positioned at the root of a drive groove 53 in the drive pulley 28 allows for insertion of a first end of the drive cable 52. In some embodiments the drive cable 52 is attached to the drive pulley 28 with a set screw (not shown) or another suitable fastener that is threaded into a clamp hole 50. The clamp hole 50 can be a tapped hole that is located on a side of the drive pulley 28 facing away from the center of the hub 40. The drive cable 52 is then wrapped around the drive pulley 28 within the drive groove 53 so that the drive cable 52 wraps around itself multiple times.

The number of winds of the drive cable 52 in the drive groove 53 varies considerably with the application, and in the case of a human powered vehicle, is dependent on the speed and diameter of the wheel, propeller, flywheel, or other rotating driven component. The number of winds of the drive cable 52 is also dependent on the size and physical condition of the user and also the diameter of the drive pulley 28. Generally, the drive cable 52 will have from two to six windings but in a few applications the drive cable 52 may be wound more than 12 revolutions around the drive pulley 28 and as few as ½ revolutions. In some applications, the drive cables 52 are wound a sufficient number of revolutions so that there is approximately one revolution left in the drive groove 53 when the cranks 15 are depressed and at the end of their power stroke. By controlling the amount of the drive cable 52 wrapped around the drive groove 53 and leaving approximately one revolution, less tension is applied to the first end of the drive cable 52. If possible, more than one revolution of the drive cable 52 should remain in the drive groove 53 so that the drive cable 52 is wrapped around itself and friction on the sides of the drive cable 52 and at the root of the drive groove 53 will absorb a significant amount of the tension created when the drive cable 52 is pulled. In one embodiment the root diameter surface of the drive groove 53 is knurled or otherwise roughened so that it grabs the drive cable 52 and distributes the tension on the drive cable 52 to a larger area, lessening the stress on the first end of the drive cable 52.

Figure 11:
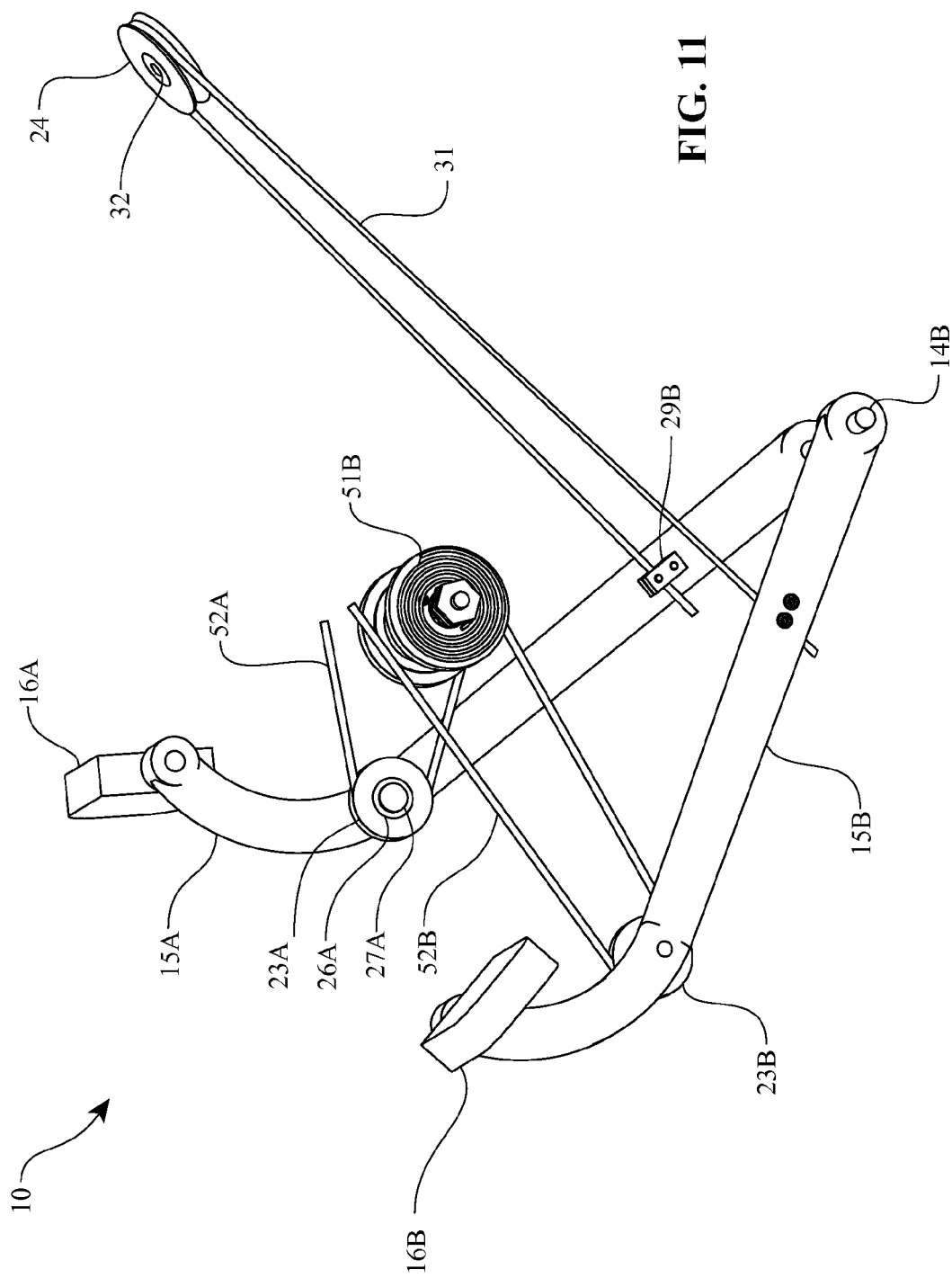
FIG. 11 is a perspective view of the CVD of the bicycle of FIG. 1.
Figure 12:
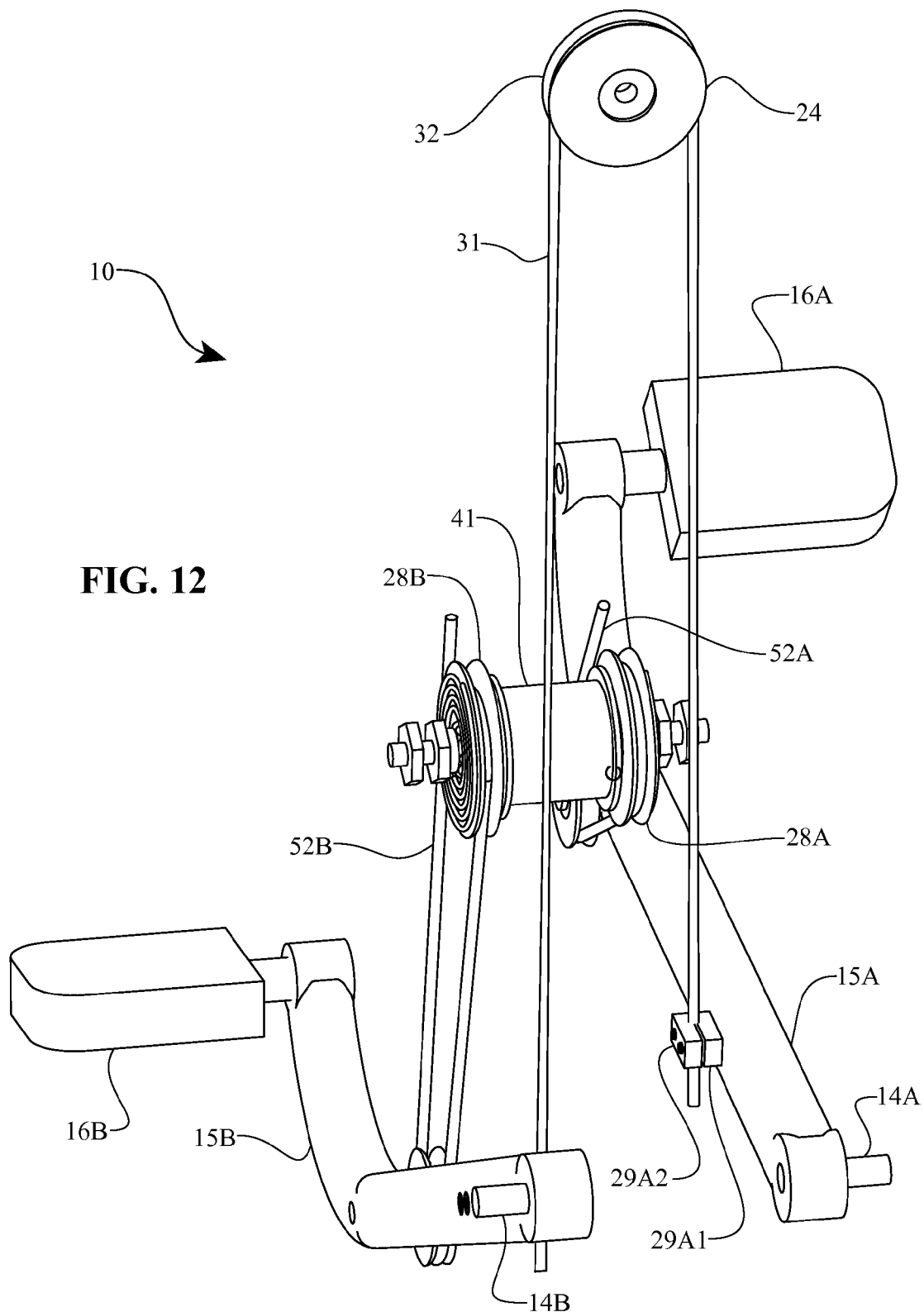
FIG. 12 is a second perspective view of the CVD of FIG. 11.

Still referring to FIGS. 13, 15, and 16, the drive cable 52, after being wound around the drive pulley 28, travels around the crank pulley 23 (seen in FIG. 11). In one embodiment the drive cable 52 wraps around the crank pulley 23 so that the drive cable 52 first contacts the crank pulley 23 on a forward side facing the hub 40, and it becomes disconnected, or leaves the crank pulley 23 on a rearward side facing away from the hub 40. In some embodiments, the drive cable 52 is routed in the opposite direction around the crank pulley 23 and the manner in which the drive cable 52 is wrapped around the crank pulley 23 is dependent on the desired rate of change of the stroke. The drive cable 52 terminates and is attached to a cable end 54, which is constructed of a rigid, strong material such as aluminum, steel, titanium. The cable ends 54 provide for clamping of a second end of the drive cable 52 using standard fasteners, and are rigidly attached to the frame 60. The cable ends 54 can be welded to the frame 60, fastened with machine screws, nuts, and washers, or any other suitable method. In one embodiment, the drive cable 52 is attached to the frame 60 directly with common fasteners and the cable ends 54 are eliminated.

Figure 17:
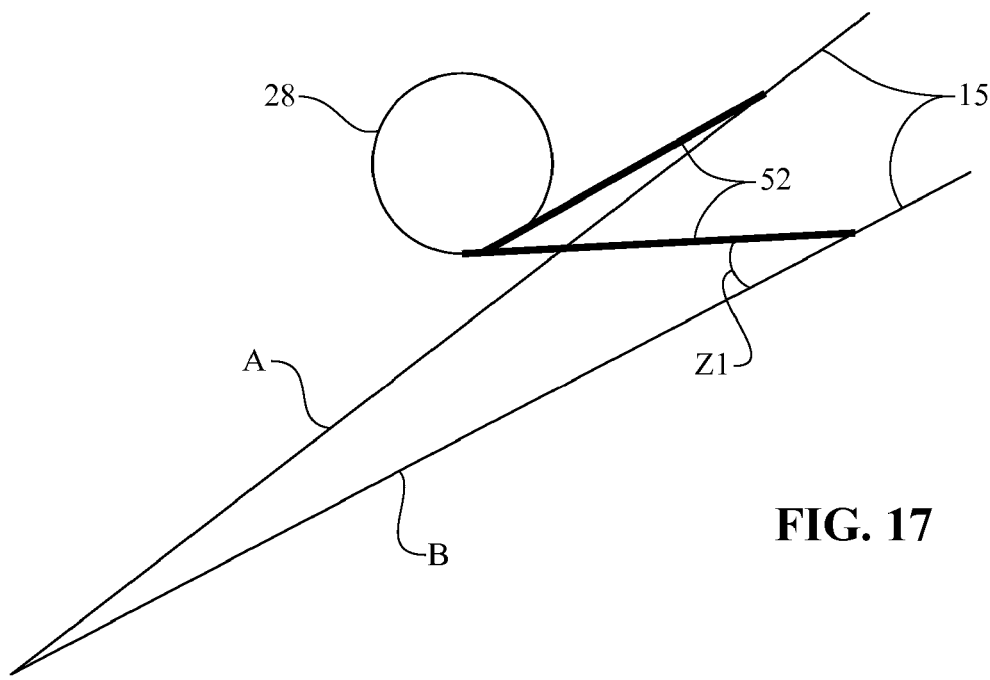
FIG. 17 is a schematic view of a portion of a CVD of FIG. 12 showing cable movement at different locations in a stroke.
Figure 18:
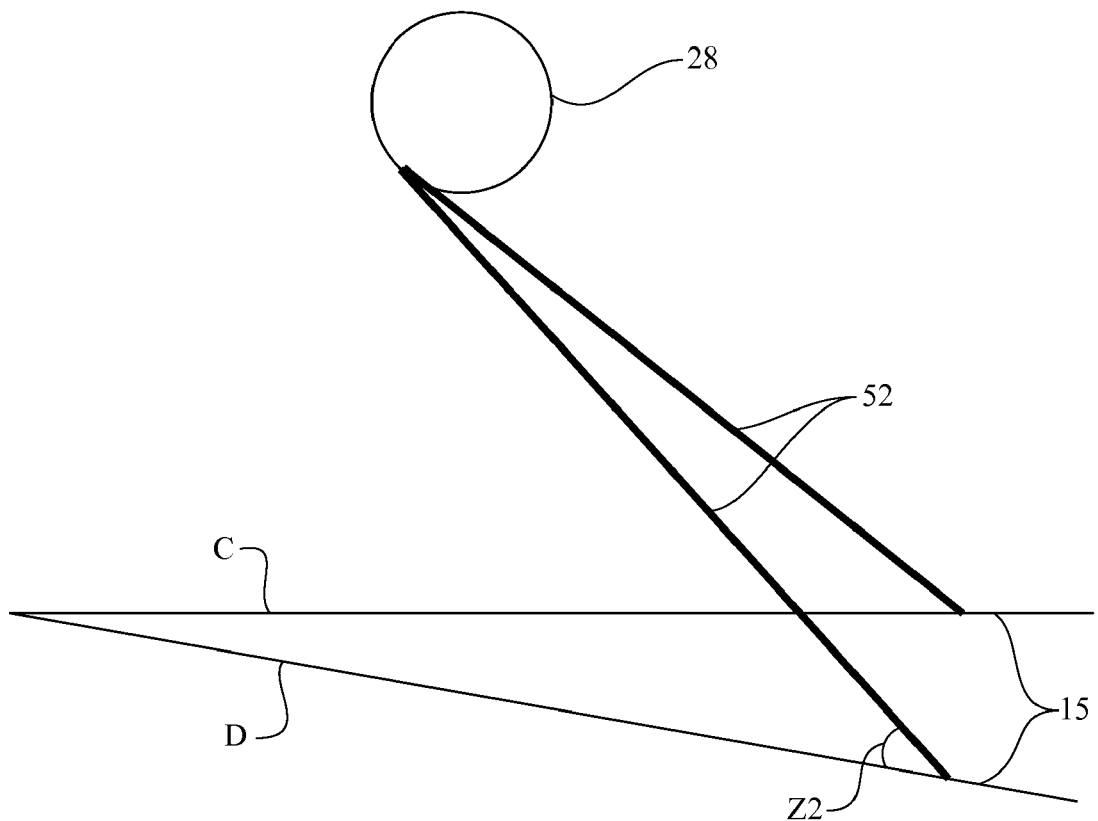
FIG. 18 is a second schematic view of a portion of a CVD of FIG. 12 showing cable movement at different locations in a stroke.

Referring to FIGS. 17 and 18, as the cranks 15a, 15b, alternately, are pushed and returned to the beginning of their stroke, the angle at which a crank 15 is positioned relative to a drive pulley 28 changes. This creates the opportunity to vary the speed and the torque at which the drive pulley 28 operates throughout the stroke. FIG. 17 is a schematic view of the crank 15, drive pulley 28, and drive cable 52. In FIG. 17, two positions of the crank 15 are depicted. In position A, which is the location of crank 15 at the beginning of a stroke, the drive cable 52 is shown attached directly to the crank 15. To make the explanation of the following principle easier to understand, the crank pulley 23 is not shown. In position B, the crank 15 has rotated 10 degrees relative to position A, which in some embodiments is approximately 33% of the length of the stroke. In other embodiments, the stroke length can be made longer or shorter depending upon the size of the user, the size and rotational speed of the wheel, propeller, flywheel, or other rotating driven component, and the diameter of the drive pulley 28. As can be seen in FIG. 17, the difference between the length of the drive cable 52 in positions A and B is very small. In position B, the length of the drive cable 52 is approximately 20% longer than in position A. In some embodiments, this results in the drive pulley 28 rotating a small amount, and when the CVD 10 is used with a bicycle 100, produces a lower speed of the rear wheel 84.

Referring now to FIG. 18, positions C and D of the crank 15 are depicted. The difference between positions C and D is again 10 degrees, or approximately 33% of the stroke length. Position D represents the crank 15 position at the end of a stroke. It is easily seen in FIG. 18 that the drive cable 52 is longer in position D than in position C. It can be seen by comparing FIGS. 17 and 18 that the drive cable 52 travels over 50% farther with the same 10 degrees of movement of the crank 15 in FIG. 18 than in FIG. 17. This increase in travel of the drive cable 52 increases the speed of rotation of the drive pulley 28 and the speed of rotation of rear wheel 84. The acceleration of the rear wheel 84 changes continuously with respect to time from the beginning of the stroke to the end of the stroke. The continuously (over time) variable speed and torque change can be adjusted by varying the position of the crank pivot 17, the length of the crank 15, the position of drive pulley 28 relative to crank 15, the diameter of drive pulley 28, the position and diameter of the crank pulley 23, the diameter of drive cable 52, and the length of the cable, among other things. Generally, when the crank 15 is at a larger angle relative to the drive cable 52, the crank 15 creates more rotation of the drive pulley 28 for an equivalent distance traveled through the stroke. If the crank 15 is at a small angle relative to the cable 52, the crank 15 will typically produce a small amount of rotation of the drive pulley 28 when the crank 15 is depressed during a stroke. An angle Z between the drive cable 52 and the crank 15 changes continuously throughout the stroke and will cause changes in the rotational speed of the drive pulley 28 if all other variables remain the same. Generally, an angle Z2 of the drive cable 52 relative to the crank 15 is greater at the end of a stroke relative to an angle Z1 at the beginning of a stroke; this results in increased rotation of the drive pulley 28 at the end of a stroke compared to the beginning of a stroke if all other variables remain the same. The change in rotation of the drive pulley 28 is continuously variable.

Figure 20:
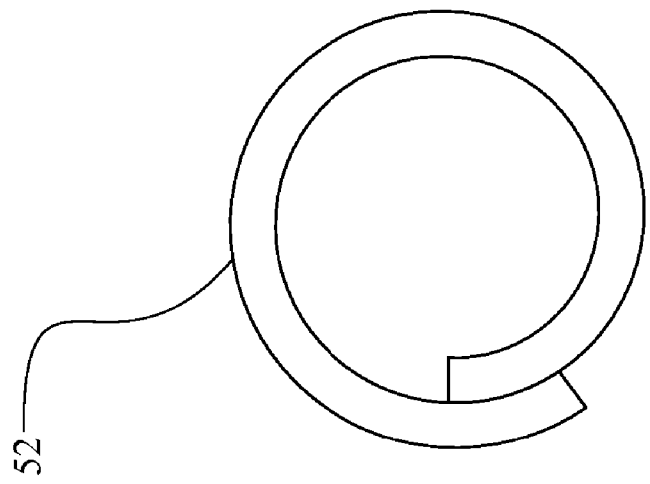
FIG. 20 is a schematic view of a drive cable at the end of the stroke.
Figure 19:
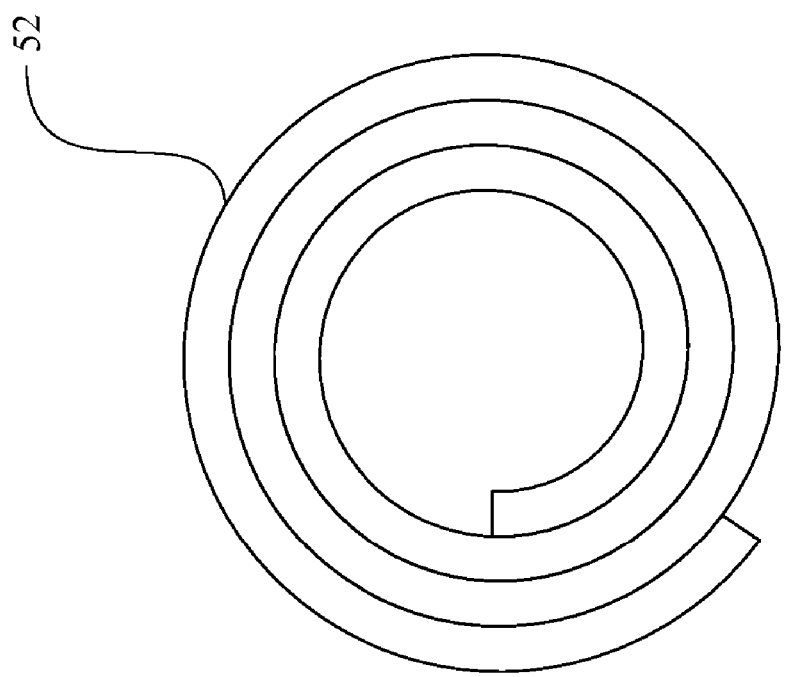
FIG. 19 is a schematic view of a drive cable at the beginning of a stroke.

Referring to FIG. 19, a schematic view of the position of the drive cable 52 wrapped around the drive pulley 28 at the beginning of a stroke is depicted. To make the explanation of the following principle easier, the drive pulley 28 has been hidden. It can be seen that the drive cable 52 has been wound around the drive pulley 28 approximately 3.15 times. Referring to FIG. 20, a schematic view of the position of the drive cable 52 at the end of a stroke is depicted. To make the explanation of the following principle easier, the drive pulley 28 has been hidden. It can be seen that the drive cable 52 has unwound from the drive pulley 28 so that the number of revolutions remaining is approximately 1.1.

At the beginning of a stroke, the drive cable 52 has a larger diameter, which decreases speed and increases torque at the drive pulley 28 relative to the smaller diameter of drive cable 52 at the end of a stroke. This variation in speed and torque is continuously variable, meaning that the speed and torque at the drive pulley 28 changes continuously with respect to time throughout the stroke. The rate at which the speed and the torque changes can be varied and is controlled by the root diameter of the drive pulley 28, the diameter of the drive cable 52, the number of revolutions the drive cable 52 is wrapped around the drive pulley 28, the length of the crank 15, the length of the stroke, and other variables.

By combining an increase in speed inherent in the change in angular position of the crank 15 relative to the drive pulley 28, and the decrease in diameter of the drive cable 52 during the power stroke, a significant increase in speed can be realized at the end of the stroke. Significantly, the increase in speed is non-linear and increases rapidly toward the end of the stroke as the rate of change, or percentage of, the decrease in the diameter of the drive cable 52 accelerates. Simultaneously, the angle of the crank 15 relative to the drive pulley 28 increases the amount of drive cable 52 pulled. The combined effect of these two phenomena creates a seamless increase in speed throughout the stroke. This speed increase is difficult to realize on a CVD bicycle because the bicycle begins to accelerate rapidly, the cranks 15 become difficult to depress, and significantly more force is required to be applied by the user. The amount of acceleration can be controlled through proper design of the CVD 10. In some embodiments, the increase in force required to reach the end of the stroke is insufficient under normal operating conditions. This means that the cranks 15 will slow down and stop on the power stroke before reaching the end of the stroke unless the user applies significant power. This eliminates the loss in kinetic energy at the end of each stroke.

Referring to FIG. 1, the end of the power stroke occurs when the opposite crank 15 on its return stroke contacts the frame 60. In another embodiment, an intermediary component (not shown) positioned between the crank 15 and the frame 60 stops the return stroke of the crank 15. This intermediary component can be constructed of a resilient material such as urethane or rubber and can be adjusted to suit the preference of the user. The intermediary component can be attached to the frame 60 with common fasteners.

Referring now to FIGS. 1 and 11-13, the length and position of the stroke can be controlled by varying the length and the position of the drive cables 52 and the dependent cable 31. The length of the dependent cable 31 can be adjusted by loosening the two machine screws that are inserted into the clamp mounts 21 of a crank 15. This loosens the force that the cable clamps 29 apply to the dependent cable 31. The length of the dependent cable 31 can then be lengthened or shortened. If the dependent cable 31 is lengthened the cranks 15 move farther away from the dependent pulley 24, or closer to the ground when the CVD 10 is used in conjunction with the bicycle 100. This changes the position of the user on the bicycle 100 and changes the speed of the bicycle 100. When the cranks 15 move farther from the dependent pulley 24, the distance between each of the cranks 15 also increases and unwinds some of the drive cable 52 from the drive pulleys 28. This increases the speed ratio of the CVD 10 and the bicycle 100.

The length of the drive cables 52 can be adjusted in the same manner. If the fasteners attaching the drive cables 52 to the cable ends 54 are loosened, the drive cables 52 can be lengthened or shortened. If the drive cables 52 are lengthened, the return springs 51 wind the additional drive cable 52 onto the drive pulleys 28, decreasing speed and increasing torque to drive pulleys 28. If the drive cables 52 are shortened, speed increases and torque decreases. Thus, the user can configure the speed ratio of the CVD 10 to suit his or her personal preference.

Figure 21:
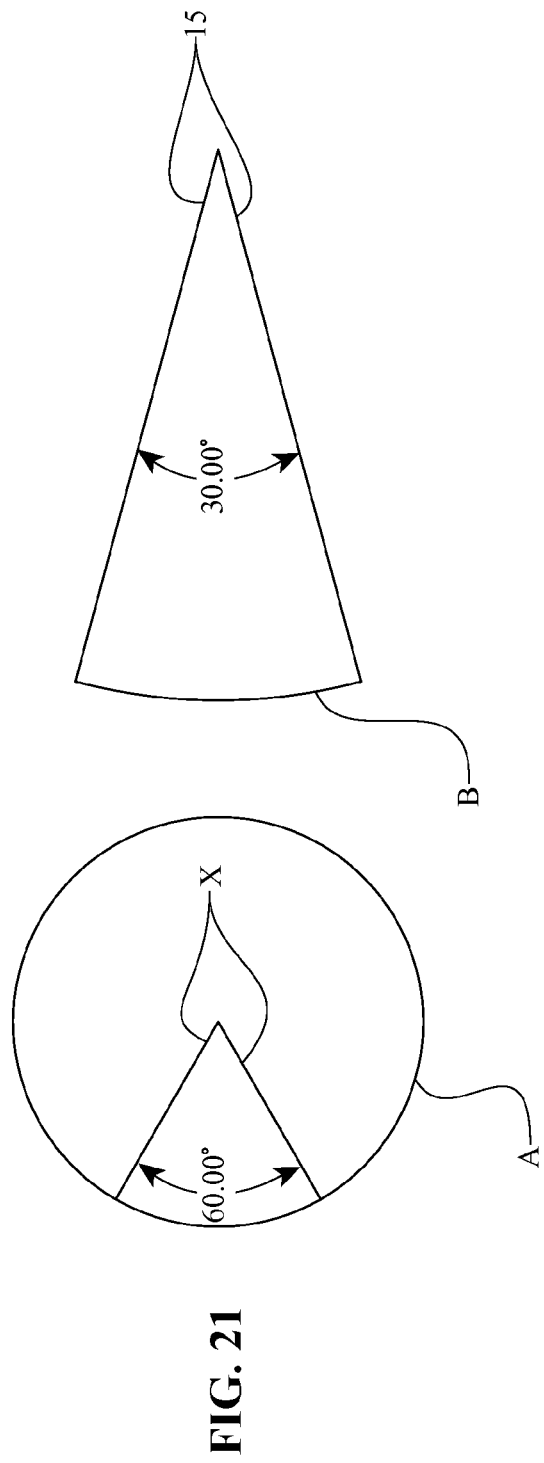
FIG. 21 is a graphical comparison of a stroke of the bicycle of FIG. 1 with the stroke of a conventional bicycle.
Figure 22:
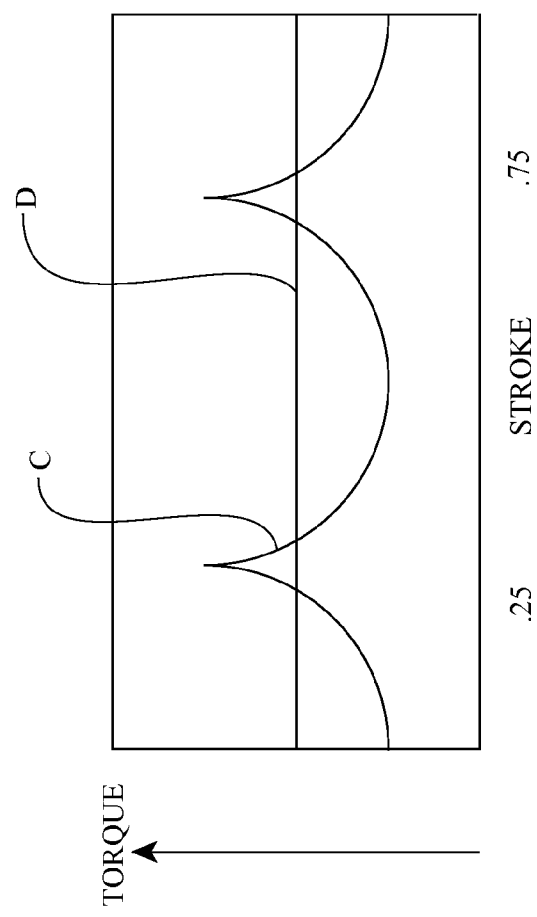
FIG. 22 is a chart showing stroke torques of the bicycle of FIG. 1 and a conventional bicycle.

Referring now to FIGS. 21 and 22, a stroke comparison is made between a traditional rotary stroke on a bicycle and the stroke of the CVD 10. Referring to FIG. 21, a circle A depicts the stroke of a traditional bicycle. Significantly, less than 90 degrees of a 360-degree stroke produces power, and only about 60 degrees of the stroke efficiently produces power, shown by the 60-degree sign between the upper and lower positions X of a conventional bicycle crank. The conventional rotary stroke only becomes very efficient through about half, or 30 degrees of the 60-degree stroke. The arc B depicts the length of the stroke of the CVD 10, which very efficiently produces power through an approximately 30 degree range. Importantly, the user's legs do not move nearly as much as in a conventional rotary stroke, lowering stress on the knees and other joints, and reducing muscle fatigue.

Referring to FIG. 22, torque is compared between a conventional rotary stroke and the CVD 10 stroke. Increasing torque is plotted on the vertical Y axis on the left side of the graph, while the horizontal X axis depicts time, or the percentage of the stroke completed. The curve C denotes the torque of a conventional rotary bicycle drivetrain through one complete stroke. As the user passes through the 60-degree portion of the stroke where power is produced, a significant torque spike occurs. This torque spike occurs twice per revolution, as a first leg and then a second leg pass through the power portion of the stroke. The torque of the stroke drops sharply when the cranks are substantially vertical, at the beginning and halfway through the stroke. To reduce the size of the torque spike and to maintain momentum through the power portion of the stroke, the user must maintain a high cadence to transfer power efficiently.

The curve D denotes the torque through the stroke of the CVD 10. Torque is steady and level throughout the stroke because not only are the degrees of rotation through the stroke small (between 20-40 degrees in some embodiments) and ideally configured to produce power, but also because the radius of the drive cable 52 to the center of the drive pulley 28 decreases as the crank 15 moves through the power phase of the stroke. This action decreases torque. Concurrently, as the legs straighten the leg muscles become more efficient and produce more force towards the end of the stroke, offsetting the decrease in distance of the drive cable 52 to the center of the drive pulley 28. Still referring to FIG. 22, the maximum torque produced by the CVD 10 is lower than a conventional rotary drivetrain, reducing stress on the user and the CVD 10 components, but the average torque is higher. This occurs because much more of the user's weight is applied to the pedals 16, due to the fact that there is no seat. Thus, the force applied to the pedals 16 is much greater.

Figure 23:
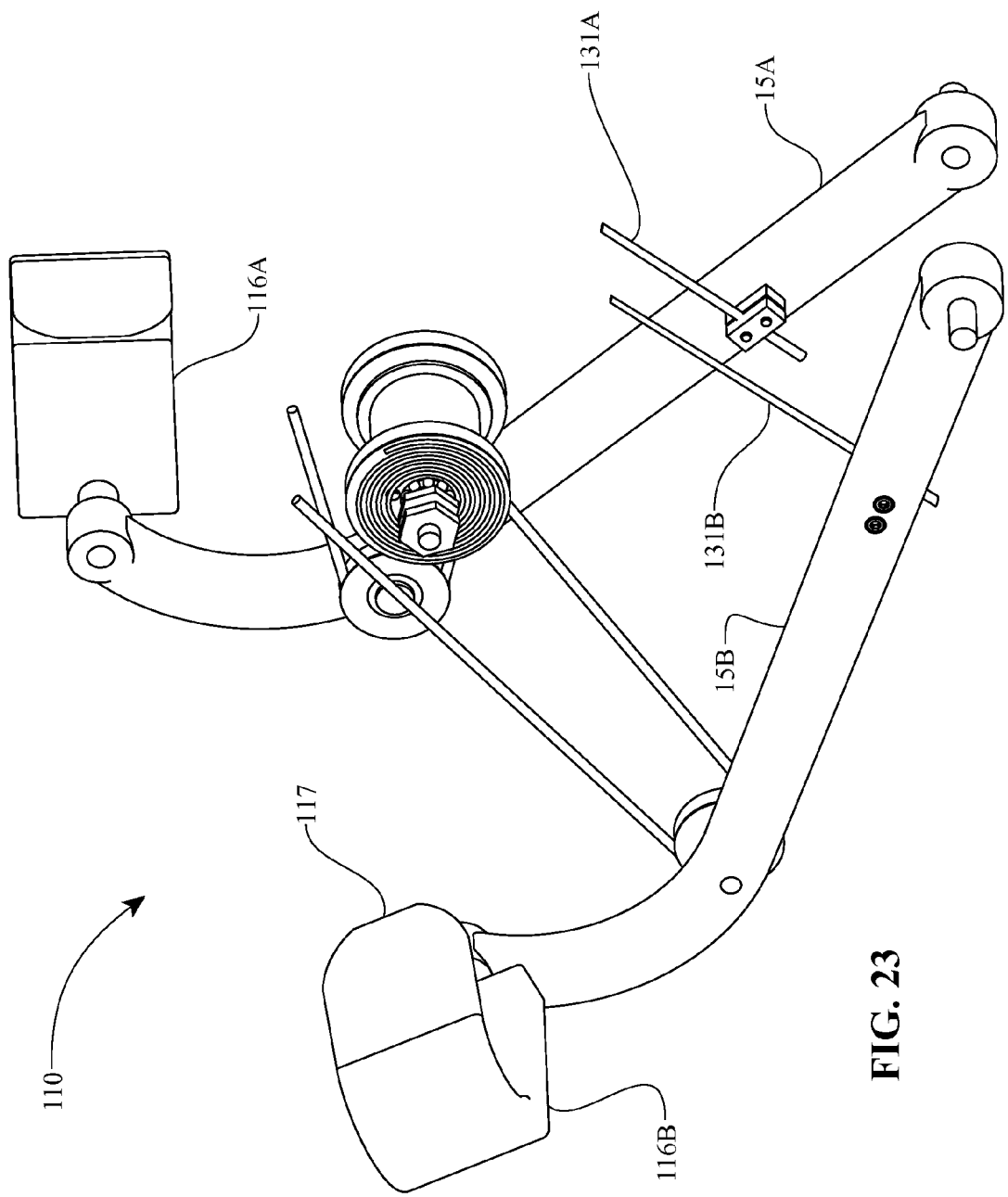
FIG. 23 is perspective view of an alternative CVD.

Referring now to FIG. 23, an alternative CVD 110 with an independent stroke is described. For simplicity, only the differences between the CVD 110 and the CVD 10 will be discussed. The dependent cable 31 is removed and replaced by two independent cables 131a, 131b, which are attached to the cranks 15a, 15b, respectively. At a second end, the independent cables 131 attach to the frame 60. The independent cables 131 can use common fasteners or cable clamps 29 for attachment to the frame 60. Because the dependent cable 31 is eliminated, in some embodiments the crank 15a does not return to its original position when the crank 15b is in its power stroke, and vice versa. This requires that a stop be implemented to end the power stroke of the CVD 110. The independent cables 131, which like the dependent cable 31 are flexible tension members, accomplish this purpose by becoming taut at the end of the power stroke. The length of the independent cables 131 can be adjusted in the same manner as the dependent cable 31. Independent pedals 116 replace the pedals 16 of CVD 10. The independent pedals 116, allow the user to pull the cranks 15 on the return stroke. In some embodiments, a cover 117, attached to the pedals 116, covers the tops of the user's feet. In other embodiments, the pedals 116 incorporate toe clips (not shown) so the user can pull the cranks 15. In still other embodiments, the independent pedals 116 can be clipless pedals and the user wears matching clipless shoes which engage and attach to hooks or other fasteners on the independent pedals 116. In still other embodiments, the return spring 51 (shown in FIG. 11) is configured to lift the cranks 15 during the return phase of the stroke, and the independent pedals 116 are not needed to raise the cranks.

Still referring to FIG. 23, the user can adjust the length of the stroke as with CVD 10, but can also adjust the height of the stroke by lifting the cranks 15 higher when pedaling, which produces a slower speed and a higher torque. The user can also depress the cranks 15 farther on the power stroke, increasing the speed and reducing the torque. Significant ratio changes in the speed and torque of the CVD 110 can be achieved in this manner. The user can also pedal with one foot only or with both feet at the same time.

Figure 24:
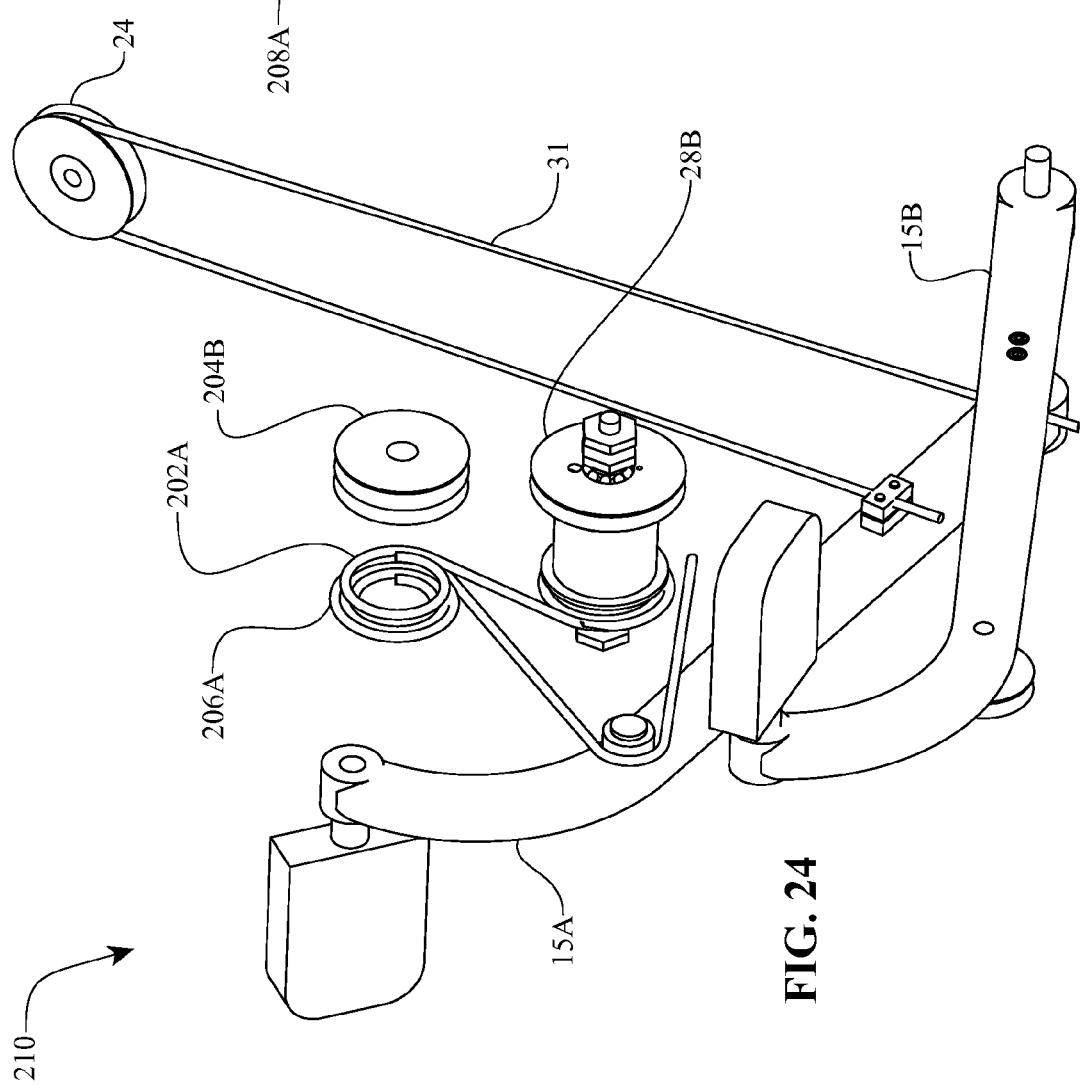
FIG. 24 is a perspective view of yet another alternative CVD.
Figure 25:
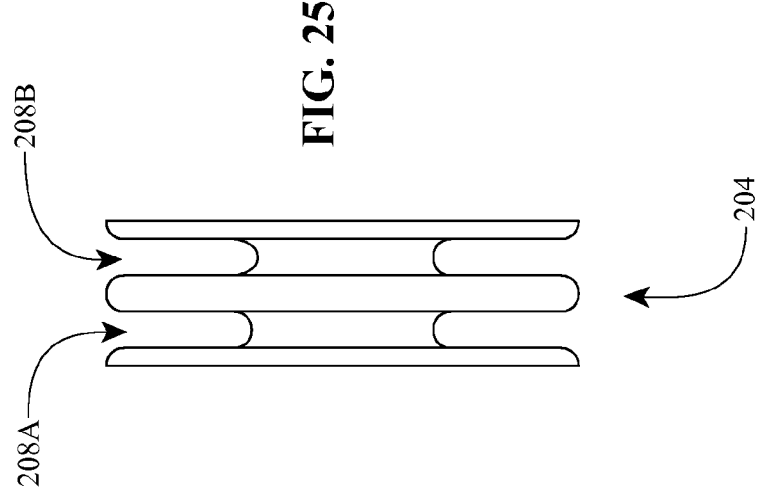
FIG. 25 is a front view of a pulley used in the CVD of FIG. 24.

Referring now to FIGS. 11, 24, and 25, an alternative CVD 210 with a compound pulley 204 is disclosed. For simplicity, only the differences between the CVD 210 and the CVD 10 will be described. On one side of FIG. 24, side a, the drive pulley 28a, crank pulley 23a, and compound pulley 204a have been hidden so that the drive cable 202a and the compound cable 206a are visible. On side b of FIG. 24, the drive cable 202b and the compound cable 206b have been hidden so that compound pulley 204b is easily visible. The CVD 210 is similar to the CVD 10, but the CVD 210 includes compound pulleys 204a, 204b. In one embodiment, the compound pulleys 204 attach to the frame 60 in the same manner that the crank pulley 23 connects to the crank 15. The compound pulleys 204 can be made of the same material and in the same fashion as the drive pulleys 28. The drive cable 202 travels from the drive pulley 28 to a first compound groove 208a in compound pulley 204. The drive cable 202 wraps around a first compound groove 208a in the compound pulley 204a, and the drive cable 202 fastens to the compound pulley 204. Compound cable 206 wraps around a second compound groove 208b in the compound pulley 204 and fastens to the compound pulley 204. In some embodiments, the Compound cable 206 then wraps around the crank pulley 23 before terminating at the frame 60.

Still referring to FIGS. 11, 24, and 25, the compound pulley 204 increases the speed change of the CVD 210 during a stroke, as compared to the stroke of the CVD 10. The drive cable 202 winds onto the compound pulley 204 during a power stroke, while the compound cable 206 unwinds. This creates easy pedaling at the beginning of the power stroke, rapidly increasing the speed of the drive pulley 28, and thus the difficulty of pedaling toward the end of the power stroke. The speed change can be varied by making the first and second compound grooves 208a, 208b different diameters, and by changing the diameter of the compound pulley 204 relative to the drive pulley 28.

Figure 26:
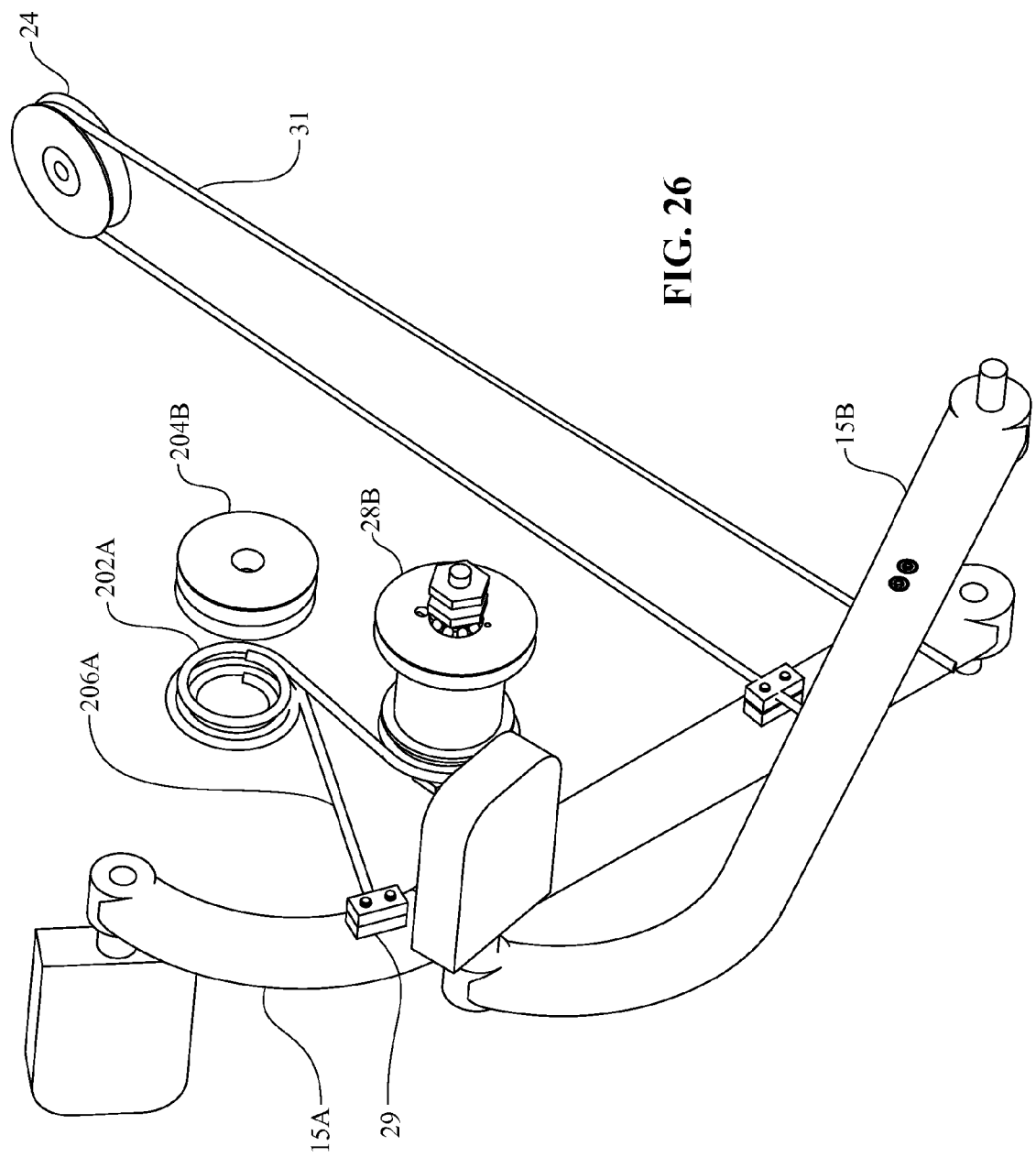
FIG. 26 is a perspective view of yet one more alternative CVD.

Referring now to FIGS. 11, 24, and 26, an alternative CVD 310 with a compound pulley 204 is disclosed. For simplicity, only the differences between the CVD 310 and the CVD 10 will be described. The CVD 310 substantially similar to the CVD 210, and FIG. 26 is depicted in the same way as FIG. 24. In the CVD 310 the crank pulley 23, the idler bearing 26, and the idler shaft 27 are not used and, rather, the compound cable 206 attaches to the crank 15 instead of to the frame 60. Additional cable clamps 29 are used to attach the compound cable 206 to the crank 15.

Figure 27:
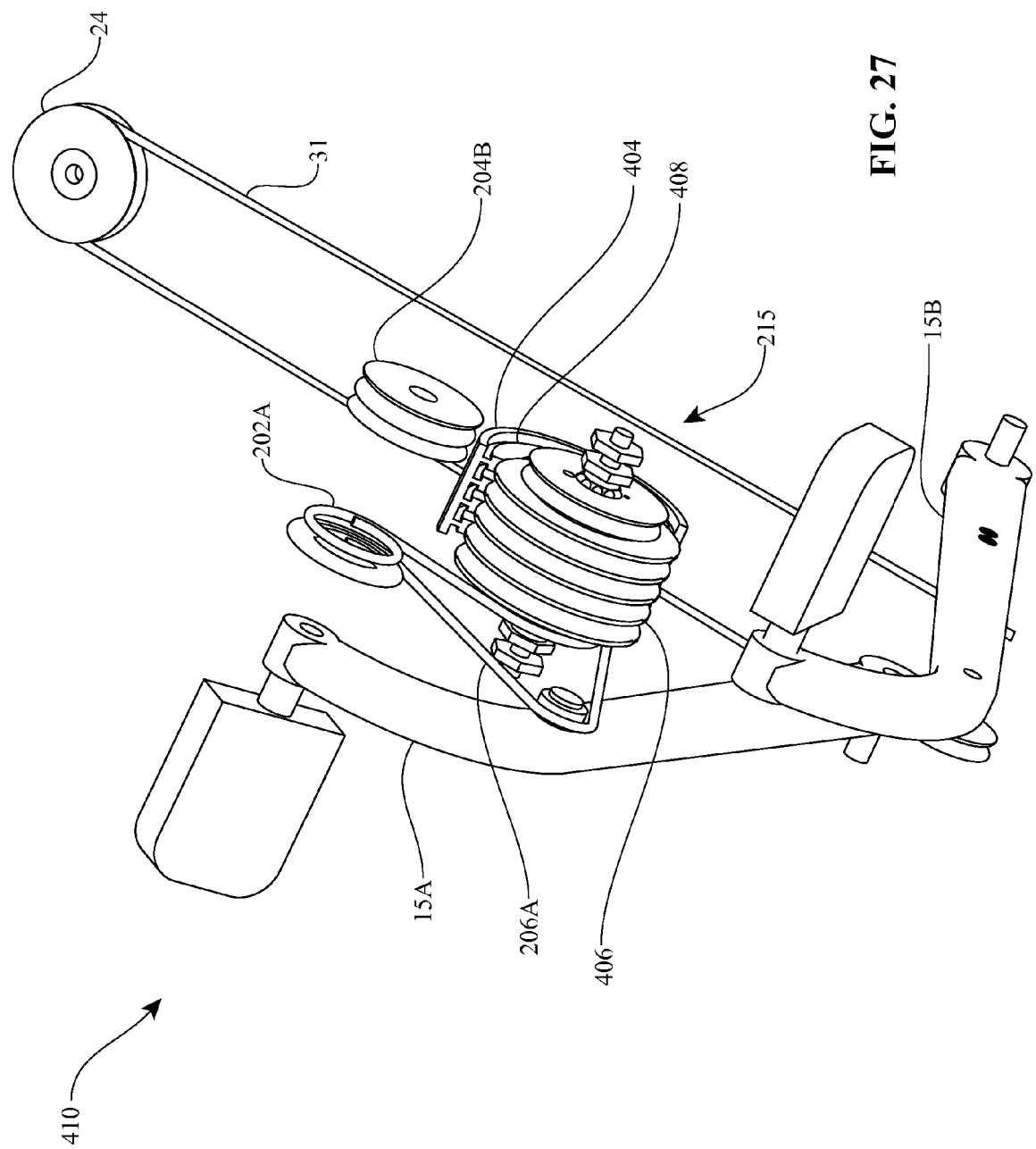
FIG. 27 is a perspective view of a CVD that can be used in exercise equipment.

Referring now to FIG. 27, an alternative CVD 410 is disclosed. For simplicity, only the differences between the CVD 410 and the CVD 210 will be described. The CVD 410 is substantially similar to the CVD 210, except that the CVD 410 is configured with an integral brake or generator 215. In some embodiments, an annular flux disc 406 is pressed onto the hub shell 41 with an interference fit. The flux disc 406 can be made from high conducting material, such as aluminum or copper. The flux disc 406 has multiple annular grooves, similar to those in the compound pulley 204. A brake 404, which can be constructed of steel, plastic, a composite, or another suitable material, has annular protrusions which are designed to be inserted into the space between the annular grooves of the flux disc 406. The brake 404 is designed to fasten to a frame or other rigid structure. In one embodiment, a nut (not shown) attaches to the brake and a bolt (not shown) threads into the nut. The bolt and the nut control the position of the brake 404 relative to the flux disc 406. Brake magnets 408, which are glued or fastened with common fasteners to the sides of the protrusions of the brake 404, fit into the spaces between the annular grooves of the flux disc 406 with a small amount of clearance. When the CVD 410 is powered by a user, resistance is controlled by positioning the brake 404 closer or farther from the flux disc 406 by rotating the bolt. When the brake magnets 408 move farther into the flux disc 406, more resistance is created, and vice versa. The resistance for the CVD 410 is created without any contacting parts. The brake magnets 408 can also be the magnets used in a permanent magnet generator and the flux disc 406 can be modified to become the armature of a permanent magnet generator. In this embodiment, the resistance, or braking, produced by the permanent magnet generator is converted to electricity.

Figure 28:
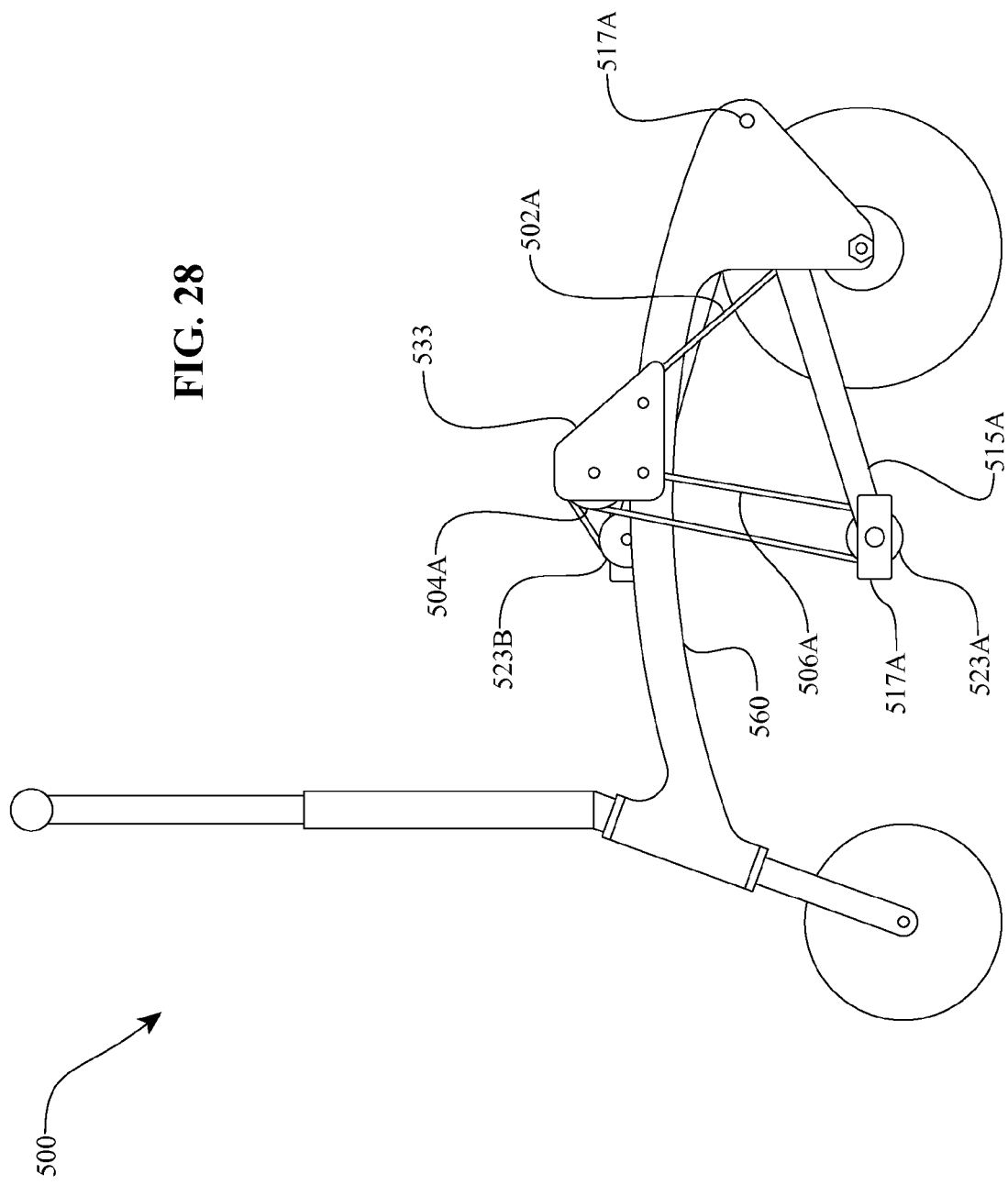
FIG. 28 is a side view of a scooter using a CVD.

Referring now to FIG. 28, a scooter 500 utilizing a CVD 510 similar to the CVD 210 is disclosed. For simplicity, only the certain features of the scooter 500 will be explained. In a preferred embodiment, the crank pulleys 523 are near the end of the cranks 515 (the end where the pedals 517 attach to the cranks 515) to maximize the amount of travel of both the drive cable 502 and the compound cable 506. The crank pivots 517 are located near the back of the rear wheel to maximize the length of the cranks 515. A cover 533, which attaches to the frame with common fasteners or by welding, provides attachment for the compound pulleys 504. In other embodiments, the compound pulleys 504 can be attached to the frame with common fasteners. In one embodiment, the compound cable 506 attaches to the cover 533, while in other embodiments the compound cable 506 attaches to the frame 560.

Figure 29:
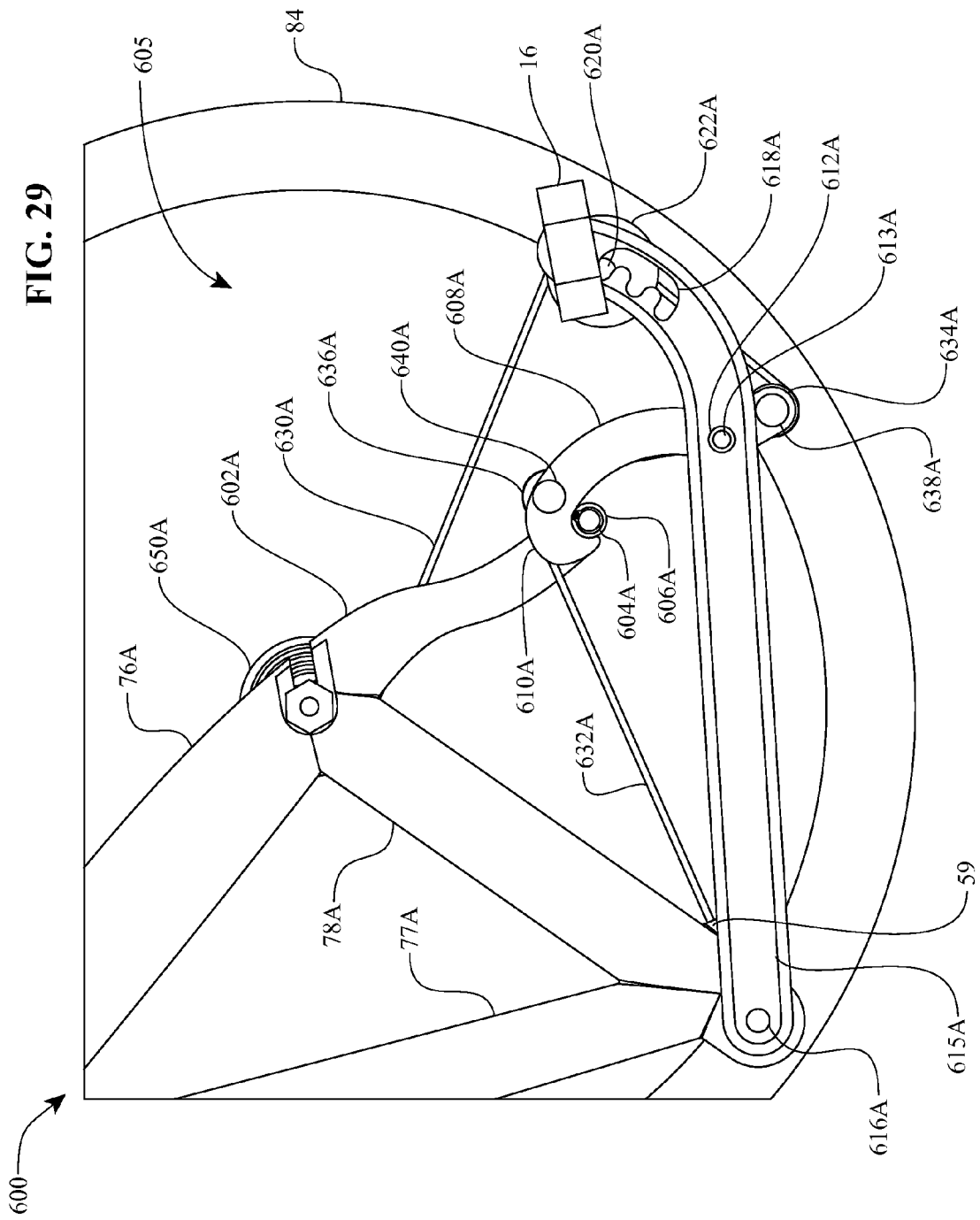
FIG. 29 is a side view of yet another alternative CVD.
Figure 30:
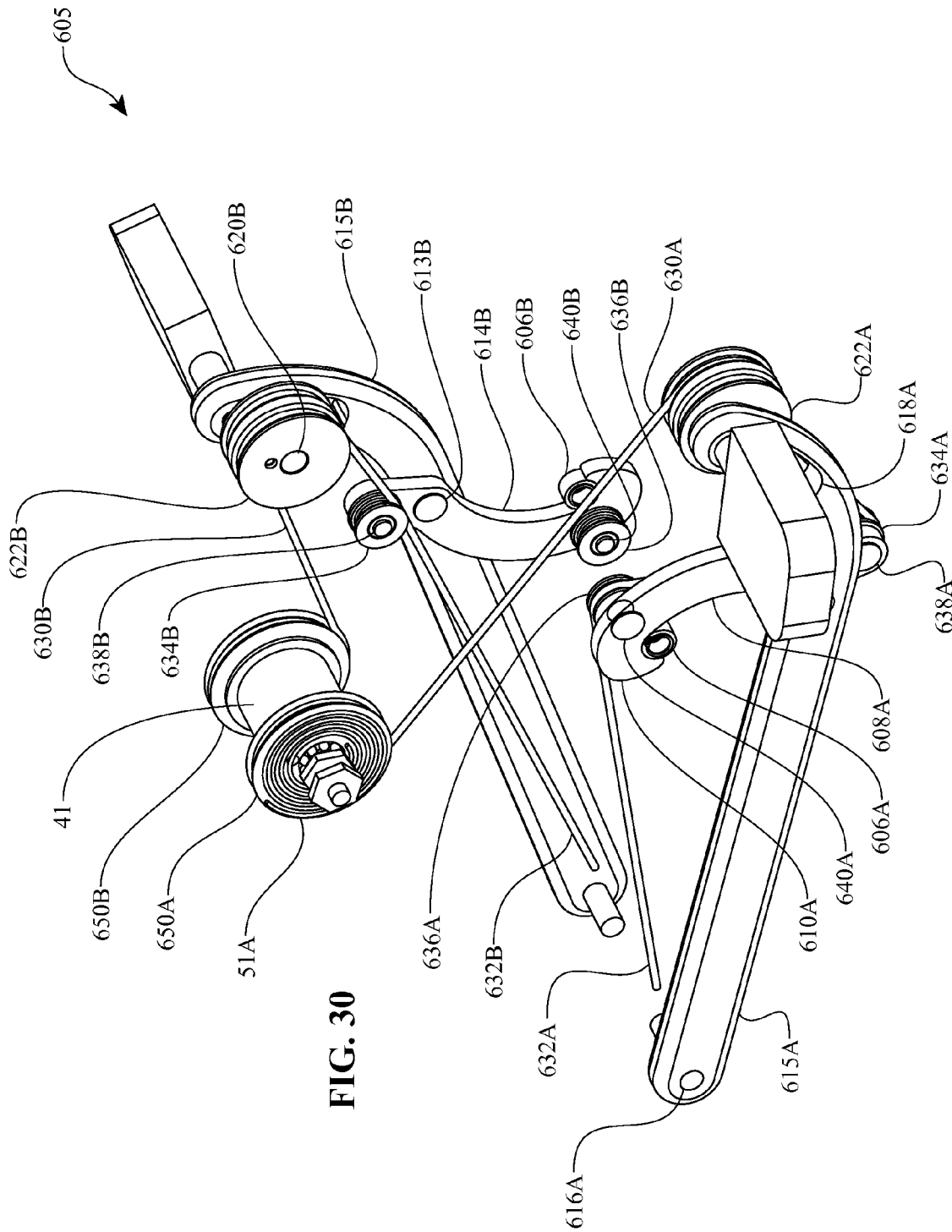
FIG. 30 is a perspective view of the CVD of FIG. 29.

Referring now to FIGS. 29 and 30, an alternative CVD 605 used on a bicycle 600 is described. For simplicity, only the differences between the bicycle 100 and the bicycle 600 will be described. The frame 62 of the bicycle 600 can be substantially similar to frame 60 of the bicycle 100 but can have a frame tail 602. The frame tail 602, in one embodiment, extends rearward and downward from the crank stay 78. At a first end, the frame tail 602 can be attached to the frame 62 by welding, with fasteners or adhesive, or any other suitable method to produce a strong, rigid connection. The frame tail 602 is preferably a strong, rigid, part of the frame 62 having a hole to accept a lever stop 604. The lever stop 604 in some embodiments is a hardened pin, but the lever stop 604 can also be configured as a shaft for a bearing. In some embodiments, a lever bushing 606 fits over the lever stop 604 and is held in place by a retaining ring that is inserted into a groove in the lever stop 604 (not shown). The lever bushing 606 can be a low friction cylindrical component that provides for relative motion between the lever stop 604 and the lever bushing 606. In other embodiments, the lever bushing 606 can be a roller bearing, such as a needle roller or radial bearing.

Still referring to FIGS. 29 and 30, a lever crank 615 can be substantially similar to the crank 15 of bicycle 100 but can have a lever pivot 612 and a lever slot 618. In some embodiments, the lever pivot 612 is a hole for receiving a lever pin 613. The lever pin 613 can be rigidly attached to the lever crank 615 with an interference fit, welding, adhesive, or any other suitable method. The lever slot 618 is preferably a slot formed into the lever crank 615 near the pedal 16. In some embodiments, the lever slot 618 includes multiple notches which allow a compound pulley shaft 620, to be secured at various locations so that the distance between a compound pulley 622 and a lever crank pivot 616 can be adjusted. The compound pulley shaft 620 can be attached to the lever crank 615 with standard fasteners, and in one embodiment a well known quick release (not shown) is used. When the compound pulley 622 is farther from the lever crank pivot 616, more of a drive cable 630 and a compound cable 632 is pulled, and the bicycle 600 shifts into a higher gear. When the compound pulley 622 is closer to the lever crank pivot 616, less drive cable 630 and compound cable 632 is pulled, and the bicycle 600 shifts into a lower gear.

Still referring to FIGS. 29 and 30, a lever 608 is described. The lever 608 attaches to the lever crank 615 with the lever pin 613, which in some embodiments is a hardened steel pin with a head. In some embodiments, a bushing or bearing (not shown) placed over the lever pin 613 can be used to minimize friction between the lever 608 and the lever pin 613. In one embodiment, a hole is formed into a first end of the lever 608 to which a first lever pulley shaft 638 is rigidly attached with an interference fit, welding, adhesive, or any other suitable method. Positioned over the first lever pulley shaft 638 is a first lever pulley 634, which is an idler pulley and is free to rotate. In some embodiments, the first lever pulley shaft 638 has a head on one end to prevent the first lever pulley 634 from coming off the first lever pulley shaft 638. At a second end of the lever 608 is a second hole where a second lever pulley shaft 640 is inserted using the same attachment method as the first lever pulley shaft 638. A second lever pulley 636, which in some embodiments is substantially the same as the first lever pulley 634 and is also an idler pulley, is positioned over the second lever pulley shaft 640. A guide surface 614, which is of a shape to produce the desired movement and rotation of the lever 608, is formed on one side of the lever 608 between the second lever pulley 636 and the lever pivot 612. The lever bushing 606 rolls along the guide surface 614 during a stroke. The lever bushing 606 is preferably adapted to minimize friction and is positioned over the lever stop 604. The movement of the lever bushing 606 forces the lever 608 to rotate in a direction that causes the compound cable 632 to wrap around the first and second lever pulleys 634, 636. In some embodiments, the first lever pulley 634 comes contacts the compound cable 632 before the second lever pulley 636. Both the first and second lever pulleys 634, 636 increase the amount of compound cable 632 that is pulled during the stroke. In some embodiments, the lever 608 is configured to increase the rate of change of the amount of compound cable 632 pulled throughout the stroke. For example, near the beginning of a stroke, the amount of compound cable 632 pulled during the first 5 degrees of rotation of the lever crank 615 can be one centimeter, while in the last 5 degrees of rotation of the lever crank 615 five centimeters of the compound cable 632 can be pulled. The rate of change and length of the compound cable 632 pulled during a stroke are controlled by many variables including the distance from the lever pivot 612 to the crank pivot 616, the length of the lever 608, the shape of the guide surface 614, the location of the lever stop 604, the distance between the lever pivot 612 and the first lever pulley 634, the distance between the lever pivot 612 and the second lever pulley 636, the distance between the compound pulley 622 and the crank pivot 616, the degrees of rotation of the lever crank 615 during a stroke, whether a line drawn between the first lever pulley shaft 638 and the second lever pulley shaft 640 is coincident with the center of the lever pivot 612 or is offset, and the termination point of the compound cable 632.

Figure 31:
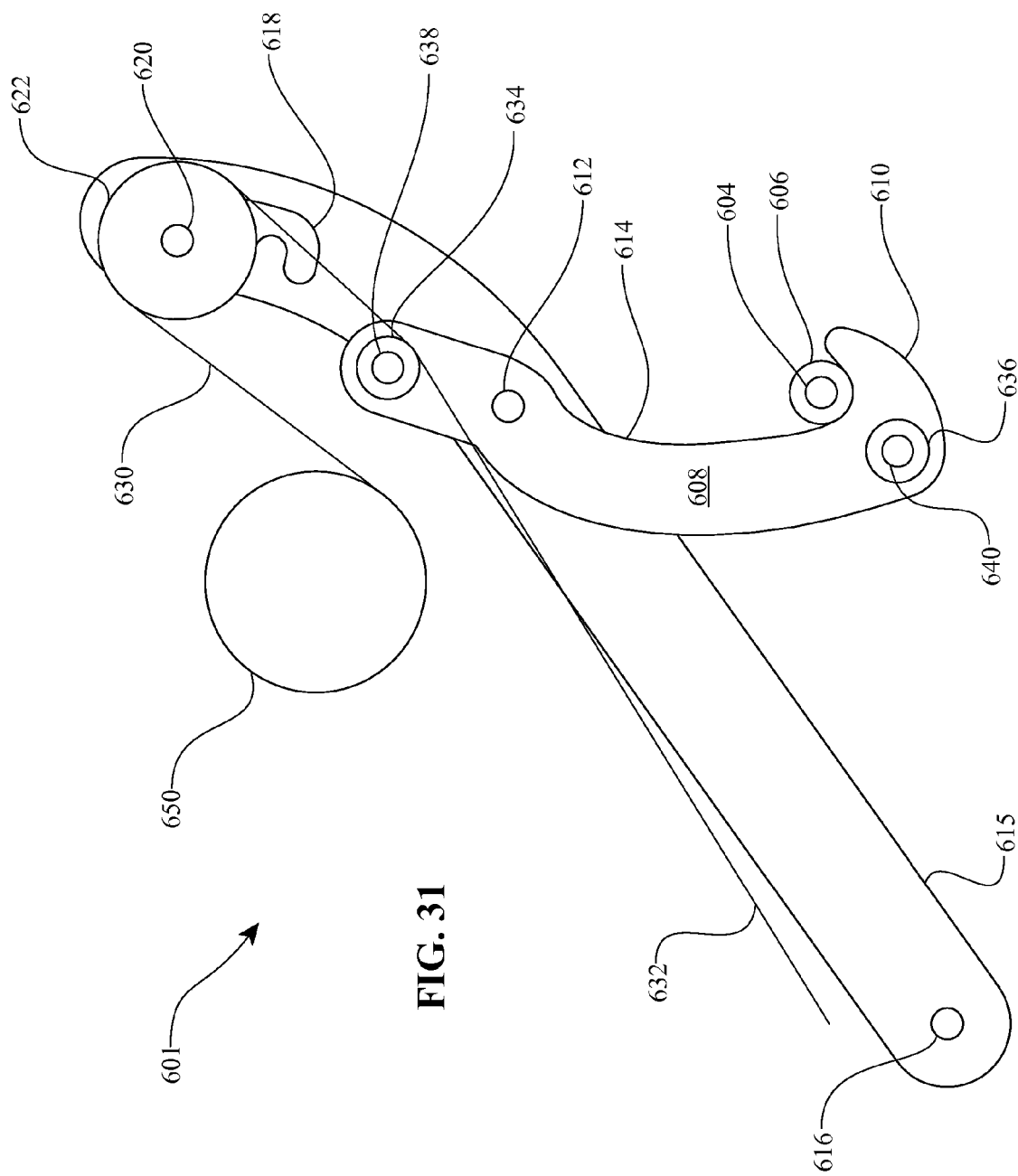
FIG. 31 is a partially schematic view of the CVD of FIG. 29 at the start of a stroke.
Figure 32:
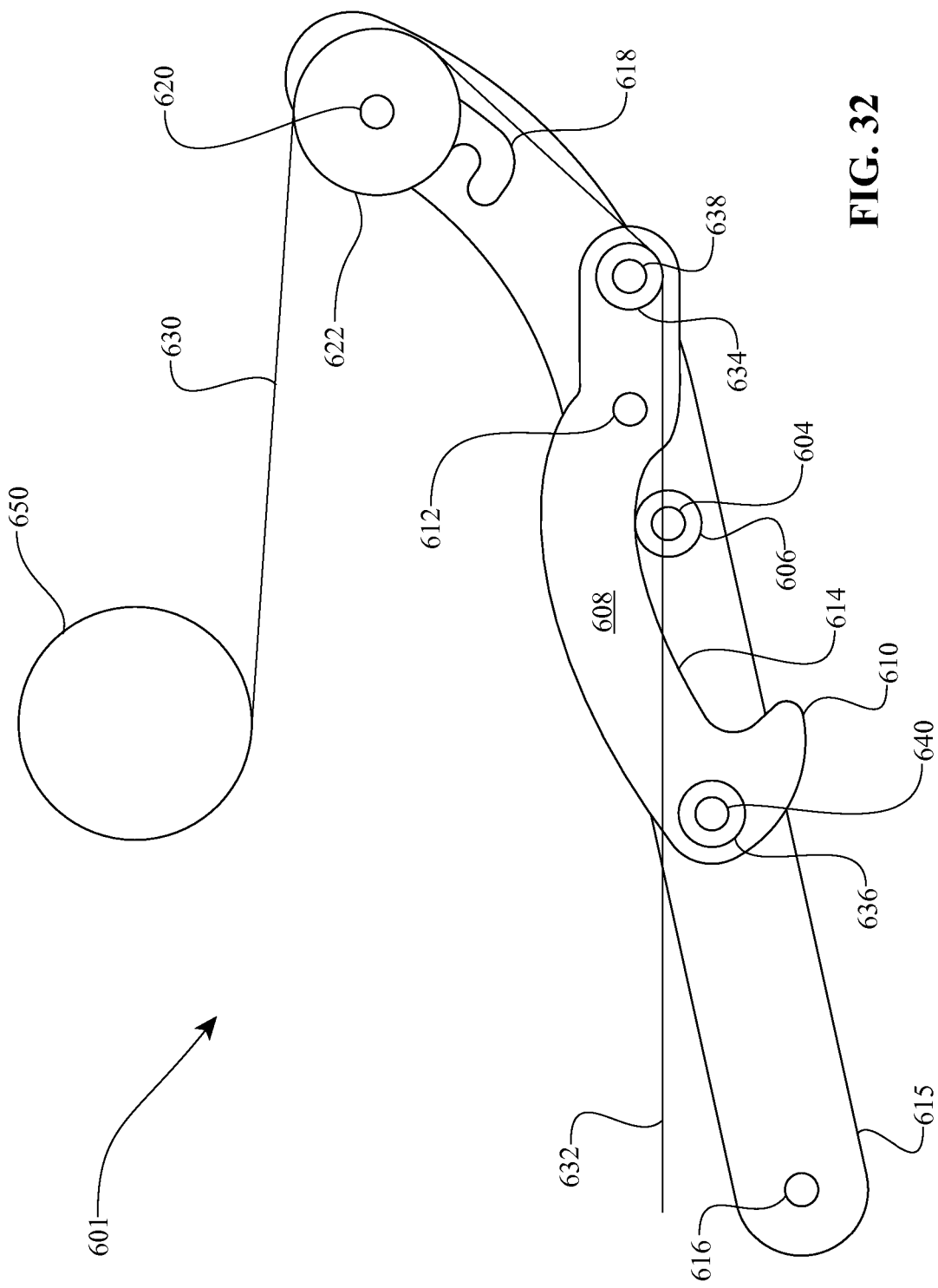
FIG. 32 is a partially schematic view of the CVD of FIG. 29 at the middle of a stroke.
Figure 33:
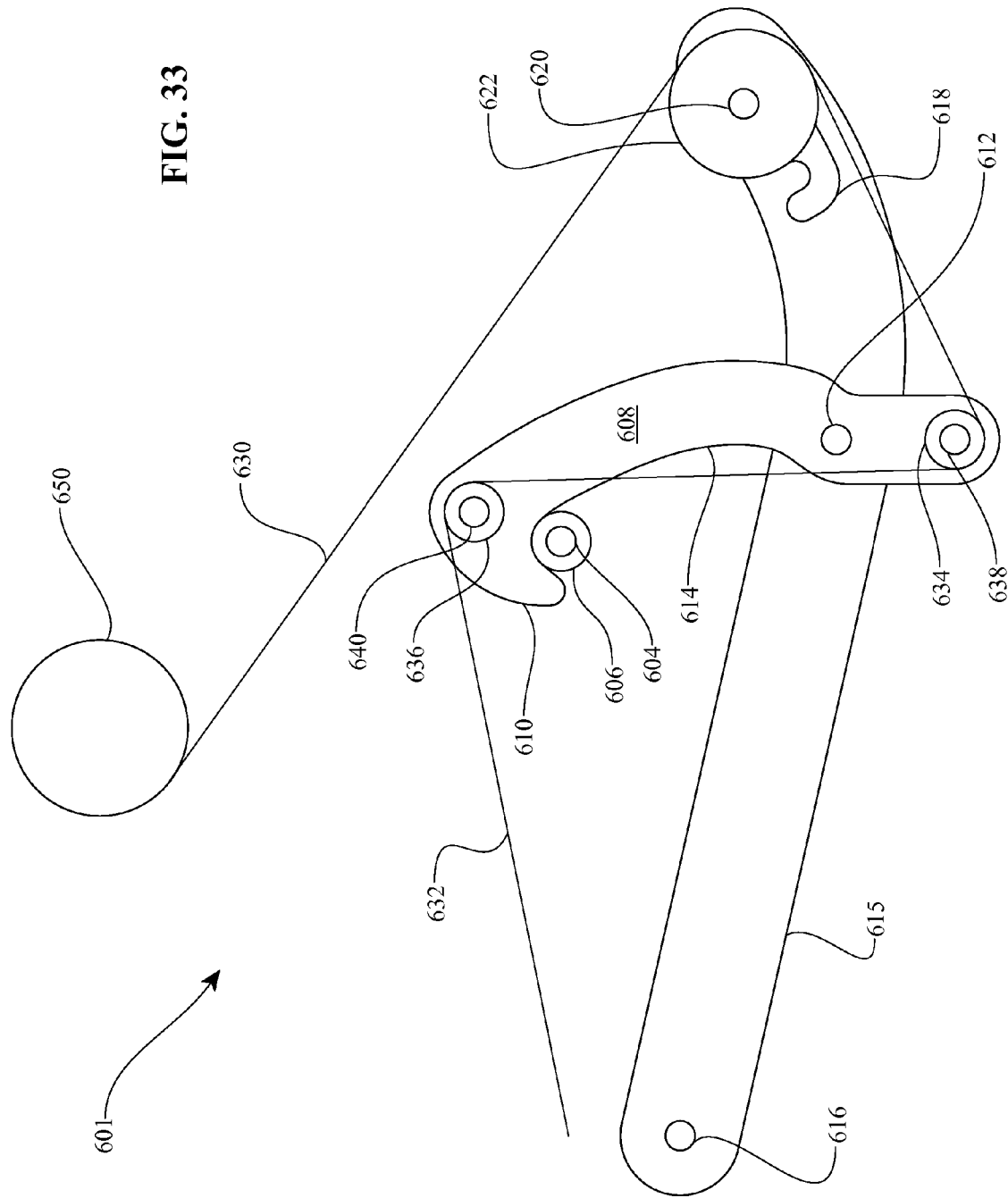
FIG. 33 is a partially schematic view of the CVD of FIG. 29 at the end of a stroke.

Referring now to FIGS. 31-33, in some embodiments a CVD 601 using a lever 608, can include a lever hook 610, which can be a generally curved portion that forms a hook at the end of the lever 608 on the side of the second lever pulley 636. The lever hook 610 preferably limits the rotation of the lever crank 615 during a stroke, catching the lever stop 604 or lever bushing 606 and stopping the rotation of the lever crank 615 at the end of a stroke. In one embodiment, the lever hook 610 can be adapted to stop the rotation of the lever crank 615 as the lever crank 615 returns to the beginning of the stroke.

Referring to FIG. 31, the lever 608 is shown at the beginning of a stroke. The lever hook 610 has caught on the lever bushing 606 during the return stroke and has prevented the lever crank 615 from swinging closer to a drive pulley 650. It should be noted that the same return spring 51 can be used on the CVD 601 as on the CVD 10, and the return spring 51 is strong enough to rotate the lever crank 615 on the return stroke back to its starting position. As the stroke begins and the lever crank 615 begins to rotate, the lever pivot 612 begins to move closer to the lever stop 604. In some embodiments, the first lever pulley 634 is in contact with the compound cable 632.

FIG. 32 depicts the stroke midway through its power phase. The lever crank 615 is close to the lever stop 604. The lever hook 610 has moved away from the lever stop 604, and the lever pivot 612 is closer to the lever stop 604, causing the lever 608 to rotate more rapidly, pulling more of the compound cable 632, and thus increasing the rate of change and accelerating the rotation of the rear wheel 84 (seen in FIG. 29). This occurs because the first lever pulley 634 pulls more of the compound cable 632. Note that the second lever pulley 636 is about to contact the compound cable 632.

FIG. 33 depicts the stroke at the end of its power phase. The lever crank 615 has passed the lever stop 604, and the lever bushing 606 has rolled along the guide surface 614 until the lever bushing 606 has again contacted the lever hook 610, stopping the lever crank 615 and ending the power phase of the stroke. The lever 608 has rotated in the same direction throughout the power phase of the stroke. During the return phase of the stroke the lever 608 rotates in the reverse direction, returning to its starting position. In some embodiments, the rate of change and rotational speed of the drive pulley 650 continues to increase throughout the stroke because the second lever pulley 636 has engaged and pulled a significant amount of compound cable 632, and the drive cable 630 has continued to lengthen.

Referring now to FIGS. 31-33, in some embodiments the acceleration of the drive pulley 650 increases linearly throughout the stroke. When the CVD 601 is implemented on a bicycle 600, and the user is ascending a hill, the rear wheel 84 typically rotates more slowly and pedaling becomes more difficult. In this situation, the user is unable to exert enough force to actuate the lever cranks 615 throughout the entire stroke. Pedaling becomes too difficult toward the end of the stroke, which stops the stroke. In such a situation, the user will be pushed toward the beginning of the stroke, where pedaling is easier. This action also moves the user forward on the bicycle 600, which is advantageous when ascending a hill. The user can choose to shorten the length of the stroke to make pedaling easier. When the user rides down a hill, the rear wheel 84 rotates faster and the drive pulley 650 also rotates faster to apply power to the bicycle 600. In this situation, pedaling becomes easier and the user moves farther through the stroke before it becomes too difficult to pedal. This action also moves the user farther back on the bicycle 600, which is advantageous when descending a hill. To summarize, in some embodiments, the CVD 601 automatically shifts the ratio to suit the needs of the user.

Figure 34:
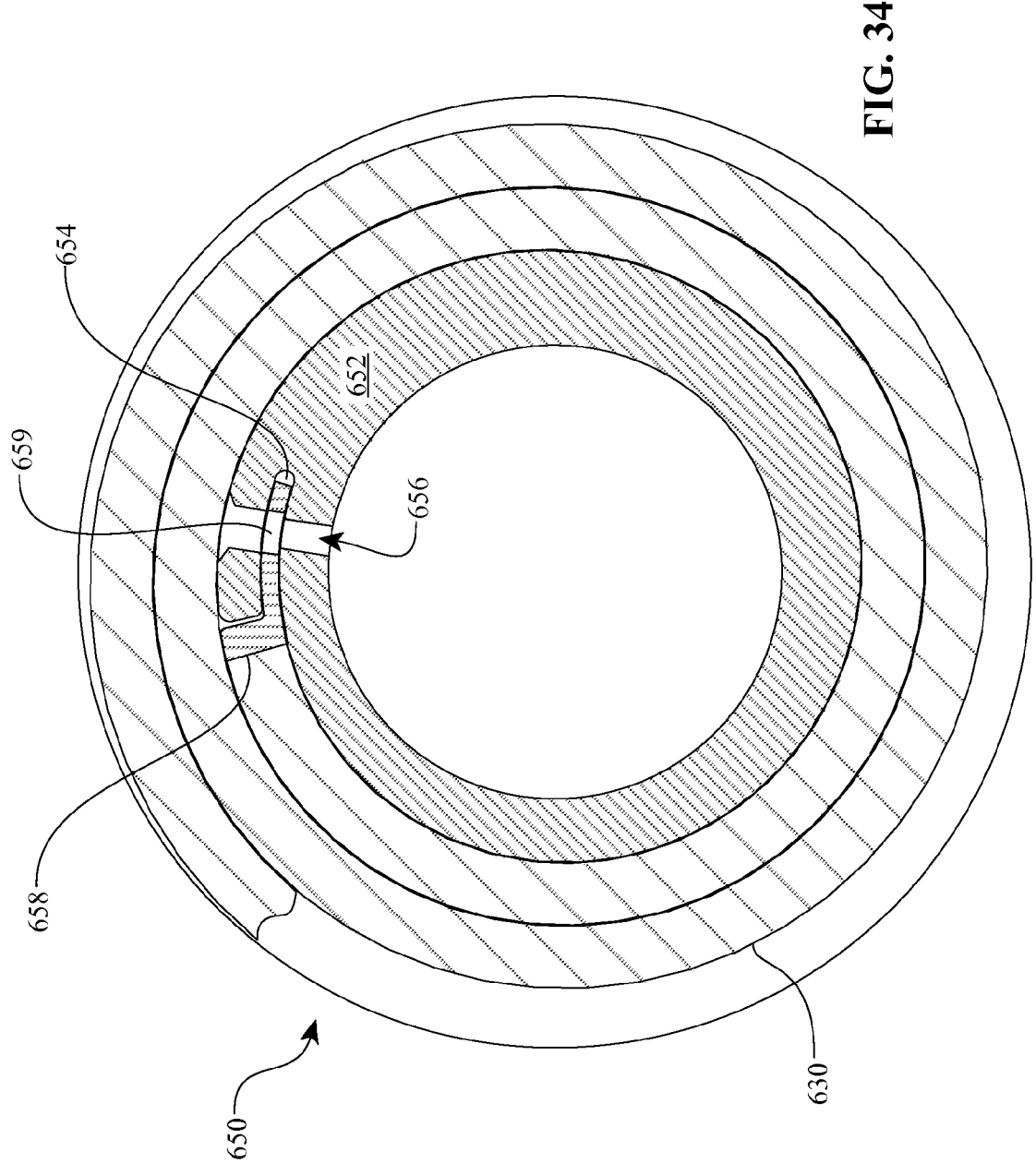
FIG. 34 is a section view of a drive pulley used in the CVD of FIG. 29.

Referring now to FIG. 34, one embodiment of the drive pulley 650 of the bicycle 600 will be described. The drive pulley has a spiraling root 652 at its root. The spiraling root 652 radius increases at a substantially linear rate throughout one turn, or 360 degrees of rotation. In some embodiments, the spiraling root 652 radius increases an amount substantially equal to the diameter of the drive cable 630 over one turn. The drive cable 630 can have a lug 658 attached at an end that terminates at the smallest radius of the spiraling root 652. The lug 658 is a common fastener that has a flat area with a lug hole 659 to allow insertion of a screw (not shown). The flat portion of the lug 658, which includes the lug hole 659, is inserted into a pulley slot 654, which is formed into the spiraling root 652. The screw in some embodiments is a flat head screw and can be inserted into a countersunk fastening hole 656 which is aligned radially with the lug hole 659, so that the flat head screw is first inserted into a countersunk portion of the fastening hole, then through the lug hole 659, then threaded into a threaded portion of the fastening hole 656.

Figure 35:
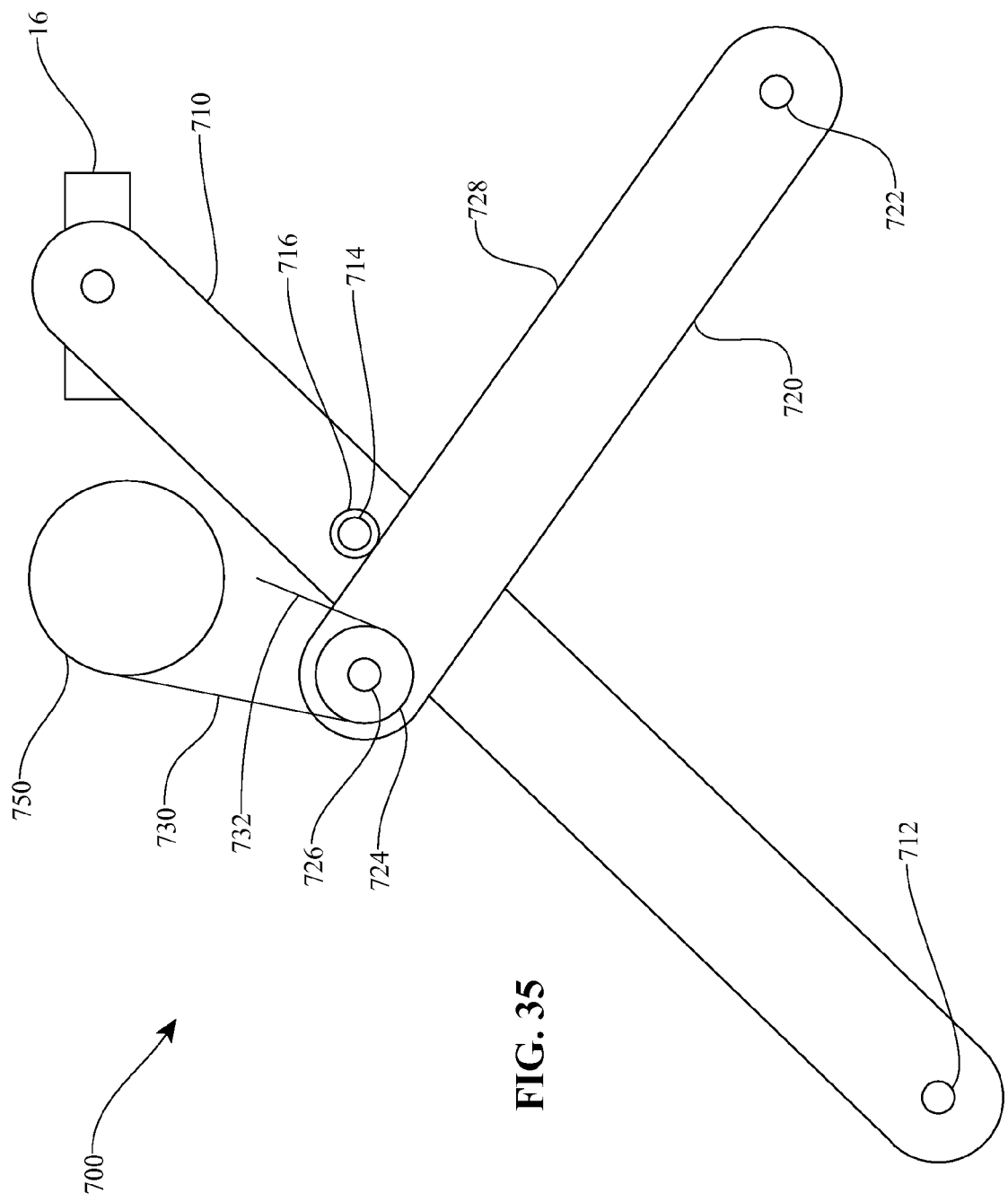
FIG. 35 is a partially schematic view of an alternative CVD at the start of a stroke.
Figure 36:
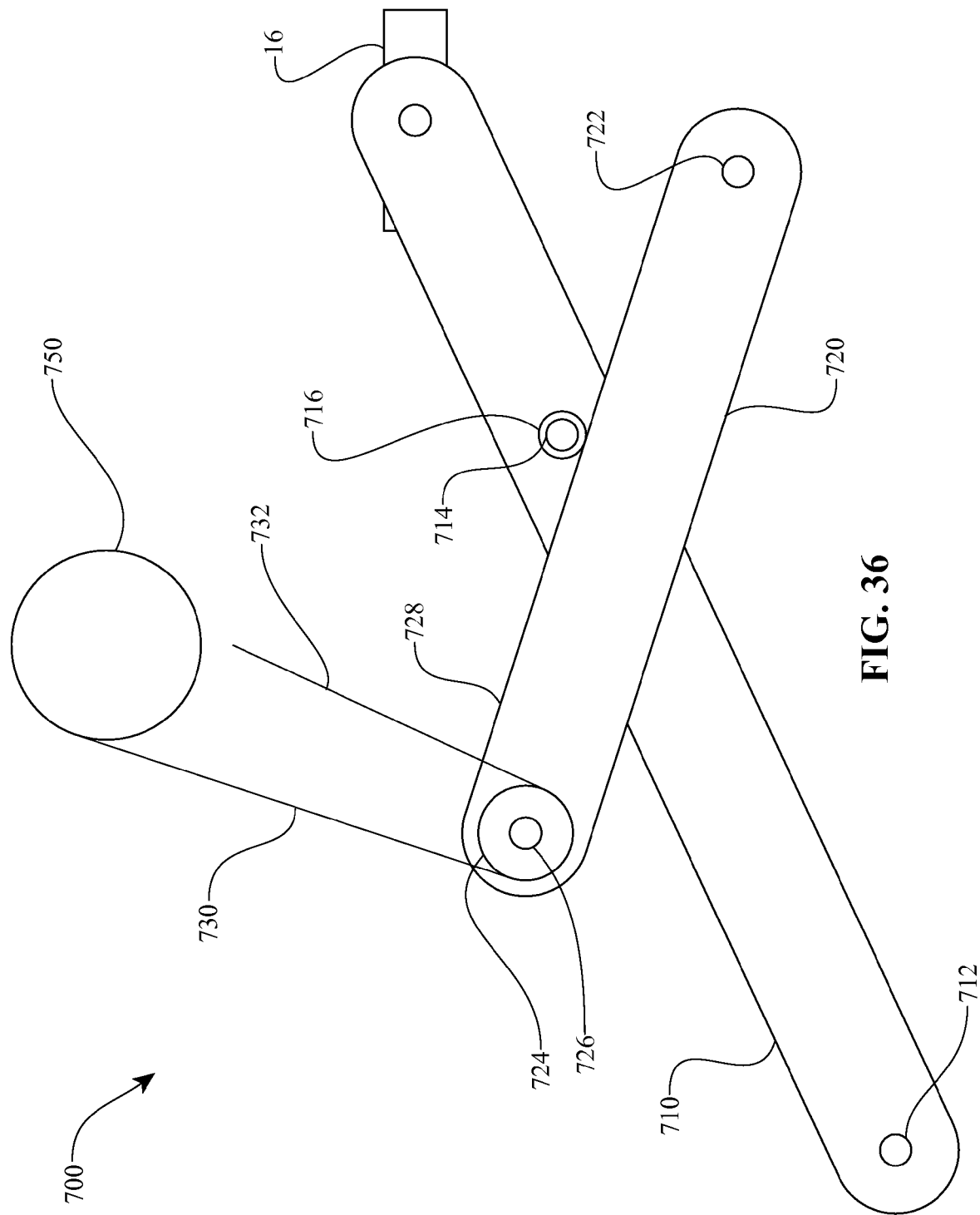
FIG. 36 is a partially schematic view of an alternative CVD at the middle of a stroke.
Figure 37:
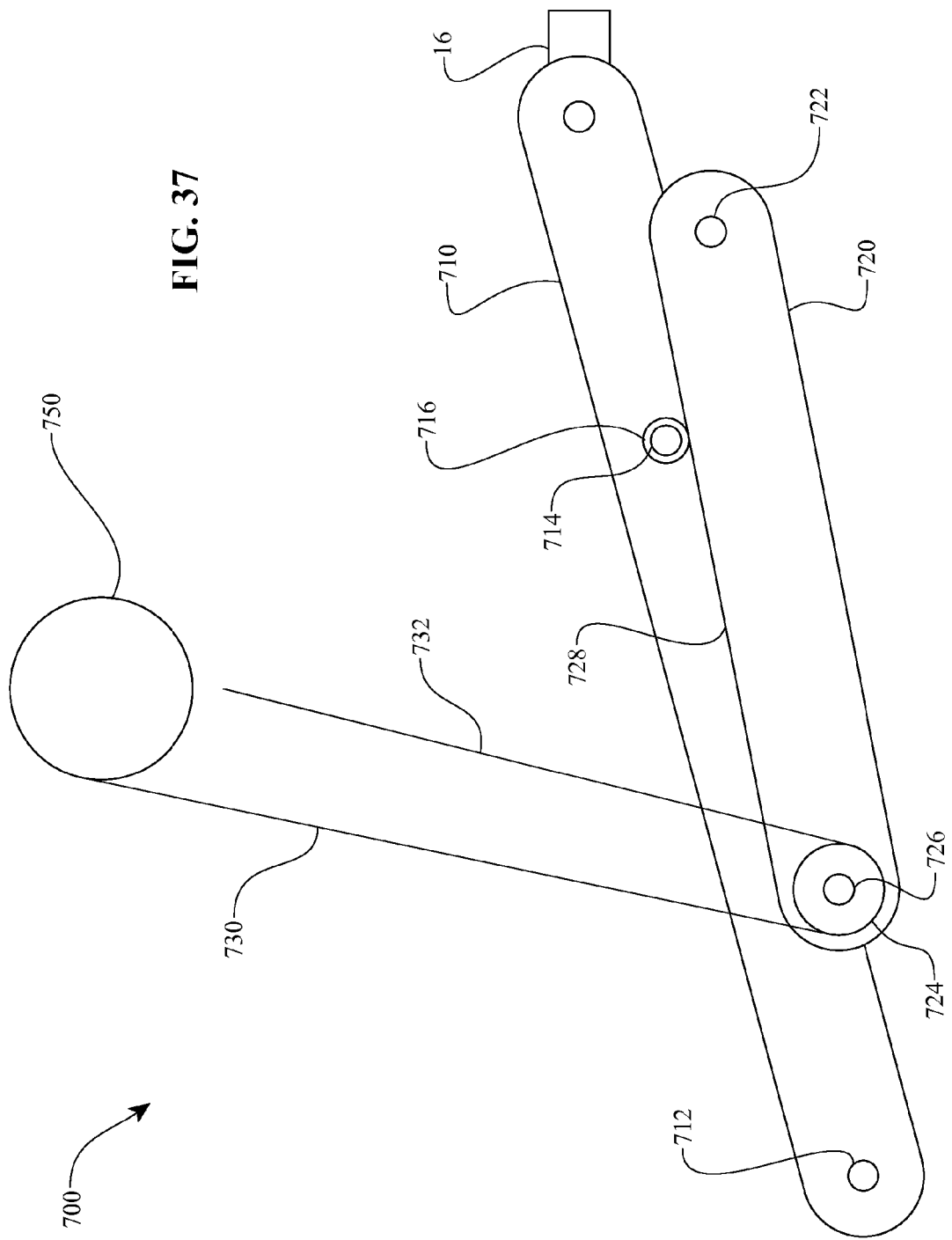
FIG. 37 is a partial schematic view of an alternative CVD at the end of a stroke.

Referring now to FIGS. 35-37, an alternative CVD 700 is disclosed. The CVD 700 is similar to the CVD 601, using a crank 710 and a transfer lever 720. At a first end, the transfer lever 720 pivots about a lever pivot 722, which can be rigidly attached to a non-moving component, such as a frame (not shown). The components of the lever pivot 722 can be substantially similar to the components of the lever pivot 612. A pulley shaft 726 and a pulley 724 can be attached near a second end of the lever 720. At a first end, the crank 710 pivots about a crank pivot 712. A pedal 16 attaches to a second end of the crank 710. Also attached to the crank 710 are a stop 714 and a bushing 716. A drive cable 730 wraps around a drive pulley 750. A compound cable 732 is rigidly attached to a rigid, non-moving component, such as a frame (not shown).

FIG. 35 shows the CVD 700 at the beginning of the power phase of a stroke or the end of the return phase of a stroke. The bushing 716 contacts a guide surface 728 on the lever 720 and, as the user actuates the pedal 16, the crank 710 begins to move through the power phase of the stroke. The bushing 716 rolls on the guide surface 728. FIG. 36 shows the CVD 700 midway through the power phase of a stroke. The crank 710 and the bushing 716 have moved closer to the lever pivot 722, which causes the lever 720 to rotate more rapidly, pulling more of the drive cable 730 and the compound cable 732, which results in an increasing rate of change. FIG. 37 shows the CVD 700 at the end of the power phase of a stroke. The crank 710 and the lever 720 are nearly parallel, and the bushing 716 has moved closest to the lever pivot 722, which further increases the rotational speed of the lever 720 and the rate of change in the amount of the compound cable 732 and the drive cable 730 pulled. The guide surface 728 can be any shape which produces the desired rate of change. For example, in some embodiments the guide surface 728 is straight, while in other embodiments it is a curve. In still other embodiments, the guide surface 728 is a spline or a curve produced by multiple radii.

Figure 38:
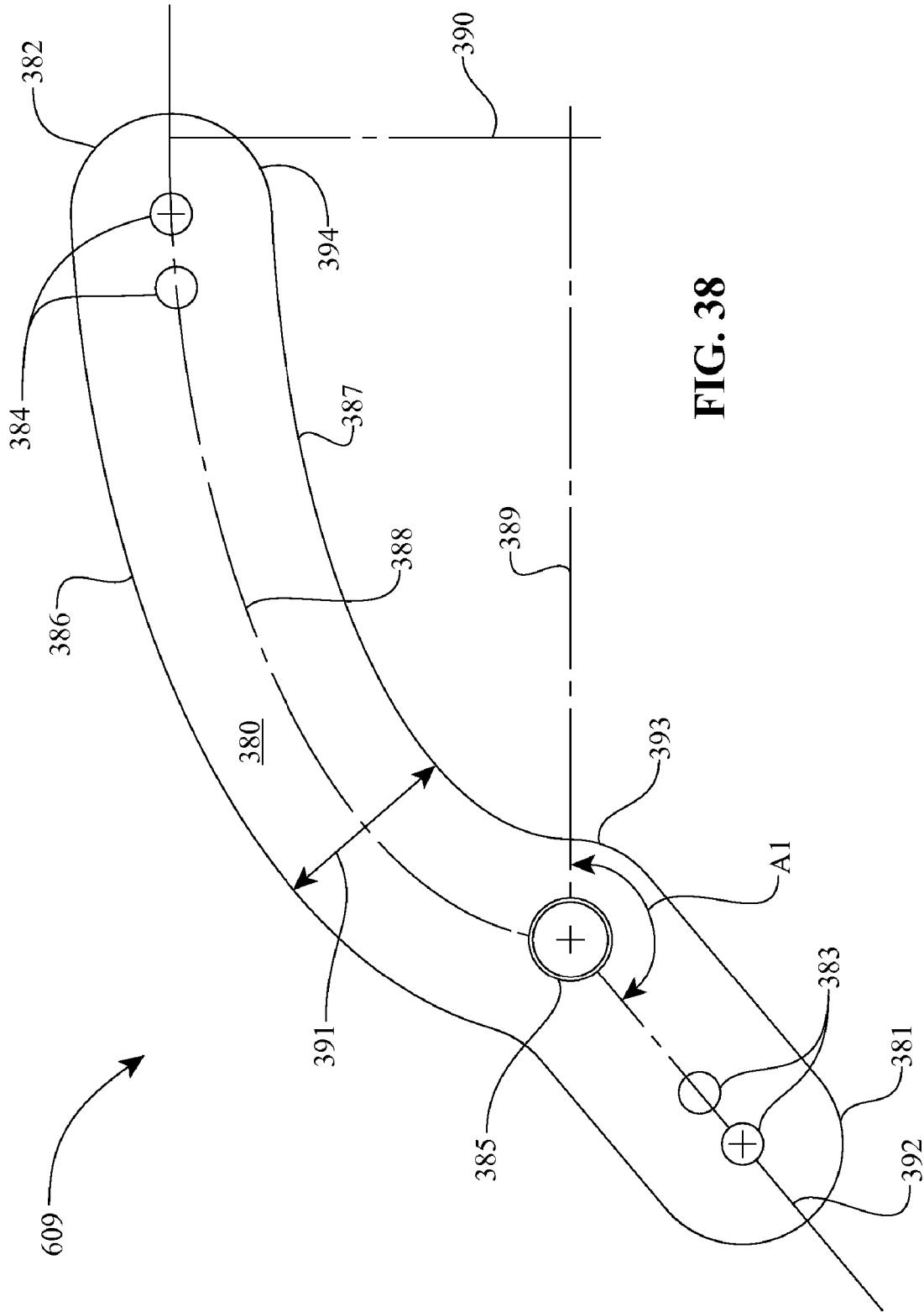
FIG. 38 is a side view of a lever that can be used with the CVD of FIG. 29.

Passing to FIG. 38 now, it is shown a lever 609 that can be used with various embodiments of the CVDs previously described. The lever 609 has generally flat sides 380 that terminate at a lever pivot end 381 and at a distal slider guide end 382. In one embodiment, the lever 609 includes one or more pulley attachment couplings 383, which can be holes for receiving the shafts of the pulleys. The pulley attachment couplings 383 can be located at, near, or in the vicinity of the lever pivot end 381. As illustrated in FIG. 38, in some embodiments, the lever 609 includes additionally one or more pulley attachment couplings 384 near, at, or in the vicinity of the slider guide end 382. It is preferable to provide multiple pulley attachment couplings 383, 384 to, among other things, allow for flexibility in choosing the location of the pulleys (not shown).

In one embodiment, the lever 609 is provided with a lever pivot attachment coupling 385, which is positioned between the lever pivot end 381 and the slider guide end 382. As shown in FIG. 38, the lever pivot attachment coupling can be positioned near to the pulley attachment couplings 383. A midlever portion 386 of the lever 609, between the lever pivot attachment coupling 385 and the slider guide end 382 is preferably provided with a curved guide surface 387. In one embodiment, the guide surface 387 defines an elliptical arc. For example, for some applications, the guide surface 387 is characterized relative to an elliptical arc 388 having a major axis 389 of about 6-inches and a minor axis 390 of about 3-inches. In the embodiment illustrated in FIG. 38, a width 391 of the lever 609 can be about 1.5-inches. In some embodiments, an axis 392 collinear with the centers of the pulley attachment couplings 383 and the pivot lever attachment coupling 385 is located at an angle A1 of about 140-degrees relative to the major axis 389. In one embodiment, the distance between the centers of the pulley attachment couplings 383 and the lever pivot attachment coupling 385 is about 1-2.5-inches, and more preferably 1.5-2.0-inches. In some embodiments, the guide surface 387 transitions into a radius 393 or a radius 394, which can be, for example, a 0.75-inch radius. It should be noted that although the guide surface 387 has been described in one embodiment as being defined by an elliptical arc, in other embodiments the guide surface 387 can be defined by various shapes of curves, or even straight lines. For some applications, the guide surface 387 can be composed of multiple, sequential curves, which at least some of them can have different radii.

Referring now to FIGS. 39A-39D, some physiological benefits of using a CVD are discussed. FIGS. 39A and 39B depict a user's leg position at the top and bottom of a rotary stroke, commonly used on bicycles. FIGS. 39C and 39D depict a user's leg position at the top and bottom of a stroke when a CVD is used on a bicycle. FIGS. 39A-39D show a user's upper leg 770, knee 772, and lower leg 774. FIG. 39A shows the distance 776 between two pedals of a typical bicycle using 170 mm cranks. The total distance 776 between the pedals is 340 mm. FIG. 39B shows that at the bottom of a conventional rotary bicycle stroke, the user's leg is slightly bent. FIG. 39B shows the distance 777 between the bottom of a user's foot at the bottom of a conventional rotary stroke and the bottom/end of the stroke of a CVD. FIG. 39C shows that at the end of the power phase of a CVD stroke, the user's leg is substantially straight. FIG. 39D shows the distance 778 between the pedals at the top/start and bottom/end of a CVD stroke, which is 235 mm, or 69% of the length of the rotary stroke. More importantly, the user's leg is bent at an angle of about 91 degrees in FIG. 39D, while in FIG. 39A the user's leg is bent at an angle of about 68 degrees.

Figure 39:
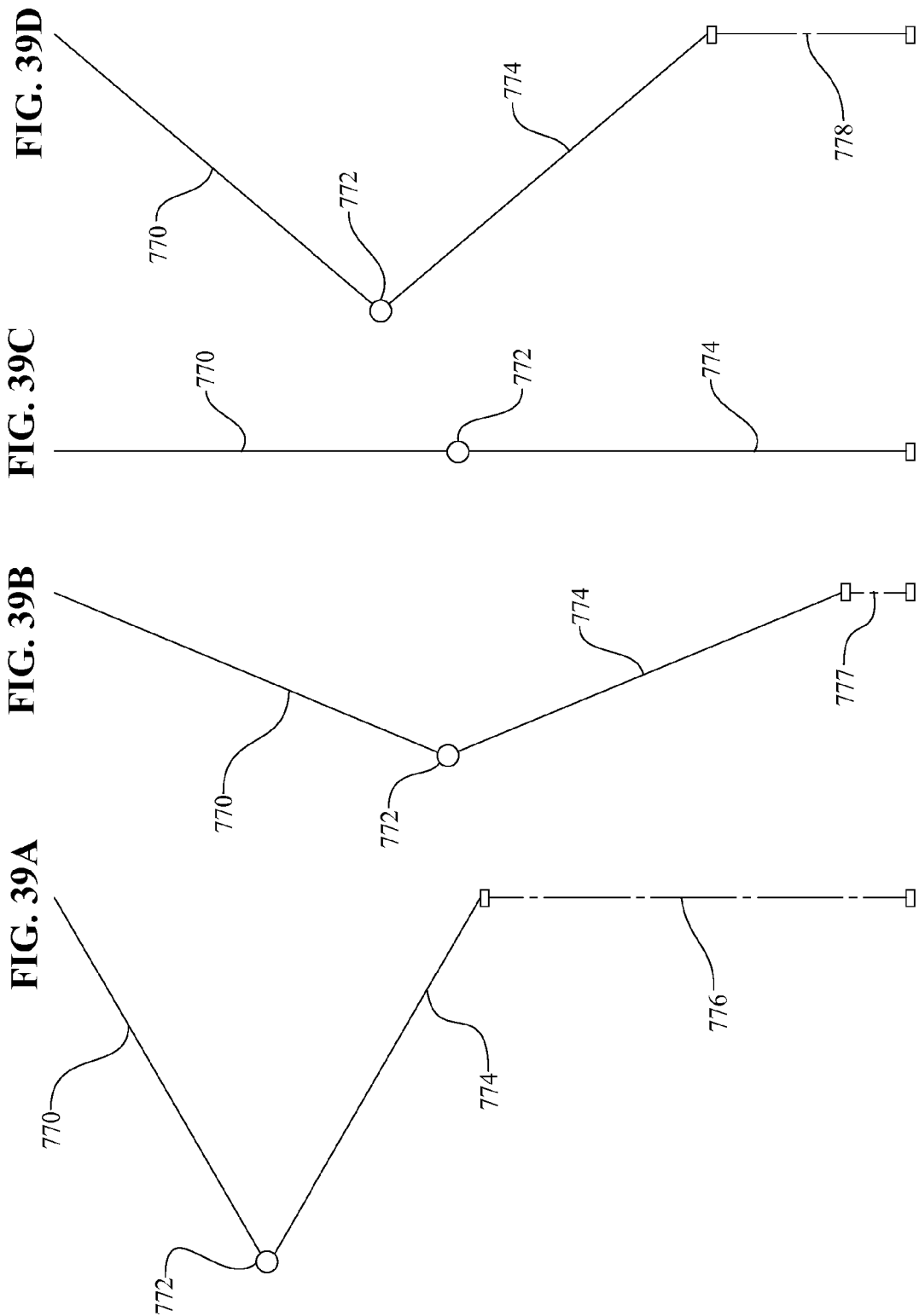
FIGS. 39A-39D are schematic views showing contrasting different leg positions of a user operating a conventional bicycle and a CVD.

Still referring to FIG. 39, there are many physiological benefits to minimizing the amount a user must bend their legs when pedaling. One obvious benefit is that it is easier, because the user need not move his legs as much or lift his legs as high. Another benefit is that there is less stress on the knees, and this is important for people with knee problems. Another benefit is that more muscles are used in the CVD stroke than in the conventional rotary stroke of a bicycle, and more of an activated muscle is used. Studies have shown that stair climbing, which is analogous to the movement produced by the CVD stroke, activates almost all of the muscles of the lower body, including the hip flexors and the gluteus muscles. Still another benefit of the CVD stroke is that muscle contractions are more efficient when muscles are lengthened or approach lengthening rather than when they are shortened. Termed concentric (shortening) and eccentric (lengthening) muscle contractions, eccentric muscle contractions can be far more efficient. For example, studies have shown that cycling produces muscle movement that is about 15% efficient, while the muscles used in running up an incline, which more closely approximates the movement produced by the CVD stroke, achieve about 34% efficiency. Still another benefit of the CVD stroke is that the users are able to switch their body weight from side to side, easily applying all of their weight to the power phase of a CVD stroke, which produces much more force than is achieved when a user is applying force to the pedals when seated on a bicycle.

Figure 40:
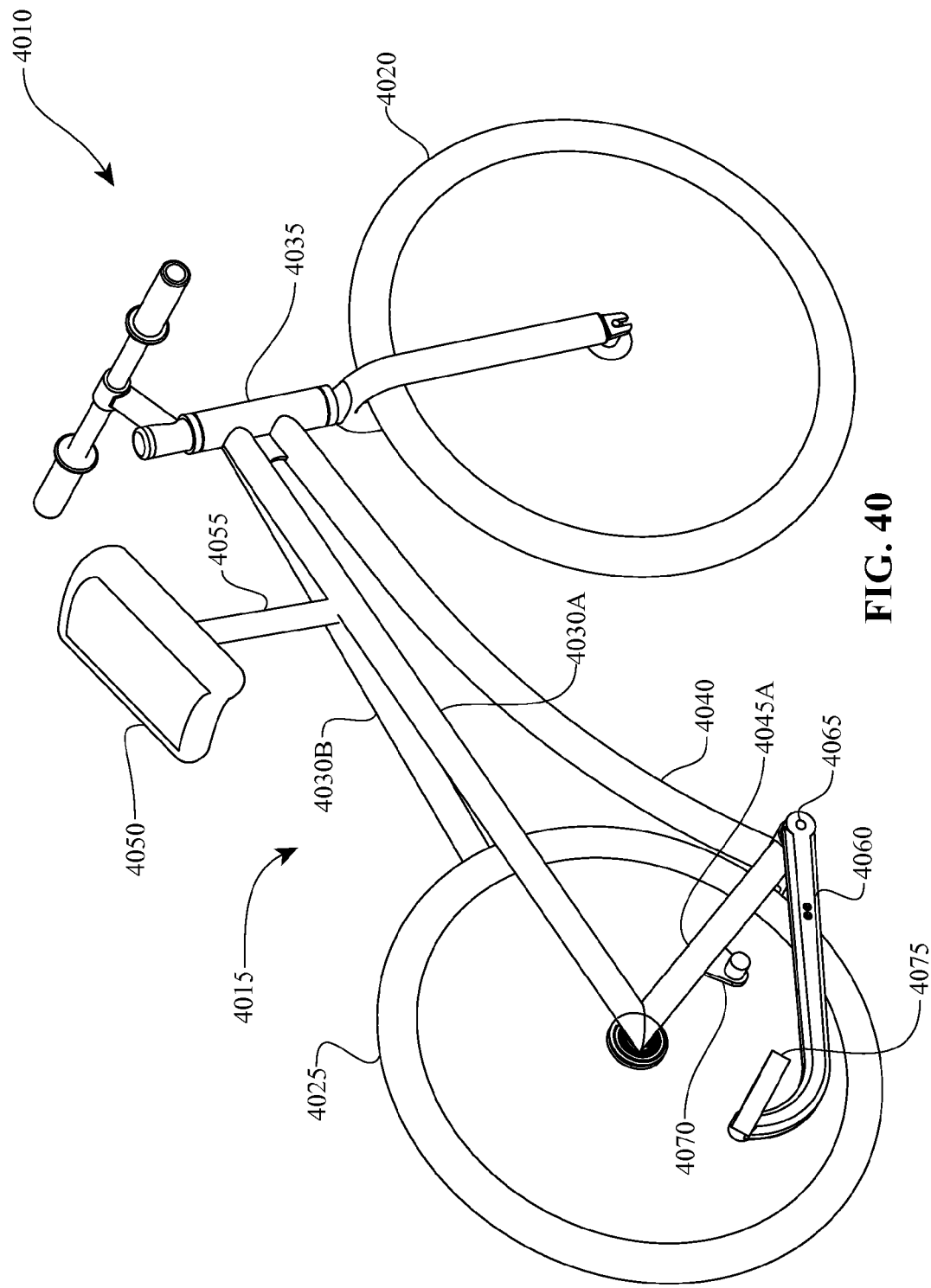
FIG. 40 is a perspective view of a bicycle and frame that can be used with the CVDs disclosed here.

Referencing FIG. 40 now, a bicycle 4010 that can use various embodiments of the CVDs described here is shown. In one embodiment, the bicycle 4010 includes a frame 4015 supported by a front wheel 4020 and a rear wheel 4025. Top tubes 4030 extend from a head tube 4035 to a wheel axle (not shown) of the rear wheel 4025. The top tubes 4030 can be adapted to receive and secure the wheel axle. The rear wheel 4025 is placed between the top tube 4030A and the top tube 4030B. In some embodiments, a first portion of the top tubes 4030 is actually a single tube, which then bifurcates into two tubes as it approaches the rear wheel 4025. A down tube 4040 extends from the head tube 4035 toward a lower portion of the rear wheel 4025, and is positioned generally in the same plane as that of the rear wheel 4025 (that is, the down tube 4035 preferably terminates in front of, and is aligned with, the rear wheel 4025). Tying tubes 4045 are coupled to the top tubes 4030 and to the down tube 4040. For example, the tying tube 4045A is fastened at one end to the top tube 4030A and at a second end to the bottom tube 4040. In some embodiments, the bottom tube 4040 is provided with an extension, or a support rod, or a shaft (not shown) for coupling the tying tubes 4045 to the down tube 4040. In some embodiments, the bicycle 4010 includes a chest support 4050 that is coupled to the frame 4015 by a chest support tube 4055, which is fastened to one or both of the down tubes 4030. The fastening between the chest support tube 4055 and the down tubes 4030 can be adapted to allow selection of location of the chest support tube 4055 along the length of the down tubes 4030. In one embodiment, reciprocating cranks 4060 can be coupled to crank pivots 4065, which can be supported by and located near, at, or in the vicinity of the down tube 4040 and/or the tying tubes 4045. Lever stops 4070 can be coupled the tying tubes 4045 to provide a guiding structure for a movement of a lever (not shown in FIG. 40) such as the levers 608 and 720 described above.

Figure 41:
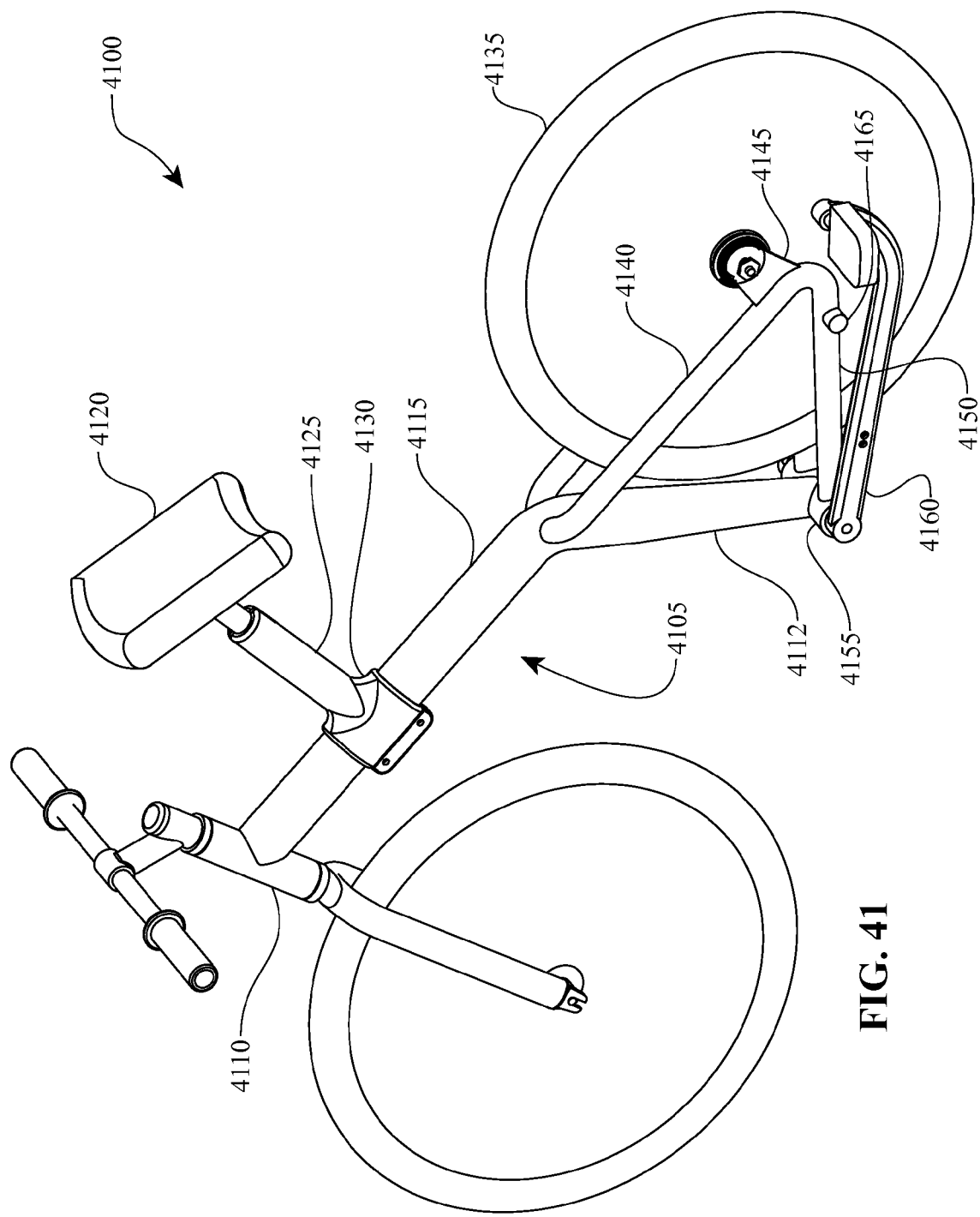
FIG. 41 is a perspective view of yet another bicycle frame that can be used with the CVDs disclosed here.

Passing to FIG. 41 now, a bicycle 4100 can include a frame 4105 that includes a head tube 4110 coupled to a down tube 4115. A chest support 4120 can be received and/or supported on a chest support tube 4125, which couples to the down tube 4115 via a chest support tube clamp 4130. In some embodiments, the chest support tube clamp 4130 is adapted to be removable and allow selection of location of the chest support clamp 4130 a desired length of the down tube 4115. As illustrated in FIG. 41, a portion 4112 of the down tube 4115 can bend in front of, and extend toward a lower part of, a rear wheel 4135.

In some embodiments, downstays 4140 couple the down tube 4115 to a rear wheel axle (not shown) of the bicycle 4100. In one embodiment, for example, the downstays 4140 couple to the rear wheel axle by a bracket 4145. In some embodiments, crank stays 4150 couple the downstays 4140 to the down tube 4115. Hence, in some cases, the down tube 4115 is provided with an extension, connecting hub, or shaft 4155 adapted to couple to the crank stays 4150. As shown in FIG. 41, in some embodiments, the downstays 4140 and the crank stays 4150 can be formed integrally into one piece. The rear wheel 4135 is placed between pairs of crank stays 4150 and downstays 4140.

A crank 4160, which in some embodiments is reciprocating and adapted to turn only through an angle that is less than 360 degrees, can be coupled to the down tube 4115 and/or to the crank stay 4160. In one embodiment, the crank 4160 is rotationally coupled to the connecting hub 4155. A lever stop 4165 can be attached to the crank stay 4150 to provide a guide structure to a movement of a lever (not shown in FIG. 41) such as the levers 608 and 720 of the CVDs described above.

The foregoing description details certain inventive embodiments. It will be appreciated, however, that no matter how detailed the foregoing appears in text, the inventions disclosed here can be practiced in many ways. It should be noted that the use of particular terminology when describing certain features or aspects of the inventive embodiments should not be taken to imply that the terminology is being redefined herein to be restricted to including any specific characteristics of the features or aspects of the invention with which that terminology is associated.

What is claimed is:

1. A bicycle, comprising:
   first and second cranks, each crank configured to rotate less than 360 degrees during a power phase of a stroke;
   first and second lever pivots coupled, respectively, to the first and second cranks;
   first and second levers operably coupled, respectively, to the first and second cranks, the first and second levers configured to rotate less than 360 degrees about the first and second lever pivots during the power phase;
   a frame, wherein the first and second cranks and/or the first and second levers are coupled to the frame;
   a front wheel and a rear wheel, the front and rear wheels operably coupled to the frame;
   first and second crank pulleys, the first and second crank pulleys coupled to the first and second cranks, respectively; and
   wherein the first and second levers are configured to rotate with respect to the first and second cranks, respectively.

2. The bicycle of claim 1, further comprising first and second drive pulleys, the first and second drive pulleys adapted to cause rotation of the rear wheel.

3. The bicycle of claim 2, further comprising a drive hub coupled to the first and second drive pulleys.

4. The bicycle of claim 1, wherein, during the power phase, an angle of rotation of the first and/or second crank changes according to a rotational speed of the rear wheel.

5. The bicycle of claim 1, further comprising first and second frame tails, the first and second frame tails coupled to the frame.

6. The bicycle of claim 5, further comprising a first lever bushing and a second lever bushing, the first and second lever bushings coupled to the first and second frame tails, respectively, at distal ends of the first and second frame tails.

7. The bicycle of claim 6, wherein the first and second levers are coupled to the first and second lever bushings, respectively.

8. The bicycle of claim 1, further comprising a first pedal and a second pedal, the first pedal and the second pedal coupled to the first and second crank, respectively.

9. The bicycle of claim 8, wherein the first and second crank pulleys are coupled to the first and second cranks, respectively, in proximity to the first and second pedals, respectively.

10. A continuously variable drive comprising:
    a crank configured to rotate less than 360 degrees during a power phase of a stroke;
    a lever pivot coupled to the crank;
    a lever operably coupled to the crank, the lever configured to rotate less than 360 degrees about the lever pivot during the power phase;
    a lever stop operably coupled to the lever, the lever stop coupled to a substantially fixed location; and
    a guide surface formed on the lever, the guide surface configured to couple to the lever stop.

11. The continuously variable drive of claim 10, further comprising a lever bushing coupled to the lever stop, wherein the lever bushing contacts the guide surface.

12. The continuously variable drive of claim 11, wherein the lever comprises a lever hook, the lever hook configured to contact the lever bushing during at least one portion of the power phase.

13. The continuously variable drive of claim 12, wherein the guide surface comprises a curved surface.

14. The continuously variable drive of claim 12, wherein the lever hook is located at a distal location from the lever pivot.

15. A continuously variable drive comprising:
    a hub configured to rotate about a first substantially fixed axis;
    a drive pulley coupled to the hub;
    a crank configured to rotate less than 360 degrees during a power phase of a stroke, the crank configured to rotate about a second substantially fixed axis, wherein the second substantially fixed axis is parallel to the first substantially fixed axis;
    a flexible tension member configured to operably couple to the drive pulley and to the crank;
    a lever pivot coupled to the crank;
    a lever operably coupled to the crank, the lever configured to rotate less than 360 degrees about the lever pivot during the power phase;
    a lever stop operably coupled to the lever, the lever stop configured to be a substantially fixed location; and
    a guide surface formed on the lever, the guide surface configured to couple to the lever stop.

16. The continuously variable drive of claim 15, further comprising a first lever pulley coupled to a first end of the lever, the first lever pulley configured to couple to the flexible tension member during at least a portion of the power phase.

17. The continuously variable drive of claim 16, further comprising a second lever pulley coupled to a second end of the lever at a distal location from the first end, the second lever pulley configured to couple to the flexible tension member during at least a portion of the power phase.

18. The continuously variable drive of claim 17, wherein the guide surface is located between the lever pivot and the second lever pulley.

19. The continuously variable drive of claim 18, further comprising a lever hook coupled to the lever in proximity to the second lever pulley, the lever hook configured to couple to the lever stop at the end of the power phase.

* * * * *